(12) United States Patent
Bonalle et al.

(10) Patent No.: US 7,156,301 B1
(45) Date of Patent: Jan. 2, 2007

(54) FOLDABLE NON-TRADITIONALLY-SIZED RF TRANSACTION CARD SYSTEM AND METHOD

(75) Inventors: David S Bonalle, New Rochelle, NY (US); Ellen Lasch, New York, NY (US); Tracey R. Thomas, Boonton, NJ (US); Lisa Webb, Darien, CT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 10/906,732

(22) Filed: Mar. 3, 2005

Related U.S. Application Data

(63) Continuation-in-part of application No. 10/862,646, filed on Jun. 7, 2004, which is a continuation-in-part of application No. 10/773,619, filed on Feb. 6, 2004, which is a continuation-in-part of application No. 10/436,394, filed on May 12, 2003, application No. 10/906,732, which is a continuation-in-part of application No. 10/708,549, filed on Mar. 10, 2004, now Pat. No. 7,093,767, which is a continuation-in-part of application No. 10/192,488, filed on Jul. 9, 2002, said application No. 10/708,549 is a continuation-in-part of application No. 10/340,352, filed on Jan. 10, 2003, said application No. 10/708,549 is a continuation-in-part of application No. 10/394,914, filed on Mar. 21, 2003, and a continuation-in-part of application No. 10/302,658, filed on Nov. 22, 2002, now abandoned.

(60) Provisional application No. 60/442,991, filed on Jan. 28, 2003, provisional application No. 60/432,726, filed on Dec. 11, 2002, provisional application No. 60/424,592, filed on Nov. 7, 2002, provisional application No. 60/304,216, filed on Jul. 10, 2001, provisional application No. 60/396,577, filed on Jul. 16, 2002, provisional application No. 60/153,112, filed on Sep. 7, 1999, provisional application No. 60/160,519, filed on Oct. 20, 1999, provisional application No. 60/167,405, filed on Nov. 24, 1999, provisional application No. 60/171,689, filed on Dec. 21, 1999.

(51) Int. Cl.
*G06K 5/00* (2006.01)
*G06K 17/00* (2006.01)
*G06K 19/06* (2006.01)

(52) U.S. Cl. .................. 235/380; 235/487; 235/492

(58) Field of Classification Search ............. 235/380, 235/492, 487

See application file for complete search history.

(56) References Cited

U.S. PATENT DOCUMENTS

| | | |
|---|---|---|
| D061,466 S | 9/1922 | Foltz |
| 3,536,894 A | 10/1970 | Travioli |
| 3,573,731 A | 4/1971 | Schwend |
| 3,725,647 A | 4/1973 | Retzky |
| 3,763,356 A | 10/1973 | Berler |
| 3,829,662 A | 8/1974 | Furahashi |
| 3,838,252 A | 9/1974 | Hynes et al. |
| 3,873,813 A | 3/1975 | Lahr et al. |
| 3,894,756 A | 7/1975 | Ward |
| 3,929,177 A | 12/1975 | Reis |
| 3,955,295 A | 5/1976 | Mayer |
| 4,044,231 A | 8/1977 | Beck et al. |
| 4,048,737 A | 9/1977 | McDermott |
| 4,058,839 A | 11/1977 | Darjany |
| 4,119,361 A | 10/1978 | Greenaway |
| 4,202,491 A | 5/1980 | Suzuki |
| 4,222,516 A | 9/1980 | Badet et al. |
| 4,303,904 A | 12/1981 | Chasek |
| 4,318,554 A | 3/1982 | Anderson et al. |
| 4,361,757 A | 11/1982 | Ehrat |
| D270,303 S | 8/1983 | Zautner |
| D270,546 S | 9/1983 | Malmberg |
| 4,436,991 A | 3/1984 | Albert et al. |
| 4,475,308 A | 10/1984 | Heise et al. |
| 4,504,084 A | 3/1985 | Jauch |
| D280,214 S | 8/1985 | Opel |
| 4,538,059 A | 8/1985 | Rudland |
| 4,547,002 A | 10/1985 | Colgate, Jr. |
| 4,562,342 A | 12/1985 | Solo |

| | | | | | | |
|---|---|---|---|---|---|---|
| 4,563,024 A | | 1/1986 | Blyth | 5,355,411 A | | 10/1994 | MacDonald |
| 4,583,766 A | | 4/1986 | Wessel | 5,371,896 A | | 12/1994 | Gove et al. |
| 4,593,936 A | | 6/1986 | Opel | 5,373,303 A | | 12/1994 | dHont |
| 4,597,814 A | | 7/1986 | Colgate, Jr. | 5,383,687 A | | 1/1995 | Suess et al. |
| 4,639,765 A | | 1/1987 | dHont | 5,407,893 A | | 4/1995 | Koshizuka et al. |
| 4,641,017 A | | 2/1987 | Lopata | 5,408,243 A | | 4/1995 | dHont |
| 4,643,452 A | | 2/1987 | Chang | 5,410,142 A | | 4/1995 | Tsuboi et al. |
| 4,672,021 A | | 6/1987 | Blumel et al. | 5,410,649 A | | 4/1995 | Gove |
| 4,684,795 A | | 8/1987 | Colgate, Jr. | 5,428,363 A | | 6/1995 | dHont |
| 4,692,394 A | | 9/1987 | Drexler | 5,453,747 A | | 9/1995 | dHont et al. |
| 4,694,148 A | | 9/1987 | Diekemper et al. | 5,471,592 A | | 11/1995 | Gove et al. |
| 4,697,073 A | | 9/1987 | Hara | 5,485,510 A | | 1/1996 | Colbert |
| 4,697,363 A | | 10/1987 | Gamm | 5,488,376 A | | 1/1996 | Hurta et al. |
| 4,711,690 A | | 12/1987 | Haghiri Tehrani | 5,489,411 A | | 2/1996 | Jha et al. |
| 4,739,328 A | | 4/1988 | Koelle et al. | 5,489,908 A | | 2/1996 | Orthmann et al. |
| 4,744,497 A | * | 5/1988 | O'Neal ...................... 224/587 | 5,490,079 A | | 2/1996 | Sharpe et al. |
| 4,768,811 A | | 9/1988 | Oshikoshi et al. | 5,491,483 A | | 2/1996 | dHont |
| 4,779,898 A | | 10/1988 | Berning et al. | 5,491,484 A | | 2/1996 | Schuermann |
| 4,794,142 A | | 12/1988 | Alberts et al. | 5,491,715 A | | 2/1996 | Flaxl |
| 4,795,894 A | | 1/1989 | Sugimoto et al. | 5,493,312 A | | 2/1996 | Knebelkamp |
| 4,801,790 A | | 1/1989 | Solo | 5,497,121 A | | 3/1996 | dHont |
| 4,829,690 A | * | 5/1989 | Andros ..................... 40/661.06 | 5,500,651 A | | 3/1996 | Schuermann |
| 4,849,617 A | * | 7/1989 | Ueda .......................... 235/492 | 5,503,434 A | | 4/1996 | Gunn |
| 4,852,911 A | | 8/1989 | Hoppe | 5,513,525 A | | 5/1996 | Schurmann |
| 4,863,819 A | | 9/1989 | Drexler et al. | 5,514,860 A | | 5/1996 | Berson |
| 4,884,507 A | * | 12/1989 | Levy .......................... 102/293 | 5,516,153 A | | 5/1996 | Kaule |
| 4,889,366 A | | 12/1989 | Fabbiani | 5,518,810 A | | 5/1996 | Nishihara et al. |
| 4,897,947 A | | 2/1990 | Kass Pious | 5,519,381 A | | 5/1996 | Marsh et al. |
| 4,917,292 A | | 4/1990 | Drexler | 5,522,083 A | | 5/1996 | Gove et al. |
| 4,937,963 A | | 7/1990 | Barnes | 5,525,992 A | | 6/1996 | Froschermeier |
| D310,386 S | | 9/1990 | Michels et al. | 5,525,994 A | | 6/1996 | Hurta et al. |
| 4,961,142 A | | 10/1990 | Elliott et al. | 5,530,232 A | | 6/1996 | Taylor |
| 5,004,899 A | | 4/1991 | Ueda | 5,533,656 A | * | 7/1996 | Bonaldi ...................... 224/667 |
| 5,007,899 A | | 4/1991 | Larsson | 5,541,604 A | | 7/1996 | Meier |
| 5,010,243 A | | 4/1991 | Fukushima et al. | 5,543,798 A | | 8/1996 | Schuermann |
| 5,023,782 A | | 6/1991 | Lutz et al. | 5,544,246 A | | 8/1996 | Mandelbaum et al. |
| 5,053,774 A | | 10/1991 | Schuermann et al. | 5,548,291 A | | 8/1996 | Meier et al. |
| 5,096,228 A | | 3/1992 | Rinderknecht | 5,550,536 A | | 8/1996 | Flaxl |
| 5,099,226 A | | 3/1992 | Andrews | 5,550,548 A | | 8/1996 | Schuermann |
| 5,101,200 A | | 3/1992 | Swett | 5,552,789 A | | 9/1996 | Schuermann |
| 5,106,125 A | | 4/1992 | Antes | 5,557,279 A | | 9/1996 | dHont |
| 5,111,033 A | | 5/1992 | Fujita et al. | 5,557,516 A | | 9/1996 | Hogan |
| 5,125,356 A | * | 6/1992 | Galante ...................... 116/200 | 5,561,430 A | | 10/1996 | Knebelkamp |
| 5,142,383 A | | 8/1992 | Mallik | 5,563,582 A | | 10/1996 | dHont |
| 5,171,039 A | | 12/1992 | Dusek | 5,569,187 A | | 10/1996 | Kaiser |
| 5,192,947 A | | 3/1993 | Neustein | 5,572,226 A | | 11/1996 | Tuttle |
| 5,197,140 A | | 3/1993 | Balmer | 5,572,815 A | | 11/1996 | Kovner |
| 5,198,647 A | * | 3/1993 | Mizuta ....................... 235/449 | 5,577,109 A | | 11/1996 | Stimson et al. |
| 5,212,777 A | | 5/1993 | Gove et al. | 5,581,630 A | | 12/1996 | Bonneau, Jr. |
| 5,217,844 A | | 6/1993 | Fukushima et al. | 5,592,150 A | | 1/1997 | dHont |
| 5,221,838 A | | 6/1993 | Gutman et al. | 5,592,405 A | | 1/1997 | Gove et al. |
| 5,222,282 A | | 6/1993 | Sukonnik et al. | 5,592,767 A | * | 1/1997 | Treske ......................... 40/649 |
| 5,226,989 A | | 7/1993 | Sukonnik | 5,594,233 A | | 1/1997 | Kenneth et al. |
| 5,234,624 A | | 8/1993 | Bauer et al. ................... 264/21 | 5,594,448 A | | 1/1997 | dHont |
| 5,239,654 A | | 8/1993 | IngSimmons et al. | 5,597,534 A | | 1/1997 | Kaiser |
| 5,247,304 A | | 9/1993 | dHont | 5,600,175 A | | 2/1997 | Orthmann |
| 5,251,937 A | | 10/1993 | Ojster | 5,602,538 A | | 2/1997 | Orthmann et al. |
| 5,256,473 A | | 10/1993 | Kotani et al. | 5,602,919 A | | 2/1997 | Hurta et al. |
| 5,257,656 A | * | 11/1993 | McLeroy ..................... 150/132 | 5,604,342 A | | 2/1997 | Fujioka |
| 5,272,326 A | | 12/1993 | Fujita et al. | 5,606,520 A | | 2/1997 | Gove et al. |
| 5,274,392 A | | 12/1993 | dHont et al. | 5,606,594 A | | 2/1997 | Register et al. |
| 5,285,100 A | | 2/1994 | Byatt | 5,607,522 A | | 3/1997 | McDonnell |
| 5,300,764 A | | 4/1994 | Hoshino et al. | 5,608,203 A | | 3/1997 | Finkelstein et al. |
| 5,304,789 A | | 4/1994 | Lob et al. | 5,608,406 A | | 3/1997 | Eberth et al. |
| 5,305,002 A | | 4/1994 | Holodak et al. | 5,608,778 A | | 3/1997 | Partridge, III |
| 5,308,121 A | | 5/1994 | Gunn | 5,613,146 A | | 3/1997 | Gove et al. |
| 5,311,679 A | | 5/1994 | Birch, Sr. | 5,619,207 A | | 4/1997 | dHont |
| 5,329,617 A | | 7/1994 | Asal | 5,621,396 A | | 4/1997 | Flaxl |
| 5,331,138 A | | 7/1994 | Saroya | 5,621,411 A | | 4/1997 | Hagl et al. |
| 5,339,447 A | | 8/1994 | Balmer | 5,621,412 A | | 4/1997 | Sharpe et al. |
| 5,349,357 A | | 9/1994 | Schurmann et al. | 5,625,366 A | | 4/1997 | dHont |
| 5,351,052 A | | 9/1994 | dHont et al. | 5,625,370 A | | 4/1997 | dHont |
| 5,351,142 A | | 9/1994 | Cueli | 5,625,695 A | | 4/1997 | MRaihi et al. |

| | | | | | | |
|---|---|---|---|---|---|---|
| 5,629,981 A | 5/1997 | Nerlikar | | 5,870,915 A | 2/1999 | dHont |
| 5,638,080 A | 6/1997 | Orthmann et al. | | D406,861 S | 3/1999 | Leedy, Jr. |
| 5,640,002 A | 6/1997 | Ruppert et al. | | 5,878,215 A | 3/1999 | Kling et al. |
| 5,646,607 A | 7/1997 | Schurmann et al. | | 5,878,403 A | 3/1999 | DeFrancesco et al. |
| 5,657,388 A | 8/1997 | Weiss | | 5,880,675 A | 3/1999 | Trautner |
| 5,660,319 A | 8/1997 | Falcone et al. | | 5,881,272 A | 3/1999 | Balmer |
| 5,665,439 A | 9/1997 | Andersen et al. | | 5,886,333 A | 3/1999 | Miyake |
| 5,673,106 A | 9/1997 | Thompson | | 5,887,266 A | 3/1999 | Heinonen et al. |
| D384,971 S | 10/1997 | Kawan | | 5,890,137 A | 3/1999 | Koreeda |
| 5,675,342 A | 10/1997 | Sharpe | | D408,054 S | 4/1999 | Leedy, Jr. |
| 5,686,920 A | 11/1997 | Hurta et al. | | 5,898,783 A | 4/1999 | Rohrbach |
| 5,691,731 A | 11/1997 | vanErven | | 5,900,954 A | 5/1999 | Katz et al. |
| 5,692,132 A | 11/1997 | Hogan | | 5,903,830 A | 5/1999 | Joao et al. |
| 5,696,913 A | 12/1997 | Gove et al. | | 5,905,798 A | 5/1999 | Nerlikar et al. |
| 5,697,649 A | 12/1997 | Dames et al. | | 5,912,678 A | 6/1999 | Saxena et al. |
| 5,698,837 A | 12/1997 | Furuta | | 5,917,168 A * | 6/1999 | Nakamura et al. .......... 235/379 |
| 5,699,528 A | 12/1997 | Hogan | | 5,920,628 A | 7/1999 | Indeck et al. |
| 5,700,037 A * | 12/1997 | Keller ........................ 283/107 | | 5,928,788 A | 7/1999 | Riedl |
| 5,701,127 A | 12/1997 | Sharpe | | 5,929,801 A | 7/1999 | Aslanidis et al. |
| 5,704,046 A | 12/1997 | Hogan | | 5,931,917 A | 8/1999 | Nguyen et al. |
| 5,705,798 A | 1/1998 | Tarbox | | 5,932,870 A | 8/1999 | Berson |
| 5,710,421 A * | 1/1998 | Kokubu ...................... 235/492 | | 5,933,624 A | 8/1999 | Balmer |
| 5,720,500 A | 2/1998 | Okazaki et al. | | 5,936,227 A | 8/1999 | Truggelmann et al. |
| 5,721,781 A | 2/1998 | Deo et al. | | 5,943,624 A | 8/1999 | Fox et al. |
| 5,725,098 A * | 3/1998 | Seifert et al. ............... 206/472 | | 5,948,116 A | 9/1999 | Aslanidis et al. |
| 5,729,053 A | 3/1998 | Orthmann | | 5,953,512 A | 9/1999 | Cai et al. |
| 5,729,236 A | 3/1998 | Flaxl | | 5,955,717 A | 9/1999 | Vanstone |
| 5,731,957 A | 3/1998 | Brennan | | 5,955,969 A | 9/1999 | dHont |
| 5,732,579 A | 3/1998 | dHont et al. | | 5,956,024 A | 9/1999 | Strickland et al. |
| 5,748,137 A | 5/1998 | dHont | | 5,963,924 A | 10/1999 | Williams et al. |
| 5,748,737 A | 5/1998 | Daggar | | 5,968,570 A | 10/1999 | Paulucci |
| 5,758,195 A | 5/1998 | Balmer | | 5,970,148 A | 10/1999 | Meier |
| 5,761,306 A | 6/1998 | Lewis | | 5,971,276 A | 10/1999 | Sano et al. |
| 5,761,493 A | 6/1998 | Blakeley et al. | | RE36,365 E | 11/1999 | Levine et al. |
| 5,768,609 A | 6/1998 | Gove et al. | | 5,978,348 A | 11/1999 | Tamura |
| 5,774,882 A | 6/1998 | Keen et al. | | 5,978,840 A | 11/1999 | Nguyen et al. |
| 5,777,903 A | 7/1998 | Piosenka | | 5,983,208 A | 11/1999 | Haller |
| 5,778,067 A | 7/1998 | Jones et al. | | 5,987,140 A | 11/1999 | Rowney et al. |
| 5,785,680 A | 7/1998 | Niezink et al. | | 5,987,155 A | 11/1999 | Dunn et al. |
| 5,786,587 A | 7/1998 | Colgate, Jr. | | 5,987,498 A | 11/1999 | Athing et al. |
| 5,789,733 A | 8/1998 | Jachimowicz | | 5,989,950 A | 11/1999 | Wu |
| 5,791,474 A | 8/1998 | Hansen | | 5,991,608 A | 11/1999 | Leyten |
| 5,792,337 A | 8/1998 | Padovani et al. | | 5,991,750 A | 11/1999 | Watson |
| 5,793,324 A | 8/1998 | Aslanidis et al. | | 5,996,076 A | 11/1999 | Rowney et al. |
| 5,794,095 A | 8/1998 | Thompson | | 6,002,438 A | 12/1999 | Hocevar et al. |
| 5,797,060 A | 8/1998 | Thompson | | 6,002,767 A | 12/1999 | Kramer |
| 5,797,085 A | 8/1998 | Buek et al. | | 6,003,014 A | 12/1999 | Lee et al. |
| 5,797,133 A | 8/1998 | Jones et al. | | 6,005,942 A | 12/1999 | Chan et al. |
| 5,798,709 A | 8/1998 | Flaxl | | 6,006,216 A | 12/1999 | Griffin et al. |
| 5,808,758 A | 9/1998 | Solmsdorf | | 6,006,988 A | 12/1999 | Behrmann et al. |
| 5,809,142 A | 9/1998 | Hurta et al. | | 6,012,049 A | 1/2000 | Kawan |
| 5,809,288 A | 9/1998 | Balmer | | 6,014,645 A | 1/2000 | Cunningham |
| 5,809,633 A | 9/1998 | Mundigl et al. | | 6,018,717 A | 1/2000 | Lee et al. |
| 5,825,007 A | 10/1998 | Jesadanont | | 6,024,286 A * | 2/2000 | Bradley et al. ............. 235/492 |
| 5,825,302 A | 10/1998 | Stafford | | 6,024,385 A | 2/2000 | Goda |
| 5,826,077 A | 10/1998 | Blakeley et al. | | 6,029,149 A | 2/2000 | Dykstra et al. |
| 5,828,044 A | 10/1998 | Jun et al. | | 6,038,584 A | 3/2000 | Balmer |
| 5,834,756 A | 11/1998 | Gutman et al. | | 6,047,888 A | 4/2000 | Dethloff |
| 5,841,364 A | 11/1998 | Hagl et al. | | 6,050,605 A | 4/2000 | Mikelionis et al. |
| 5,842,088 A | 11/1998 | Thompson | | 6,052,675 A | 4/2000 | Checchio |
| 5,844,218 A | 12/1998 | Kawan et al. | | 6,064,320 A | 5/2000 | dHont et al. |
| 5,844,230 A | 12/1998 | Lalonde | | 6,068,193 A * | 5/2000 | Kreft ........................... 235/492 |
| 5,845,267 A | 12/1998 | Ronen | | 6,070,003 A | 5/2000 | Gove et al. |
| 5,851,149 A | 12/1998 | Xidos et al. | | 6,072,870 A | 6/2000 | Nguyen et al. |
| 5,854,891 A | 12/1998 | Postlewaite et al. | | 6,073,840 A | 6/2000 | Marion |
| 5,856,048 A | 1/1999 | Tahara et al. | | 6,076,296 A * | 6/2000 | Schaeffer ................. 40/661.12 |
| 5,857,709 A | 1/1999 | Chock | | 6,078,888 A | 6/2000 | Johnson, Jr. |
| 5,858,006 A | 1/1999 | Van der AA et al. | | RE36,788 E | 7/2000 | Mansvelt et al. |
| 5,859,779 A | 1/1999 | Giordano et al. | | 6,082,422 A | 7/2000 | Kaminski |
| 5,864,323 A | 1/1999 | Berthon | | 6,086,971 A | 7/2000 | Haas et al. |
| 5,865,470 A | 2/1999 | Thompson | | 6,088,686 A | 7/2000 | Walker et al. |
| 5,867,100 A | 2/1999 | dHont | | 6,092,057 A | 7/2000 | Zimmerman et al. |
| 5,870,031 A | 2/1999 | Kaiser et al. | | 6,101,174 A | 8/2000 | Langston |

| Patent No. | Date | Name |
|---|---|---|
| 6,102,162 A | 8/2000 | Teicher |
| 6,102,672 A | 8/2000 | Woollenweber |
| 6,105,008 A | 8/2000 | Davis et al. |
| 6,105,013 A | 8/2000 | Curry et al. |
| 6,105,865 A | 8/2000 | Hardesty |
| 6,109,525 A | 8/2000 | Blomqvist et al. |
| 6,112,152 A | 8/2000 | Tuttle |
| 6,115,360 A | 9/2000 | Quay et al. |
| 6,116,423 A | 9/2000 | Troxtell, Jr. et al. |
| 6,116,505 A | 9/2000 | Withrow |
| 6,116,655 A | 9/2000 | Thouin et al. |
| 6,118,189 A | 9/2000 | Flaxl |
| 6,121,544 A | 9/2000 | Petsinger |
| 6,123,223 A | 9/2000 | Watkins |
| D432,939 S | 10/2000 | Hooglander |
| 6,128,604 A | 10/2000 | Sakamaki et al. |
| 6,129,274 A | 10/2000 | Suzuki |
| 6,133,834 A | 10/2000 | Eberth et al. |
| 6,138,913 A | 10/2000 | Cyr et al. |
| 6,138,917 A * | 10/2000 | Chapin, Jr. ............... 235/487 |
| 6,141,651 A | 10/2000 | Riley et al. |
| 6,155,168 A | 12/2000 | Sakamoto |
| 6,167,236 A | 12/2000 | Kaiser et al. |
| 6,177,860 B1 | 1/2001 | Cromer et al. |
| 6,179,205 B1 | 1/2001 | Sloan |
| 6,179,206 B1 | 1/2001 | Matsumori |
| 6,184,788 B1 | 2/2001 | Middlemiss et al. |
| 6,188,994 B1 | 2/2001 | Egendorf |
| 6,192,255 B1 | 2/2001 | Lewis et al. |
| 6,196,465 B1 | 3/2001 | Awano |
| 6,197,396 B1 | 3/2001 | Haas et al. |
| 6,198,728 B1 | 3/2001 | Hulyalkar et al. |
| 6,198,875 B1 | 3/2001 | Edenson et al. |
| 6,202,927 B1 | 3/2001 | Bashan et al. |
| 6,205,151 B1 | 3/2001 | Quay et al. |
| 6,206,293 B1 | 3/2001 | Gutman et al. |
| 6,213,391 B1 * | 4/2001 | Lewis ....................... 235/380 |
| 6,215,437 B1 | 4/2001 | Schurmann et al. |
| 6,216,219 B1 | 4/2001 | Cai et al. |
| 6,219,439 B1 | 4/2001 | Burger |
| D442,627 S | 5/2001 | Webb et al. |
| D442,629 S | 5/2001 | Webb et al. |
| 6,223,984 B1 | 5/2001 | Renner et al. |
| 6,226,382 B1 | 5/2001 | MRaihi et al. |
| 6,230,270 B1 | 5/2001 | Laczko, Sr. |
| 6,232,917 B1 | 5/2001 | Baumer et al. |
| 6,233,683 B1 | 5/2001 | Chan et al. |
| 6,237,848 B1 | 5/2001 | Everett |
| 6,239,675 B1 | 5/2001 | Flaxl |
| 6,240,187 B1 | 5/2001 | Lewis |
| 6,240,989 B1 * | 6/2001 | Masoud ..................... 150/149 |
| 6,248,314 B1 | 6/2001 | Nakashimada et al. |
| 6,255,031 B1 | 7/2001 | Yao et al. |
| 6,257,486 B1 | 7/2001 | Teicher et al. |
| 6,259,769 B1 | 7/2001 | Page |
| 6,260,026 B1 | 7/2001 | Tomida et al. |
| 6,260,088 B1 | 7/2001 | Gove et al. |
| 6,264,106 B1 | 7/2001 | Bridgelall |
| 6,266,754 B1 | 7/2001 | Laczko, Sr. et al. |
| 6,273,335 B1 | 8/2001 | Sloan |
| 6,277,232 B1 | 8/2001 | Wang et al. |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,290,137 B1 | 9/2001 | Kiekhaefer |
| 6,296,188 B1 | 10/2001 | Kiekhaefer |
| 6,315,193 B1 | 11/2001 | Hogan |
| 6,315,206 B1 | 11/2001 | Hansen et al. |
| 6,317,721 B1 | 11/2001 | Hurta et al. |
| 6,318,636 B1 | 11/2001 | Reynolds et al. |
| 6,323,566 B1 | 11/2001 | Meier |
| 6,325,285 B1 * | 12/2001 | Baratelli ..................... 235/380 |
| 6,326,934 B1 | 12/2001 | Kinzie |
| D453,160 S | 1/2002 | Pentz et al. |
| D453,161 S | 1/2002 | Pentz |
| 6,342,844 B1 | 1/2002 | Rozin |
| D453,337 S | 2/2002 | Pentz et al. |
| D453,338 S | 2/2002 | Pentz et al. |
| D453,516 S | 2/2002 | Pentz |
| D454,910 S | 3/2002 | Smith et al. |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| D457,556 S | 5/2002 | Hochschild |
| 6,388,533 B1 | 5/2002 | Swoboda |
| 6,390,375 B1 | 5/2002 | Kayanakis |
| 6,400,272 B1 | 6/2002 | Holtzman et al. |
| 6,402,028 B1 | 6/2002 | Graham, Jr. et al. |
| 6,411,611 B1 | 6/2002 | Van der Tuijn |
| D460,455 S | 7/2002 | Pentz |
| 6,415,978 B1 | 7/2002 | McAllister |
| 6,419,158 B1 | 7/2002 | Hooglander |
| 6,422,464 B1 | 7/2002 | Terranova |
| 6,424,029 B1 | 7/2002 | Giesler |
| D461,477 S | 8/2002 | Pentz |
| 6,442,532 B1 | 8/2002 | Kawan |
| D462,965 S | 9/2002 | Pentz |
| D462,966 S | 9/2002 | Pentz et al. |
| 6,457,996 B1 | 10/2002 | Shih |
| 6,460,696 B1 | 10/2002 | Meyer |
| 6,466,804 B1 | 10/2002 | Pecen et al. |
| 6,471,127 B1 * | 10/2002 | Pentz et al. ................. 235/487 |
| 6,473,500 B1 | 10/2002 | Risafi et al. |
| 6,480,100 B1 | 11/2002 | Frieden et al. |
| 6,480,101 B1 | 11/2002 | Kelly et al. |
| 6,481,621 B1 | 11/2002 | Herrendoerfer et al. |
| 6,481,632 B1 | 11/2002 | Wentker et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,380 B1 | 12/2002 | Jarosz |
| 6,507,762 B1 | 1/2003 | Amro et al. |
| 6,510,983 B1 | 1/2003 | Horowitz et al. |
| 6,510,998 B1 | 1/2003 | Stanford et al. |
| 6,513,015 B1 | 1/2003 | Ogasawara |
| 6,523,292 B1 | 2/2003 | Slavik |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| D474,234 S | 5/2003 | Nelms et al. |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,588,660 B1 | 7/2003 | Buescher et al. |
| 6,589,119 B1 | 7/2003 | Orus et al. |
| 6,608,995 B1 | 8/2003 | Kawasaki et al. |
| 6,609,655 B1 | 8/2003 | Harrell |
| 6,626,356 B1 | 9/2003 | Davenport et al. |
| 6,628,961 B1 | 9/2003 | Ho et al. |
| 6,631,849 B1 * | 10/2003 | Blossom ..................... 235/492 |
| 6,650,887 B1 | 11/2003 | McGregor et al. |
| 6,651,813 B1 | 11/2003 | Vallans et al. |
| 6,651,892 B1 | 11/2003 | Hooglander |
| 6,665,405 B1 | 12/2003 | Lenstra |
| 6,674,786 B1 | 1/2004 | Nakamura et al. |
| 6,679,427 B1 | 1/2004 | Kuroiwa |
| 6,684,269 B1 | 1/2004 | Wagner |
| 6,687,714 B1 | 2/2004 | Kogen et al. |
| 6,690,930 B1 | 2/2004 | Dupre |
| 6,693,513 B1 | 2/2004 | Tuttle |
| 6,705,530 B1 | 3/2004 | Kiekhaefer |

| | | |
|---|---|---|
| 6,708,375 B1 * | 3/2004 | Johnson .................. 24/17 A |
| 6,711,262 B1 | 3/2004 | Watanen |
| 6,732,936 B1 * | 5/2004 | Kiekhaefer ................ 235/487 |
| 6,735,081 B1 | 5/2004 | Bishop et al. |
| 6,742,120 B1 | 5/2004 | Markakis et al. |
| 6,760,581 B1 | 7/2004 | Dutta |
| 6,766,952 B1 | 7/2004 | Luu |
| 6,789,012 B1 | 9/2004 | Childs et al. |
| 6,793,141 B1 * | 9/2004 | Graham .................. 235/487 |
| 6,830,193 B1 * | 12/2004 | Tanaka .................. 235/492 |
| 2001/0013542 A1 | 8/2001 | Horowitz et al. |
| 2001/0022446 A1 | 9/2001 | Klure |
| 2001/0024157 A1 | 9/2001 | Hansmann et al. |
| 2001/0030238 A1 * | 10/2001 | Arisawa .................. 235/492 |
| 2001/0034565 A1 | 10/2001 | Leatherman |
| 2001/0039617 A1 | 11/2001 | Buhrlen et al. |
| 2001/0045469 A1 | 11/2001 | Hooglander |
| 2002/0011519 A1 | 1/2002 | Shults |
| 2002/0028704 A1 | 3/2002 | Bloomfield et al. |
| 2002/0035548 A1 | 3/2002 | Hogan et al. |
| 2002/0040935 A1 * | 4/2002 | Weyant .................. 235/487 |
| 2002/0041093 A1 | 4/2002 | Cox et al. |
| 2002/0052839 A1 | 5/2002 | Takatori |
| 2002/0062284 A1 | 5/2002 | Kawan |
| 2002/0074398 A1 | 6/2002 | Lancos et al. |
| 2002/0077837 A1 | 6/2002 | Krueger et al. |
| 2002/0077895 A1 | 6/2002 | Howell |
| 2002/0077992 A1 | 6/2002 | Tobin |
| 2002/0079367 A1 | 6/2002 | Montani |
| 2002/0092914 A1 | 7/2002 | Pentz et al. |
| 2002/0095343 A1 | 7/2002 | Barton et al. |
| 2002/0095389 A1 | 7/2002 | Gaines |
| 2002/0095587 A1 | 7/2002 | Doyle et al. |
| 2002/0097144 A1 | 7/2002 | Collins et al. |
| 2002/0107007 A1 | 8/2002 | Gerson |
| 2002/0107742 A1 | 8/2002 | Magill |
| 2002/0109580 A1 | 8/2002 | Shreve et al. |
| 2002/0111210 A1 | 8/2002 | Luciano, Jr. et al. |
| 2002/0113082 A1 | 8/2002 | Leatherman et al. |
| 2002/0116274 A1 | 8/2002 | Hind et al. |
| 2002/0120584 A1 | 8/2002 | Hogan et al. |
| 2002/0126010 A1 | 9/2002 | Trimble et al. |
| 2002/0131567 A1 | 9/2002 | Maginas |
| 2002/0138438 A1 | 9/2002 | Bardwell |
| 2002/0140542 A1 | 10/2002 | Prokoski et al. |
| 2002/0145043 A1 | 10/2002 | Challa et al. |
| 2002/0147913 A1 | 10/2002 | Lun Yip |
| 2002/0148892 A1 | 10/2002 | Bardwell |
| 2002/0152123 A1 | 10/2002 | Giordano et al. |
| 2002/0166891 A1 | 11/2002 | Stoutenburg et al. |
| 2002/0166897 A1 | 11/2002 | Hooglander |
| 2002/0176522 A1 | 11/2002 | Fan |
| 2002/0178063 A1 | 11/2002 | Gravelle et al. |
| 2002/0178369 A1 | 11/2002 | Black |
| 2002/0185543 A1 | 12/2002 | Pentz et al. |
| 2002/0188501 A1 | 12/2002 | Lefkowith |
| 2002/0190125 A1 | 12/2002 | Stockhammer |
| 2002/0194303 A1 | 12/2002 | Suila et al. |
| 2002/0194503 A1 | 12/2002 | Faith et al. |
| 2002/0196963 A1 | 12/2002 | Bardwell |
| 2003/0009382 A1 | 1/2003 | DArbelott et al. |
| 2003/0014307 A1 | 1/2003 | Heng |
| 2003/0014357 A1 | 1/2003 | Chrisekos et al. |
| 2003/0014891 A1 * | 1/2003 | Nelms et al. ............. 40/649 |
| 2003/0018532 A1 | 1/2003 | Dudek et al. |
| 2003/0025600 A1 | 2/2003 | Blanchard |
| 2003/0033697 A1 * | 2/2003 | Hicks et al. ............. 24/615 |
| 2003/0037851 A1 * | 2/2003 | Hogganvik ............. 150/147 |
| 2003/0046228 A1 | 3/2003 | Berney |
| 2003/0047482 A1 | 3/2003 | Jonex et al. |
| 2003/0057226 A1 | 3/2003 | Long |
| 2003/0057278 A1 | 3/2003 | Wong |
| 2003/0069846 A1 | 4/2003 | Marcon |
| 2003/0112972 A1 | 6/2003 | Hattick et al. |
| 2003/0120554 A1 | 6/2003 | Hogan et al. |
| 2003/0121969 A1 | 7/2003 | Wankmueller |
| 2003/0132284 A1 | 7/2003 | Reynolds et al. |
| 2003/0140228 A1 | 7/2003 | Binder |
| 2003/0160074 A1 * | 8/2003 | Pineda .................. 223/81 |
| 2003/0163699 A1 | 8/2003 | Pailles et al. |
| 2003/0167207 A1 | 9/2003 | Berardi et al. |
| 2003/0177347 A1 | 9/2003 | Schneier et al. |
| 2003/0183689 A1 | 10/2003 | Swift et al. |
| 2003/0183699 A1 | 10/2003 | Masui |
| 2003/0187786 A1 | 10/2003 | Swift et al. |
| 2003/0187787 A1 | 10/2003 | Freund |
| 2003/0187790 A1 | 10/2003 | Swift et al. |
| 2003/0187796 A1 | 10/2003 | Swift et al. |
| 2003/0195842 A1 | 10/2003 | Reece |
| 2003/0195843 A1 | 10/2003 | Matsuda et al. |
| 2003/0200184 A1 | 10/2003 | Dominguez et al. |
| 2003/0218066 A1 | 11/2003 | Fernandes et al. |
| 2003/0220876 A1 | 11/2003 | Burger et al. |
| 2003/0222153 A1 | 12/2003 | Pentz et al. |
| 2003/0225623 A1 | 12/2003 | Wankmueller |
| 2003/0225713 A1 | 12/2003 | Atkinson et al. |
| 2003/0227550 A1 | 12/2003 | Manico et al. |
| 2003/0230514 A1 * | 12/2003 | Baker .................. 206/732 |
| 2003/0233334 A1 | 12/2003 | Smith |
| 2004/0010462 A1 | 1/2004 | Moon et al. |
| 2004/0011877 A1 * | 1/2004 | Reppermund ............. 235/493 |
| 2004/0015451 A1 | 1/2004 | Sahota et al. |
| 2004/0026518 A1 * | 2/2004 | Kudo et al. .............. 235/492 |
| 2004/0029569 A1 | 2/2004 | Khan et al. |
| 2004/0039860 A1 | 2/2004 | Mills et al. |
| 2004/0089724 A1 | 5/2004 | Lasch et al. |
| 2004/0139021 A1 | 7/2004 | Reed et al. |
| 2004/0144846 A1 | 7/2004 | Lasch et al. |
| 2005/0023157 A1 * | 2/2005 | Logan .................. 206/37 |
| 2005/0122209 A1 * | 6/2005 | Black .................. 340/5.52 |

FOREIGN PATENT DOCUMENTS

| | | |
|---|---|---|
| CH | 689070 | 8/1998 |
| CH | 689680 | 8/1999 |
| DE | 2847756 | 5/1980 |
| EP | 018770 | 5/1986 |
| EP | 0354817 | 2/1990 |
| EP | 0 358 525 A2 | 3/1990 |
| EP | 0368570 | 5/1990 |
| EP | 0388090 | 9/1990 |
| EP | 0 424 726 A1 | 10/1990 |
| EP | 0403134 | 12/1990 |
| EP | 0411602 | 2/1991 |
| EP | 0473998 | 3/1992 |
| EP | 0481388 | 4/1992 |
| EP | 0531605 | 3/1993 |
| EP | 0552047 | 7/1993 |
| EP | 0560318 | 9/1993 |
| EP | 0568185 | 11/1993 |
| EP | 0657297 | 6/1995 |
| EP | 0721850 | 7/1996 |
| EP | 0780839 | 6/1997 |
| EP | 0789316 | 8/1997 |
| EP | 0894620 | 2/1999 |
| EP | 0916519 | 5/1999 |
| EP | 0 933 717 A2 | 8/1999 |
| EP | 0 956 818 A1 | 11/1999 |
| EP | 0 959 440 A2 | 11/1999 |
| EP | 0 984 404 A2 | 3/2000 |
| EP | 1 016 947 A2 | 7/2000 |
| EP | 1 039 403 A2 | 9/2000 |
| EP | 1 104 909 A2 | 6/2001 |
| EP | 1 113 387 A2 | 7/2001 |
| EP | 1 199 684 A2 | 4/2002 |
| EP | 1 251 450 A1 | 10/2002 |

| | | |
|---|---|---|
| GB | 1371254 | 10/1974 |
| GB | 2108906 | 5/1983 |
| GB | 2240948 | 8/1991 |
| GB | 2347537 | 9/2000 |
| JP | 62-264999 | 11/1987 |
| JP | 63-071794 | 4/1988 |
| JP | 63-098689 | 4/1988 |
| JP | 63-072721 | 5/1988 |
| JP | 63-175987 | 7/1988 |
| JP | 64-4934 | 1/1989 |
| JP | 64-087395 | 3/1989 |
| JP | 64-087396 | 3/1989 |
| JP | 64-087397 | 3/1989 |
| JP | 62-43774 | 2/1990 |
| JP | 02-130737 | 5/1990 |
| JP | 02-252149 | 10/1990 |
| JP | 03-290780 | 12/1991 |
| JP | 04-303692 | 10/1992 |
| JP | 05-069689 | 3/1993 |
| JP | 05-254283 | 10/1993 |
| JP | 06-183187 | 7/1994 |
| JP | 06-191137 | 7/1994 |
| JP | 06-234287 | 8/1994 |
| JP | 07-173358 | 7/1995 |
| JP | 07-205569 | 8/1995 |
| JP | 09-052240 | 2/1997 |
| JP | 09-274640 | 10/1997 |
| JP | 10-129161 | 5/1998 |
| JP | 11-227367 | 8/1999 |
| JP | 2000-1109 A | 1/2000 |
| JP | 2000-015288 A | 1/2000 |
| JP | 2000-40181 A | 2/2000 |
| JP | 2000-67312 A | 3/2000 |
| JP | 2000-177229 | 6/2000 |
| JP | 2000-207641 A | 7/2000 |
| JP | 2001-5931 A | 1/2001 |
| JP | 2001-504406 | 4/2001 |
| JP | 2001-283122 A | 10/2001 |
| JP | 2001-315475 | 11/2001 |
| JP | 2002-274087 | 9/2002 |
| WO | WO 81/00776 | 3/1981 |
| WO | WO 89/03760 | 5/1989 |
| WO | WO 90/08661 | 8/1990 |
| WO | WO 92/16913 | 10/1992 |
| WO | WO 95/32919 | 12/1995 |
| WO | WO 96/18972 | 6/1996 |
| WO | WO 99/03057 A1 | 1/1999 |
| WO | WO 99/14055 | 3/1999 |
| WO | WO 99/47983 | 9/1999 |
| WO | WO 00/10144 A1 | 2/2000 |
| WO | WO 00/38088 A1 | 6/2000 |
| WO | WO 00/73989 | 12/2000 |
| WO | WO 01/04825 A1 | 1/2001 |
| WO | WO 01/13320 | 2/2001 |
| WO | WO 01/15098 A1 | 3/2001 |
| WO | WO 01/43095 A2 | 6/2001 |
| WO | WO 01/72224 A1 | 10/2001 |
| WO | WO 01/77856 A1 | 10/2001 |
| WO | WO 01/80473 A2 | 10/2001 |
| WO | WO 01/86535 A1 | 11/2001 |
| WO | WO 01/90962 A1 | 11/2001 |
| WO | WO 01/95243 A2 | 12/2001 |
| WO | WO 02/01485 A1 | 1/2002 |
| WO | WO 02/13134 A2 | 2/2002 |
| WO | WO 02/063545 A2 | 8/2002 |
| WO | WO 02/065246 A2 | 8/2002 |
| WO | WO 02/065404 A2 | 8/2002 |
| WO | WO 02/067190 | 8/2002 |
| WO | WO 02/069221 A1 | 9/2002 |
| WO | WO 02/073512 A1 | 9/2002 |
| WO | WO 02/086665 | 10/2002 |
| WO | WO 02/091281 | 11/2002 |
| WO | WO 02/97575 | 12/2002 |
| WO | WO 02/101670 | 12/2002 |
| WO | WO 03/007623 | 1/2003 |

OTHER PUBLICATIONS

"What's New: Timex Watch Features Speedpass System", http://www.speedpass.com/news/article.jsp?id=51 (1 page).

"Physical Reality: A Second Look", Ken Sharp, Senior Technical Editor http://www.idsystems.com/reader/1999_03/phys0399_pt2/phys0399_pt2.htm (6 pages).

"'Magic Wands' to Speed Mobile Sales", BobBrewin, Jan. 15, 2001, http://www.computerworld.com/mobiletopics/mobile/story/1,10801,563300.html (4 pages).

"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).

"Speedpass Unleashed", Jun. 4, 2002 http://www.cardweb.com/cardtrak/news/cf2_20a_97.html (2 pages).

Prophecy Central Update #9, Oct. 10, 1997, http://www.bible-propecy.com/pcu9.htm (5 pages).

International Newsletter of the TI RFID Group, Issue 20, 2000 (12 pages).

"CES: Microsoft's SPOT Technology has Humble Origins", by James Niccolai, Jan. 10, 2003, http://archive.infoworld.com/articles/hn/xml/03/01/10/030110hnspot.xml?s=IDGNS (3 pages).

"Microsoft: See SPOT Run On Your Wrist", by Richard Shim, Jun. 5, 2003, http://news.com.com/2100-1041_3-1013442.html?tag=fd_top (1 page).

"Networking: Microsoft SPOT", by Jeremy A. Kaplan, Jul. 1, 2003, http://www.pcmag.com/print_article/0,3048,a=43561,00.asp (2 pages).

"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).

"Bank Extends RFID Payment Pilot: Bank of America will continue to test its QuickWave RFID payment card for another three months", RFID Journal, Jan. 23, 2003.

"MasterCard to Test RFID Card: Pilot will test whether consumers, merchants and credit card issuers value "contactless" payments", RFID Journal, Dec. 20, 2002.

"Vendors Target Amusement Parks: Protecting children and enabling cashless payments make RFID an appealing option for the entertainment industry", RFID Journal, Nov. 27, 2002.

"Inside's Next-Gen Smart Card: The French company plans to introduce an RFID card that uses a 16-bit microprocessor and new encryption technology", RFID Journal, Oct. 29, 2002.

"Sony, Philips Creating RFID Link: Consumer electronics giants are jointly developing a new RFID standard for payments and for communication between devices", RFID Journal, Sep. 17, 2002.

"Japan Gets Digital Ticket System: A natinal ticket seller and phone company are teaming up to create an electronic ticket", RFID Journal, Sep. 31, 2002.

"Security for Wireless Java: NTRU, a startup that offers security software, has relased of Java version of its NTRU encryption algorithm", RFID Journal, Jun. 27, 2002.

"Making RFID Payments Ubiquitous: Philips and Visa want people to be able to pay for goods and services anywhere by using RFID chips embedded in the phones and other devices", RFID Journal, Jun. 2, 2003.

"RFID Smart Cards Gain Ground: The convenience of contactless transactions is driving widespread adoption of contactless smart cards", RFID Journal, Apr. 9, 2003.

"TI Embraces Prox Card Standard: Texas Instuments ISO 14443 payment platform promises faster data transfer rates and more security", RFID Journal, Mar. 6, 2003.

"Multiple Frequency Transponders: Volume production of dual-band RFID chips begins", Frontline Solutions, Jul. 16, 2003.

Functional Specification, Standard Card IC MF1 IC S50, Philips Semiconductors, Product Specification Rev. 5.1 May 2001.

* cited by examiner

*Primary Examiner*—Ahshik Kim
*Assistant Examiner*—Daniel Walsh
(74) *Attorney, Agent, or Firm*—Fitzpatrick, Cella, Harper & Scinto

(57) ABSTRACT

Transaction cards having one or more folds therein for compact and easily stored fobs are provided. Moreover, foldable fobs are provided having one or more holes or apertures therein for holding key chains, or other devices for attaching the fobs to other items, such as sets of keys, wallets, or other items. Other embodiments include spring-loaded clips on the foldable fobs and protective sleeves, housings or cases for full-sized and smaller-sized cards. Still further, fob systems are provided comprising a case or housing for holding and/or storing foldable fobs therein, such as foldable fobs having a dimension, such as a length dimension or a width dimension, that is smaller than traditional-sized fobs.

45 Claims, 33 Drawing Sheets

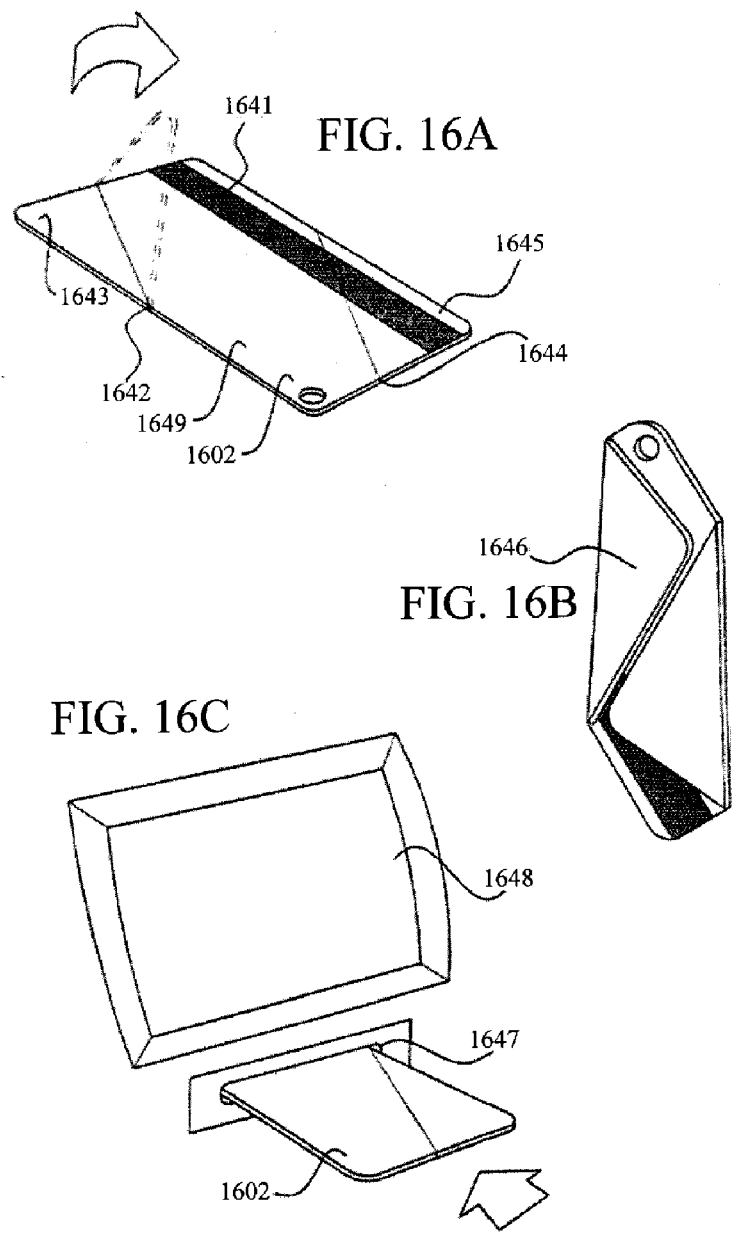

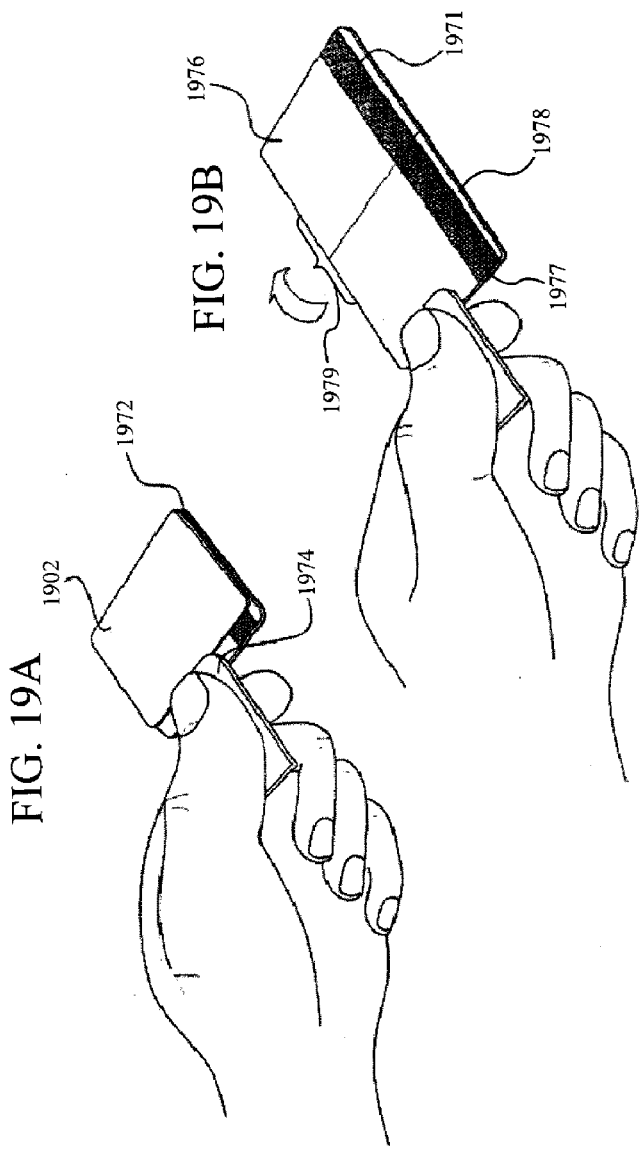

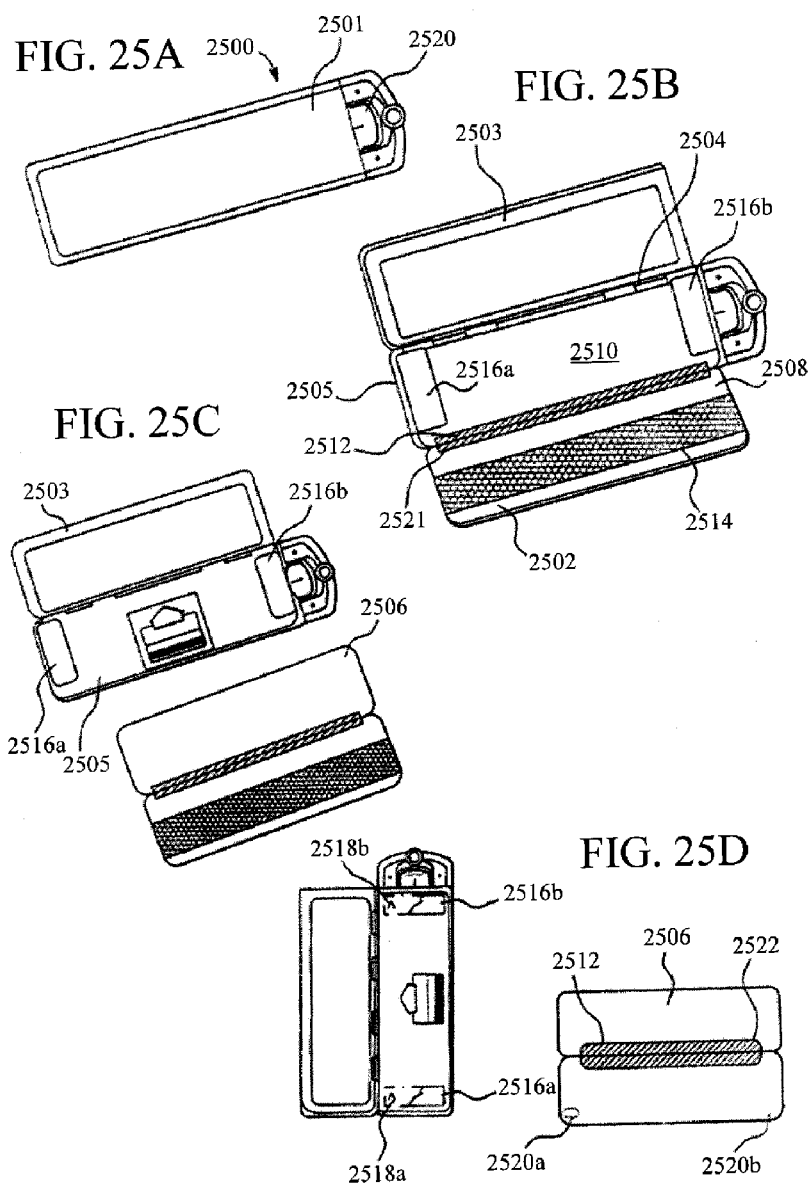

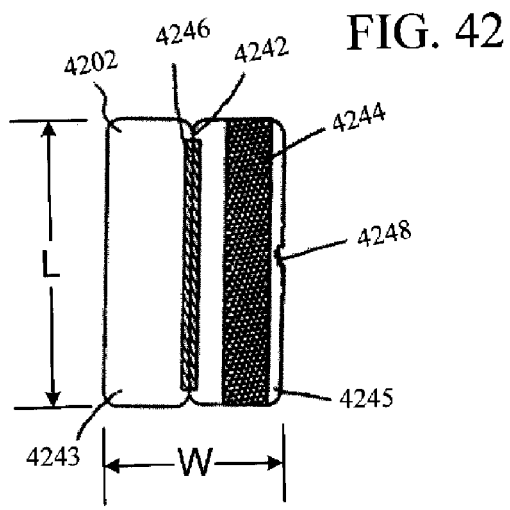
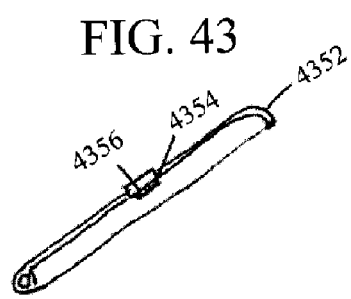
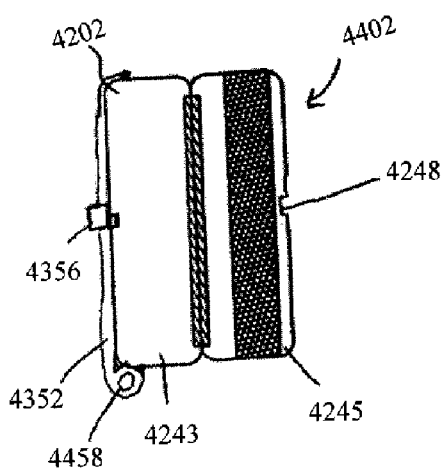
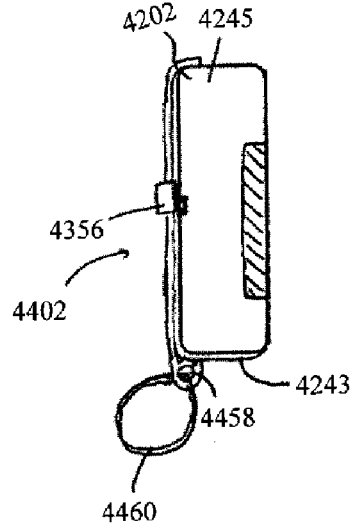

FOLDABLE NON-TRADITIONALLY-SIZED RF TRANSACTION CARD SYSTEM AND METHOD

CROSS-REFERENCE TO RELATED APPLICATIONS

This invention is a Continuation In Part of U.S. application Ser. No. 10/862,646, entitled "FOLDABLE TRANSACTION CARD SYSTEMS FOR NON-TRADITIONALLY-SIZED TRANSACTION CARDS," filed Jun. 7, 2004. The '646 application itself claims priority to U.S. patent application Ser. No. 10/773,619 entitled "FOLDABLE TRANSACTION CARD SYSTEMS," filed Feb. 6, 2004 (which itself claims priority to U.S. Provisional Patent Application No. 60/442,991, filed Jan. 28, 2003, to U.S. Provisional Patent Application No. 60/432,726 filed Dec. 11, 2002, and to U.S. patent application Ser. No. 10/436,394 entitled "FOLDABLE TRANSACTION CARD," filed May 12, 2003). The '394 application claims priority to U.S. Provisional Patent Application No. 60/424,592, filed Nov. 7, 2002. This application also claims priority to, and the benefits of, U.S. patent application Ser. No. 10/708,549, now U.S. Pat. No. 7,093,767 entitled "A SYSTEM AND METHOD FOR MANUFACTURING A PUNCH-OUT RFID TRANSACTION DEVICE," filed Mar. 10, 2004. The '549 application itself claims priority to U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001); to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003 (which itself claims priority to U.S. Provisional Patent Application No. 60/396,577, filed Jul. 16, 2002); to U.S. patent Ser. No. 10/394,914, entitled "TRANSACTION CARD," filed Mar. 21, 2003 (which itself claims priority to U.S. Provisional Patent Application No. 60/153,112, filed Sep. 7, 1999, U.S. Provisional Application No. 60/160,519, filed Oct. 20, 1999, U.S. Provisional Patent Application No. 60/167,405, filed Nov. 24, 1999, and to U.S. Provisional Patent Application No. 60/171,689, filed Dec. 21, 1999); and to U.S. patent application Ser. No. 10/302,658, now abandoned entitled "TRANSACTION CARD WITH DUAL IC CHIPS," filed Nov. 22, 2002. All of the above-mentioned applications are hereby incorporated by reference.

FIELD OF INVENTION

This invention relates to contactless transaction devices and methods of making and using the same. Specifically, this invention relates to a system and method for manufacturing a folding miniature RFID transaction device using, for example, conventional fob manufacturing procedures.

BACKGROUND OF INVENTION

It is generally known to provide fobs for providing a means for purchasing goods or services without the use of paper money or coinage. Specifically, fobs may represent credit, whereby a user of the fob may present the card in lieu of the paper money or coinage. In addition, fobs may be debit cards, whereby electronic money, such as money stored in an account, is removed from the account each time that the fob is used. In addition, fobs may have a certain amount of money, or other valuable commodity, recorded thereon, whereby a user of the fob may remove the money directly from the fob. For example, retail stores now offer cards that can be purchased for a certain amount of money. That amount, or any other amount, may be represented on the fob. When the fob is utilized, the amount represented on the card may be reduced until the fob represents that it cannot be utilized anymore, or that the card represents that it is depleted of money. In addition, other values besides currency may be represented on the fob, such as equivalent goods or services.

Transaction cards typically have a magnetic stripe provided, or some other means, for storing information relating to the fob, such as, a security code, and information relating to an account or an amount of money that the fob may represent. For example, if the fob is a credit card, the information contained on the magnetic stripe may relate to an account whereby use of the credit card may alert the account to release funds for the purchase of goods or services. Of course, the magnetic stripe or other means may further contain any other information to allow the fob to be utilized. The fob is typically fed into or through a point-of-sale ("POS") reader that reads the information contained on the magnetic stripe to extract the information as needed when the fob is being used.

The fob may further contain other features that allow for the secure and efficient use of the fob, such as holographic security devices, signature panels, photographs of the owner of the fob, embedded microchips, or any other item or element that may be useful for the fob.

Of late, companies are increasingly embodying RFID data acquisition technology in a fob or tag form for use in completing financial transactions in place of using traditional fobs. A typical fob includes a transponder and is ordinarily a self-contained device which may be contained on any portable form factor. In some instances, a battery may be included with the fob to power the transponder. In which case the internal circuitry of the fob (including the transponder) may draw its operating power from the battery power source. In addition, the fob may exist independent of an internal power source. In this instance the internal circuitry of the fob (including the transponder) may gain its operating power directly from an RF interrogation signal. U.S. Pat. No. 5,053,774, issued to Schuermann, describes a typical transponder RF interrogation system which may be found in the prior art. The Schuermann patent describes in general the powering technology surrounding conventional transponder structures. U.S. Pat. No. 4,739,328 discusses a method by which a conventional transponder may respond to a RF interrogation signal. Other typical modulation techniques which may be used include, for example, ISO/IEC 14443 and the like.

Transaction cards are typically sized according to standards set by the International Organization for Standardization (ISO). This means that most traditionally-sized fobs being utilized are of the same size and dimensions, typically about 2¼ inches by about 3⅜ inches in a generally rectangular configuration. RFID fobs are also sized according to these same dimensions. However, fobs and other fobs having dimensions according to this standard typically are too big to be stored in a convenient way except loose in a pocket, wallet or purse, or contained within a slot in a wallet or purse allowing the snug fit of the fob. Fobs are, therefore, highly susceptible to being lost or stolen. Other shapes and sizes would allow the fobs to be attached to, secured with, or otherwise stored with other items, such as key chains, for example.

A need exists, therefore, for a fob having the capability of being attached to securing means or stored in smaller areas than are currently allowed. For example, a need exists for a fob that may be clipped or otherwise attached to a key chain, or some other means for securing the fob to another item, yet is small enough to remain inconspicuous and compact, but handy. Further, a need exists for a fob having the above-noted advantages and further that maintains the information or other features typically disposed on or within a fob. Still further, a need exists for a case or housing or holder for holding and/or storing the foldable fob contained therein.

SUMMARY OF INVENTION

The present invention relates to a fob having one or more fold lines therein to provide a compact and easily stored fob. Moreover, the present invention relates to a foldable fob having one or more holes or apertures therein for holding a key chain, or other device for attaching the fob to another item, such as a set of keys, a wallet, or other item. Moreover, foldable fobs are provided that may be held or stored within housings or holders.

The invention may include a fob that is foldable so as to be highly compact so that the fob may be stored in small areas. Further, the invention may include a fob that may be attached to another item via a securing means, such as a ring or chain. Moreover, the invention may include a foldable fob that may be contained within a housing, holder or case.

The invention may include a fob that can be attached to a key chain, yet still remain small and compact. Therefore, an advantage of the present invention is that the fob may be small enough to be inconspicuous and be secured to another item thereby minimizing the chance that the fob will be misplaced, lost or stolen.

The invention may include a fob that is foldable and held and/or stored within a housing, holder or case that comprises other features typically found on or within a fob, such as security devices, embedded microchips, or magnetic stripes having information stored thereon or the like.

Additional features and advantages of the present examples are described in, and will be apparent from, the detailed description of the exemplary embodiments and from the drawings.

BRIEF DESCRIPTION OF THE DRAWINGS

A more complete understanding of the present invention may be derived by referring to the detailed description and claims when considered in connection with the Figures, where like reference numbers refer to similar elements throughout the Figures, and:

FIGS. 16A–16B illustrate a fob having fold lines disposed at angles to the edges of the fob but can be unfolded to be utilized within a point-of-sale machine;

FIGS. 19A–19B illustrate a foldable fob having a spring-loaded clip for holding said foldable fob in a folded state;

FIGS. 25A–25D illustrate an embodiment of a foldable fob system;

FIG. 42 illustrates a still further embodiment of a foldable fob having length and width dimensions that are smaller than traditionally-sized fobs;

FIG. 43 illustrates a perspective view of a holder for a foldable fob having length and width dimensions smaller than traditionally-sized fobs; and FIGS. 44A–44B illustrate a foldable fob system of a foldable fob having length and width dimensions that are smaller than traditionally-sized fobs and a holder for holding said fob.

DETAILED DESCRIPTION

The present invention may be described herein in terms of functional block components, screen shots, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), JavaCard and MULTOS with the various algorithms being implemented with any combination of data structures, objects, processes, routines or other programming elements. Further, it should be noted that the present invention may employ any number of conventional techniques for data transmission, signaling, data processing, network control, and the like. For a basic introduction on cryptography, review a text written by Bruce Schneier entitled "Applied Cryptography: Protocols, Algorithms, and Source Code in C," published by John Wiley & Sons (second edition, 1996), herein incorporated by reference.

In addition, many applications of the present invention could be formulated. The exemplary network disclosed herein may include any system for exchanging data or transacting business, such as the Internet, an intranet, an extranet, WAN, LAN, satellite communications, and/or the like. It is noted that the network may be implemented as other types of networks, such as an interactive television network (ITN).

Figure 1:
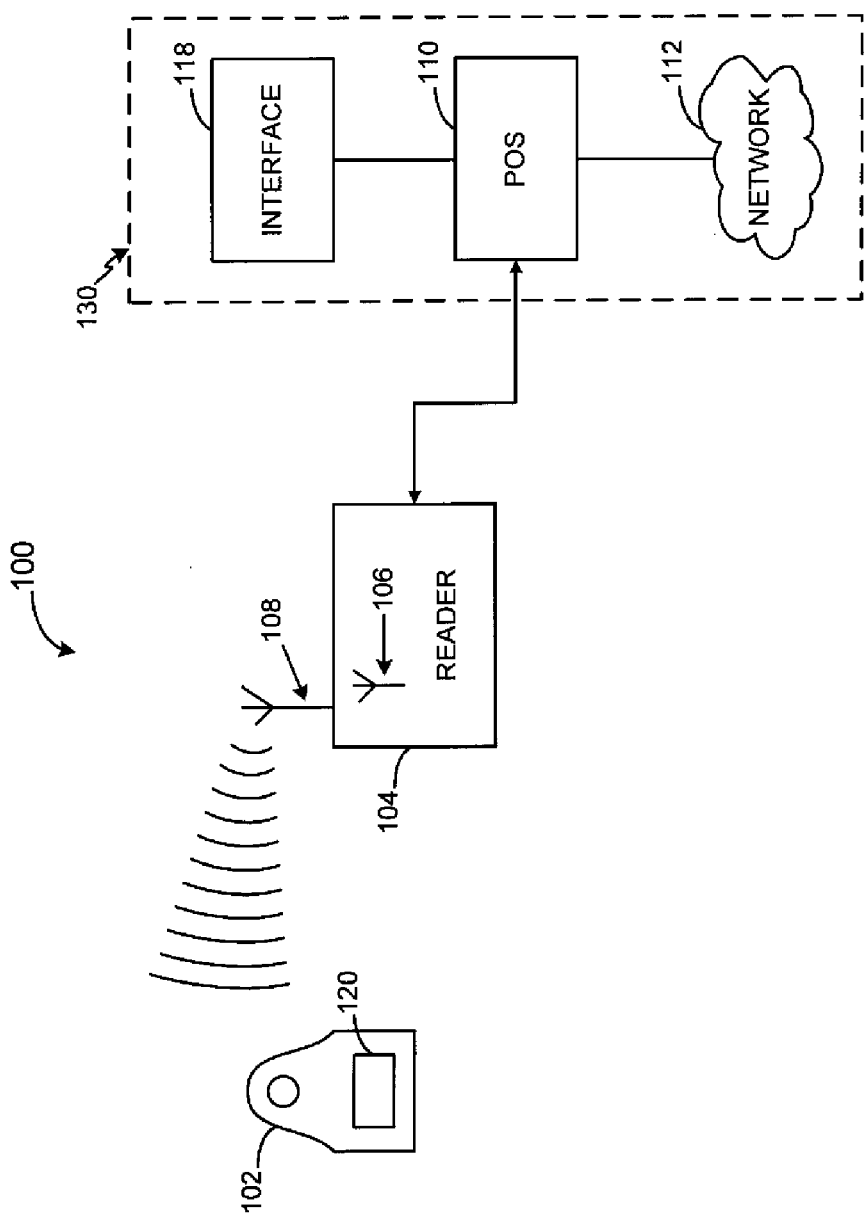
FIG. 1 illustrates an exemplary RF transaction device system in accordance with an exemplary embodiment of the present invention.

FIG. 1 illustrates an exemplary Radio Frequency (RF) transaction device system 100 for use with the present invention, wherein exemplary components for use in completing a contactless transaction are depicted. In general, the operation of system 100 may begin when a contactless transaction device 102 (fob 102) is presented for payment. The fob may be presented for payment by, for example, waiving fob 102 in proximity to a RFID reader 104. RFID reader 104 provides an interrogation signal for powering fob 102 and fob 102 is positioned in such proximity to the reader 104 that fob 102 may be positioned to be in communication with fob 102 via RF transmission of the interrogation signal. The interrogating signal may power fob 102 thereby initiating operation of fob 102. Fob 102 may provide a transponder identifier and/or account identifier to the RFID reader 104, via RF transmissions and the reader 104 may further provide the identifier to the merchant system 130 POS device 110 for transaction completion. Details for the operation of an exemplary RFID transparent system for transaction completion is found in U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," and its progeny which is hereby incorporated by reference.

Although the point-of-interaction device is described herein with respect to a merchant point-of-sale (POS) device, the invention is not to be so limited. Indeed, a merchant POS device is used herein by way of example, and the point-of-interaction device may be any device capable of receiving device account data. In this regard, the POS may be any point-of-interaction device or transaction device acceptance device enabling the user to complete a transaction using an RF responsive transponder.

FIG. 1 illustrates an exemplary Radio Frequency (RF) transaction device system 100 for use with the present invention, wherein exemplary components for use in completing a contactless transaction are depicted. In general, the operation of system 100 may begin when a contactless transaction device (fob) 102 is presented for payment. The device may be presented for payment by, for example, waiving fob 102 in proximity to a RFID reader 104. RFID reader 104 provides an interrogation signal for powering module 120. Module 120 may be configured to contain the transaction device RFID circuitry. Module 120 may also be referred to as "RFID module" herein. Fob 102 may be positioned in such proximity to reader 104 that fob 102 may be positioned to be in communication with fob 102 via RF transmission of the interrogation signal. The interrogating signal may power module 120 thereby initiating operation of fob 102. Fob 102 may provide a transponder identifier and/or account identifier to RFID reader 104, via RF transmissions and reader 104 may further provide the identifier to the merchant system 130 POS device 110 for transaction completion. Details for the operation of an exemplary RFID transparent system for transaction completion is found in U.S. patent application Ser. No. 10/192,488, entitled "SYSTEM AND METHOD FOR PAYMENT USING RADIO FREQUENCY IDENTIFICATION IN CONTACT AND CONTACTLESS TRANSACTIONS," and its progeny which is hereby incorporated by reference.

As used herein, "contactless transaction device 102" may be referred to as RFID fob 102, fob 102, transaction device 102, and/or the like. Contactless transaction device 102 refers to any device configured to facilitate transactions without physically contacting a reader. However, the invention also contemplates the use of contact transaction devices such as credit cards, debit cards, and the like.

Although the point-of-interaction device is described herein with respect to a merchant point-of-sale (POS) device, the invention is not to be so limited. Indeed, a merchant POS device is used herein by way of example, and the point-of-interaction device may be any device capable of receiving device account data. In this regard, the POS may be any point-of-interaction device or transaction device acceptance device enabling the user to complete a transaction using an RF responsive transponder.

RFID reader 104 may be configured to communicate using a RFID internal antenna 106. In addition, RFID reader 104 may include an external antenna 108 where the external antenna 108 may be made remote to RFID reader 104 using a suitable cable and/or data link. RFID reader 104 may be further in communication with a transaction completion system (e.g., merchant system 130) via a data link. In one exemplary embodiment the transaction completion system may include POS device 110 in communication with RFID reader 104 (via a data link), and a customer interface 118 in communication with POS device 110. POS 110 may be in further communication with an account issuer system (not shown) via a network 112 which may be provided the account number and any transaction identifying information (e.g., time, duty, cost of transaction, item negotiated) for transaction completion.

The terms "Internet" or "network" as used herein, may refer to the Internet, any replacement, competitor or successor to the Internet, or any public or private inter-network, intranet or extranet that is based upon open or proprietary protocols. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); LOSHIN, TCP/IP CLEARLY EXPLAINED (1997). All of these texts are hereby incorporated by reference.

By being in "communication," what is described may be that a signal may travel to/from one component of the invention to another. The components may be directly connected to each other or may be connected through one or more other devices or components. The various coupling components for the devices can include but are not limited to the Internet, a wireless network, a conventional wire cable, an optical cable or connection through air, water, or any other medium that conducts signals, and any other coupling device or medium.

Where required, the system user may interact with the system to complete a transaction via any input device or user interface 118, such as, a keypad, keyboard, mouse, kiosk, personal digital assistant, handheld computer (e.g., Palm Pilot®, Blueberry®), cellular phone and/or the like. Any input device discussed herein may also be a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc. Similarly, the invention could be used in conjunction with any type of personal computer, network computer, work station, minicomputer, mainframe, or the like running any operating system such as any version of Windows, Windows NT, Windows 2000, Windows 98, Windows 95, MacOS, MVS, OS/2, BeOS, Linux, UNIX, Solaris or the like. Moreover, although the invention may frequently be described as being implemented with TCP/IP communications protocol, it should be understood that the invention could also be implemented using SNA, IPX, Appletalk, IPte, NetBIOS, OSI or any number of communications protocols. Moreover, the system contemplates the use, sale, or distribution of any goods, services or information over any network having similar functionality described herein.

A variety of conventional communications media and protocols may be used for the data links. For example, data links may be an Internet Service Provider (ISP) configured to facilitate communications over a local loop as is typically used in connection with standard modem communication, cable modem, dish networks, ISDN, Digital Subscriber Lines (DSL), or any wireless communication media. In addition, merchant system 130 including POS device 110 and host network 112 may reside on a local area network which interfaces to a remote network (not shown) for remote authorization of an intended transaction. Merchant system 130 may communicate with the remote network via a leased line, such as a T1, D3 line, or the like. In addition, merchant system 130, including POS 110 and host network 112, may reside on a local area network, which interfaces with a remote network (not shown) for remote transaction authorization. Such communications lines are described in a variety of texts, such as, "Understanding Data Communications," by Gilbert Held, which is incorporated herein by reference.

A transaction device account identifier or account number, as used herein, may include any identifier for a transaction device which may be correlated to a user transaction account (e.g., credit, charge debit, checking, savings, reward, loyalty, or the like) maintained by a transaction account provider (e.g., payment authorization center). A typical transaction account identifier (e.g., account number) may be correlated to a credit or debit account, loyalty account, or rewards account maintained and serviced by such entities as American Express, Visa and/or Mastercard or the like.

Figure 4:
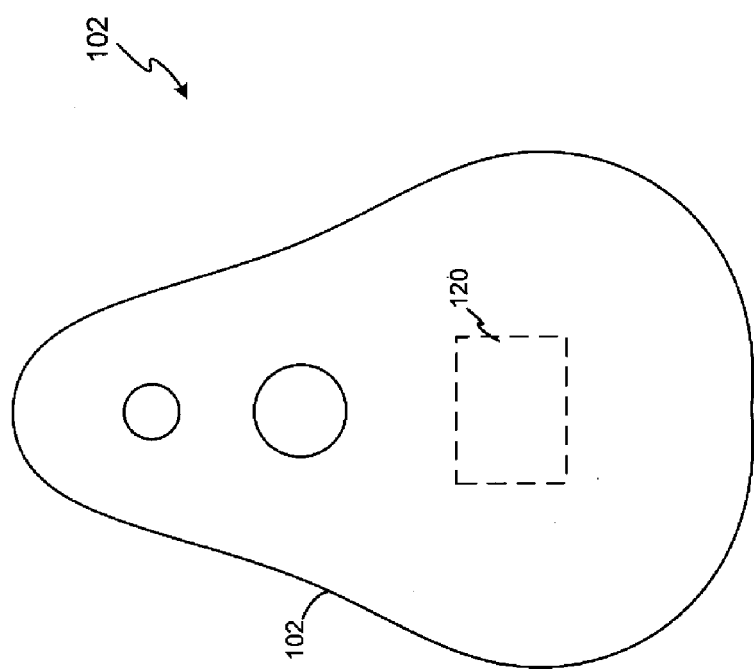
FIG. 4 depicts the front surface of an exemplary RFID transaction device in accordance with an exemplary embodiment of the present invention.

In general, fobs 102 which use the above RF transmission process may take any form. RFID module 120 may be included in fob 102 for use in completing a RFID transaction and fob 102 may take any form as desired. To facilitate understanding of this invention, FIG. 4 illustrates RFID fob 102 shaped as a teardrop shaped transaction device, including RFID module 120 for conducting a RF transaction. While certain shapes and sized of RFID fob 102 are described and/or depicted herein, the invention contemplates fobs 102 of various shapes and sizes.

Figure 2:
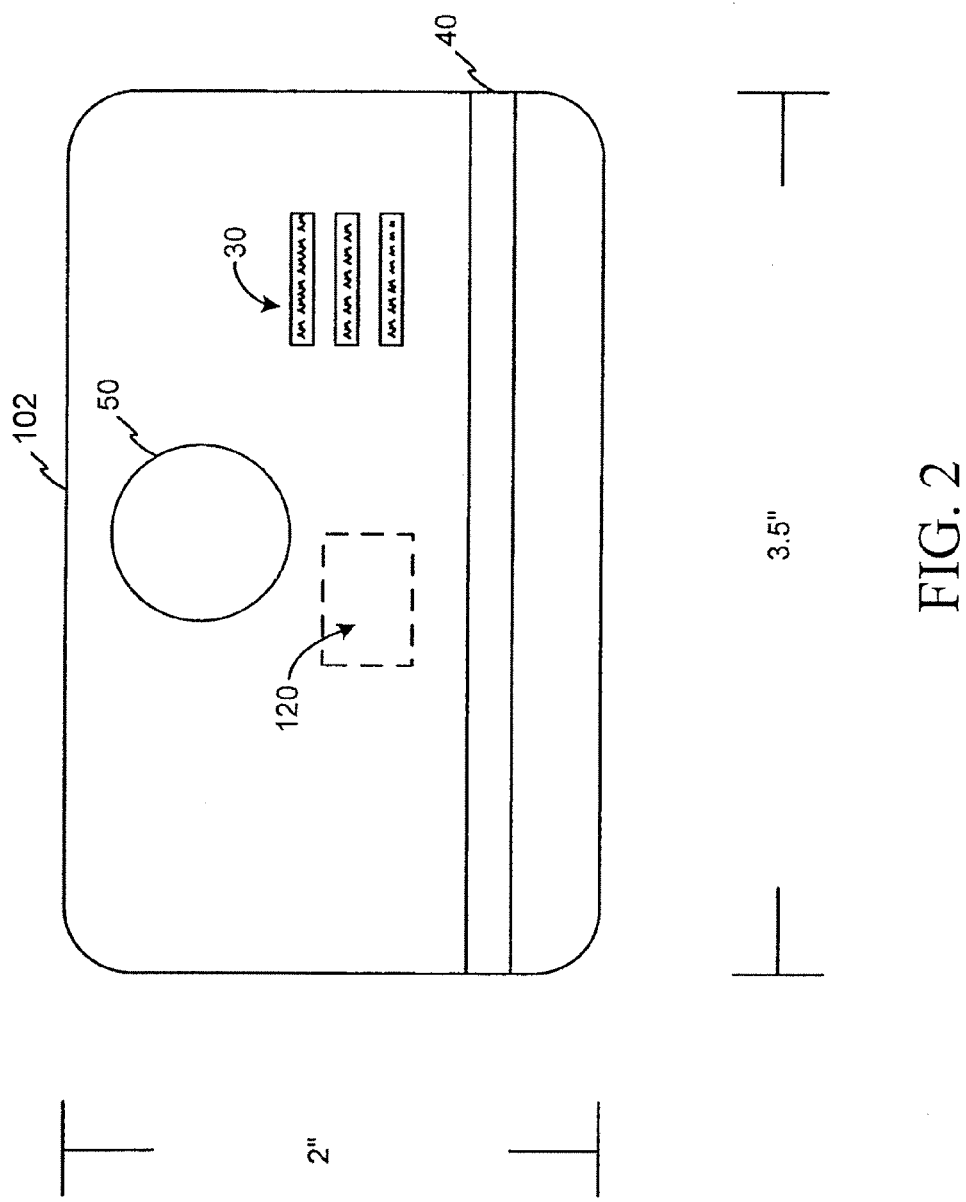
FIG. 2 illustrates an exemplary prior art fob in accordance with an exemplary embodiment of the present invention.

FIG. 2 depicts the dimensional relationship of an exemplary fob 102. Fob 102 is shown with dimensional characteristics which conform to the ISO fob size standard, typically ISO/IEC 7800 et al. Generally, fob 102 is about 2"×3.5". Fob 102 is generally formed from a sheet 200 of transaction card material.

Fob 102, and the other transaction cards described herein, may be made from any generally known material typically used for transaction cards, such as, for example, polyvinylchloride (PVC) and polypropylene (PP). Typically, fobs and transaction cards such as the ones described herein have multiple layers of polymeric materials. For example, a typical fob may have one or more internal layers of PVC or PP, and outer layers of polyethylene terephthlate (PET) for rigidity and strength. Other materials, such as thermoplastic polymeric materials, or other materials, such as paper or metal, may be utilized to form the fob 102.

Provided in fob 102 may be one or more aperture (not shown) that may be utilized to attach fob 102 to a securing means, such as a key ring. Of course, any other securing means, such as a chain or string, for example, may be utilized and the invention should not be limited as herein described. The securing means can be provided in any of the apertures described herein as needed.

Figure 3:
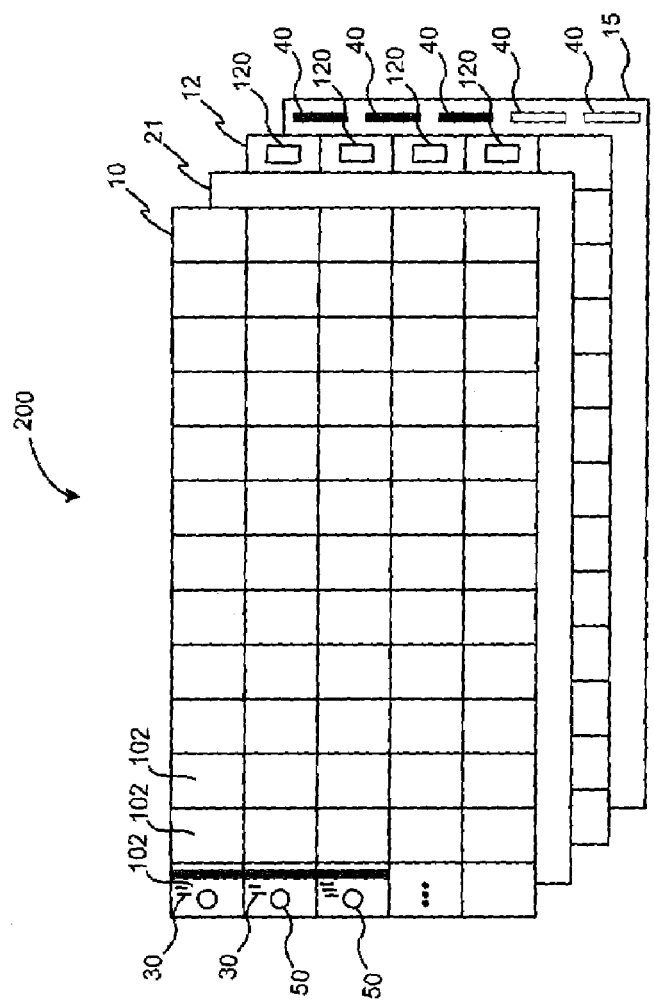
FIG. 3 illustrates an exploded view of an exemplary sheet of a plurality of fobs in accordance with an exemplary embodiment of the present invention.

In the exemplary embodiment shown, sheet 200 may be formed using multiple material layers. FIG. 3 illustrates an exploded view of an exemplary sheet 200, which may be used with the present invention. Sheet 200 includes a front material layer 10 and back material layer 12 consisting of a plastic substrate such as, for example, clear core PVC. One skilled in the art will appreciate that layers 10 and 12 of fob 102 may be any suitable transparent, translucent and/or opaque material such as, for example, plastic, glass, acrylic and/or any combination thereof. Each material layer 10, 12 is substantially identical and is preferably about 3'×4' (622 mm×548 mm) and about 0.005–0.350 inches, or more preferably 0.01–0.15 inches or 13.5 mil thick.

The fabrication of the individual fob sheets 200 may include either direct layout (9 layers) of film or the use of a sub-assembly (5 layers). An exemplary sub-assembly layer 21 may consist of 5 layers of film with room temperature tack adhesive applied over thermoset and thermoplastic adhesives. The resulting fobs comprise (from the fob front towards the fob back) 2.0 mil outer laminate (PVC, polyvinylchloride) including having a holographic foil, embossed surface, chip and other indicia on its surface, 9.0 mil printed PVC core with print side out (fob front), 2.0 mil PVC adhesive, 1.7 mil PET GS (extrusion coated polyethyleneterephthalate—gluable/stampable) manufactured by D&K (525 Crossen, Elk Grove Village, Ill. 60007), 2.0 mil PET IR blocking film, 1.7 mil PET GS, 2.0 mil PET adhesive, 9.0 mil printed PVC core with the print side out (fob back), and 2.0 mil outer back laminate with a signature panel, applied magnetic stripe and other indicia. Optimally, the PET IR blocking film is fabricated in the middle of the layers to balance the fob and minimize warping of the resulting fob product.

After eventually combining the sheets by, in one embodiment, adhering the front layer 10 on top of the back sheet 12, the total thickness of fob 102, including the subassembly sheet 21, is about 0.032 in. (32 mil.), which is within the ISO thickness standard for smart cards. In one embodiment, the subassembly sheet 21 may be formed including RFID module 120, which may be of sufficient thickness to maintain the smart fob standard thickness. In addition, RFID module 120 may be embedded in the sheet 12 or fob 102 via a suitable conventional milling process. Because RFID module 120 may eventually embedded into the surface of the substrate or the subassembly 21 as described more fully below, RFID module 120 does not affect the thickness of the overall fob 102. Moreover, the about 3'×4' sheets include predefined alignment markings which define the boundaries of the individual fobs 102 to be cut from the sheet. Each exemplary sheet yields over 50 transaction cards (typically 56 fobs), wherein each fob 102 is within the ISO fob size standard, namely about 2"×3.5".

In an exemplary embodiment, certain compounds are printed over the surface of sheets 10 and 12. The compounds may be printed in accordance with accepted ISO standards. One skilled in the art will appreciate that the printing of the text 30 and logo 50, and optically recognizable ink may be applied to any surface of fob 102 such as, for example, the front 10 face (front material layer 10), the rear 12 face (rear material layer 12), the inside or outside surface of either face, between the two sheets of base material and/or a combination thereof. Moreover, any suitable printing, scoring, imprinting, marking or like method is within the scope of the present invention.

The text 30 and logo 50 are printed on the outside surface of each material layer 10, 12 by a known printing process, such as an offset printing process, which provides a thinner ink coverage, but clearer text. More particularly, with respect to offset printing, the artwork is duplicated onto a metal plate and the metal plate is placed onto an offset press printing machine which can print up to four colors during a single run. The offset printed text may include, for example, a corporate name, a copyright/trademark/patent notice, a batch code number, an "active thru" date, contact telephone numbers, legal statements and/or the like. The exemplary offset text may be printed in 4DBC in opaque white ink or a special mix of Pantone Cool Gray 11 called UV AMX Gray. In one exemplary embodiment, the offset printed text is printed directly on RFID module 120, such that the text is visible on the fob 102 through casual inspection.

A laminate material layer 15 is applied to the back layer 12 of fob 102. In one exemplary embodiment, the laminate layer 15 includes rows of ISO compliant magnetic stripes 40, wherein each magnetic stripe 40 corresponds to an individual fob 102. The magnetic stripe 40 may extend along one length of the fob 102 and is applied to the back surface 12. The magnetic stripe 40 may be any width, length, shape, and placed on any location on fob 102. In an exemplary embodiment, the magnetic stripe 40 is applied to the outer laminate layer 15 using a tape layer machine which bonds the cold peel magnetic stripe 40 to the outer laminate 15 when it is in a rolled position (not shown). The laminate 15 roll with a rolling hot die and at suitable pressure. The roll is then cut into layers 10, 12 before the fob layers are assembled.

After the desired printing is complete and the magnetic stripe applied, the front 10 and back 12 material layers are placed together, and the layers are in one embodiment adhered together by any suitable adhering process, such as a suitable adhesive. One skilled in the art will appreciate that, instead of printing on two material layers and combining the two material layers, a single plastic material layer can be used, wherein the single material layer is printed on one side, then the same material layer is re-sent through the printer for printing on the opposite side.

In the present invention, after adhering the layers together, a layer of lamination (not shown), approximately the same dimensions as the plastic sheets, namely 3'×4', may be applied over the front 10 and back 12 of fob 102. After the laminate is applied over the front 10 and back 12 of the combined plastic material layers, fob 102 layers are suitably compressed at a suitable pressure and heated at about 300 degrees, at a pressure of between 90–700 psi, with a suitable dwell time to create a single fob 102 device. The aforementioned fob fabrication can be completed by, for example, Oberthur Fob Systems, 15 James Hance Court, Exton, Pa.

In an exemplary embodiment, fob layers 10 and 12 are fused together in a lamination process using heat and pressure. During the hot press phase, the press is heated to about 300 F degrees and the pressure builds to about 1000 psi and holds for about 90 seconds. The pressure then ramps up to about 350 psi over an about 30-second period and holds for 16 minutes at the same temperature, namely 300 F degrees. Sheet 200 is then transferred to a cold press which is at about 57 F degrees. The pressure builds to about 400 psi and is held for about 16 minutes as chilled water of about 57 F degrees is circulated in the plates. The cold press then unloads sheet 200.

Figure 5:
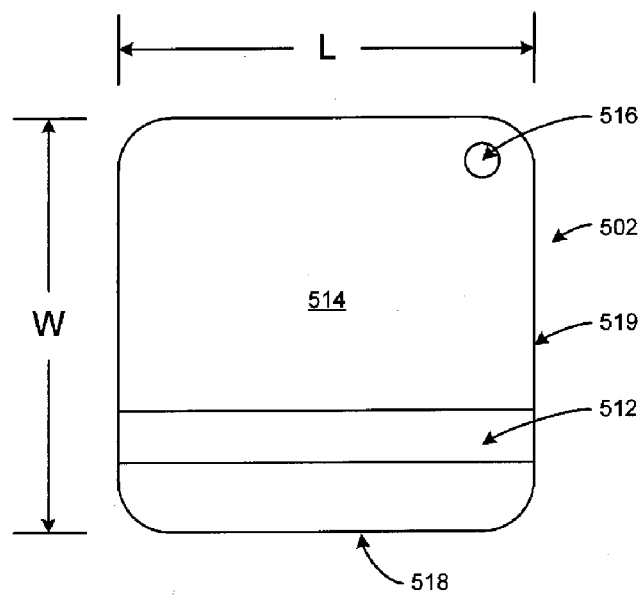
FIG. 5 illustrates an embodiment of a fob in accordance with the present invention.

Fob 102 may be cut out of sheet 200 and fob 102 may be configured with a specific width (W) and a length (L). In the embodiment described herein with reference to FIG. 5, fob 102 has a width W of less than approximately 1 inch and a length L of also less than approximately 1 inch. For example, as shown in FIG. 5, fob 102 is generally square and the width W could be approximately ¾ inch and the length L could also be approximately ¾ inch.

Figure 6A:
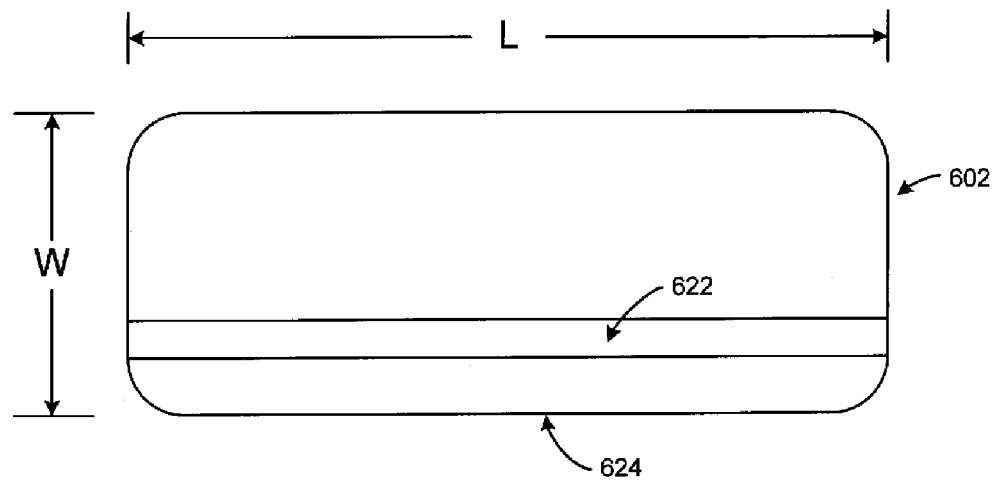
FIGS. 6A and 6B and illustrate fobs in alternate embodiments described herein in accordance with exemplary embodiments of the present invention.
Figure 6B:
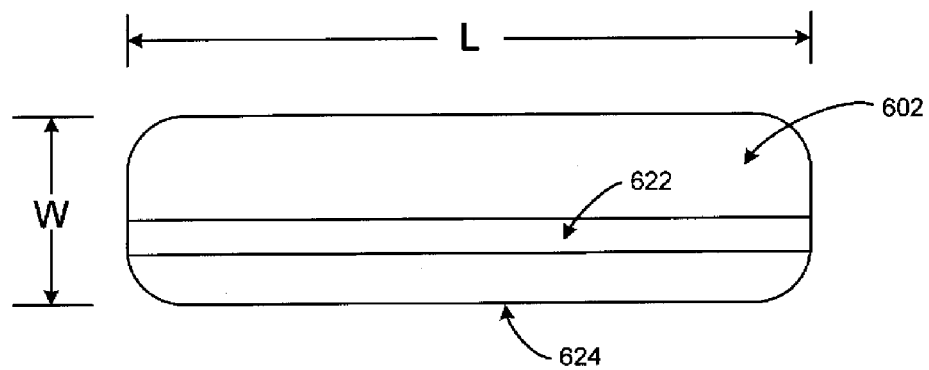

FIGS. 6A and 6B illustrate alternate embodiments of the present invention of a fob 602 having a magnetic stripe 622 that is parallel to a side 624 of fob 602. Fob 602 may be made from the same or similar materials as fob 102 described above.

Fob 602 has a width (W) and a length (L). In this particular embodiment, fob 602 may have a length L of greater than 3 inches, and more preferably of greater than approximately 3⅜ inches. For example, as shown in FIG. 6A, fob 602 may have a width W of approximately 2 inches and a length L of approximately 4 inches. In addition, as shown in FIG. 6B, the width may be approximately 1 inch and the length L may be approximately 3⅞ inches. Therefore, fob 602 may be configured to be longer than a standard transaction card, but narrower than a standard transaction card. This may allow fob 602 to be kept or stored in locations where the widthwise dimension limits the storage capability of fob 602.

Figure 7A:
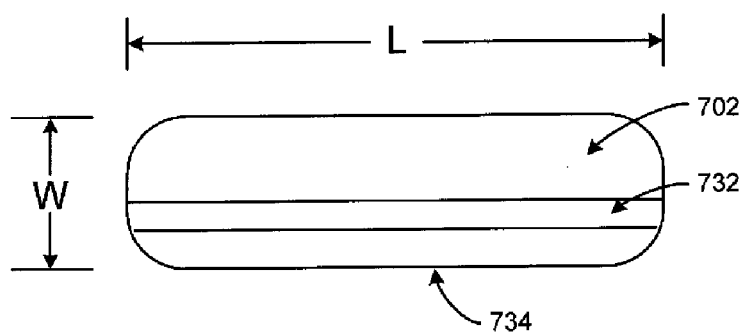
FIGS. 7A and 7B illustrate fobs in still further embodiments described herein in accordance with exemplary embodiments of the present invention.
Figure 7B:
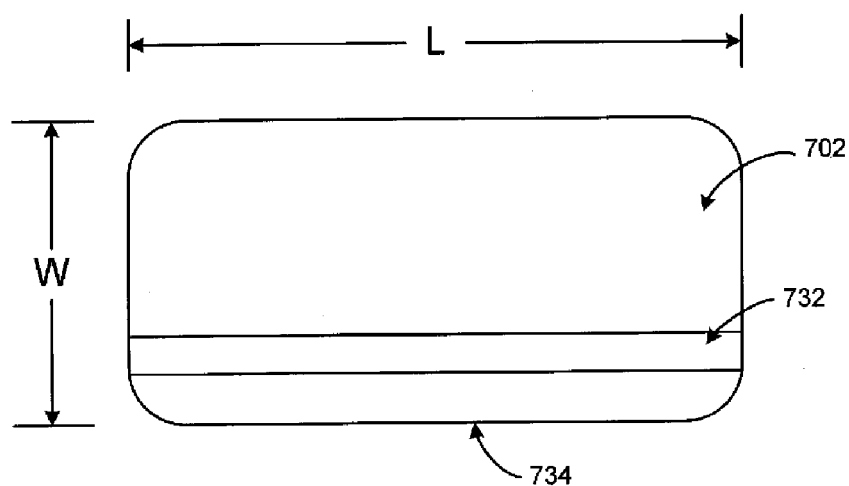

FIGS. 7A and 7B illustrate further embodiments of the present invention of a fob 702 having a magnetic stripe 732 that is parallel to a side 734 of fob 702. Fob 702 may be comprised of the same materials as described above with reference to fob 102.

Fob 702 may be configured to have a width (W) and a length (L). In the embodiment described herein with reference to FIGS. 7A and 7B, fob 702 may be configured with a length L of between approximately 1 inch and approximately 3 inches and a width W of less than approximately 1 inch or greater than approximately 1⅞ inches. For example, as shown in FIG. 7A, fob 702 may be configured with a width W of approximately ¾ inch and a length L of approximately 2¼ inches. In addition, as shown in FIG. 7B, the width W may be approximately 2⅛ inches and the length L could be approximately 3 inches.

Figure 8:
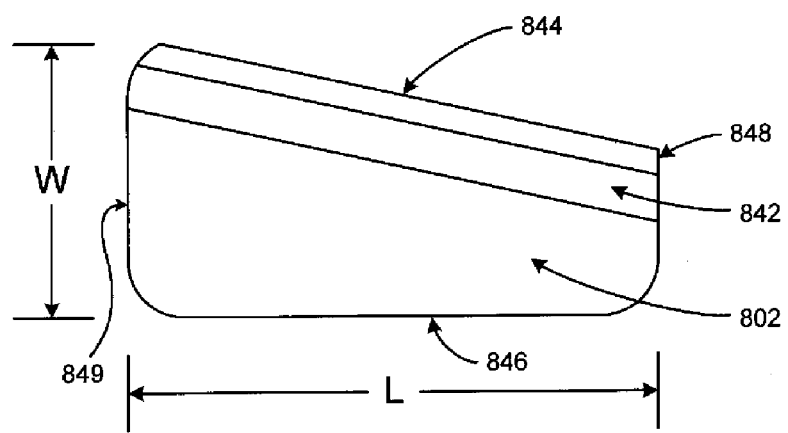
FIG. 8 illustrates another embodiment of a fob in accordance with the present invention.

FIG. 8 illustrates an alternate embodiment of a fob 802 having a magnetic stripe 842 that is parallel to a side 844 of fob 802. Alternately, the magnetic stripe may be parallel to one of the other sides 846, 848 or 849. Fob 802 may be comprised of the same or similar materials as that of fob 102, described above. In this particular embodiment, fob 802 has at least one set of opposing sides 844 and 846, or 848 and 849 which are not parallel.

Fob 802 may be configured has a width (W) and a length (L). Fob 802 may have a length L of between approximately 1 inch and approximately 1⅞ inches or a length L of greater than approximately 3 inches, and more preferably of greater than approximately 3⅜ inches. In addition, the width W may be less than approximately 1 inch or greater than approximately 1⅞ inches. For example, as shown in FIG. 8, fob 802 may have a width W of approximately ¾ inch and a length L of approximately 1½ inches. In addition, the width W could be approximately 2 inches and the length L could be approximately 3½ inches.

Figure 9:
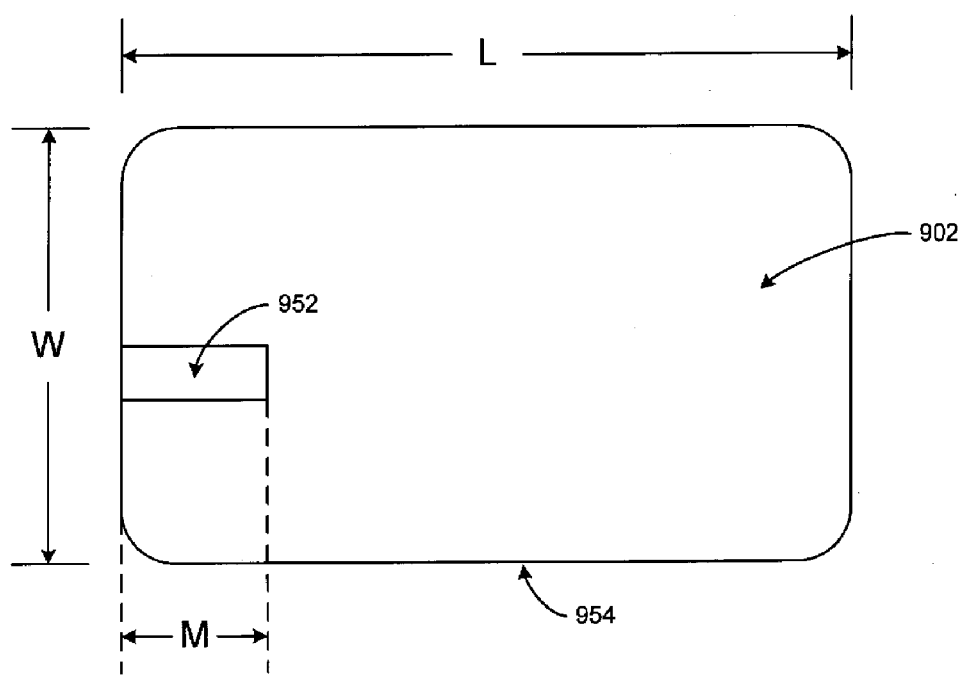
FIG. 9 illustrates yet another embodiment of a fob in accordance with the present invention.

FIG. 9 illustrates an alternate embodiment of fob 902 configured with a magnetic stripe 952 that is parallel to a side 954 of the transaction card 950. Fob 902 may comprise the same or similar material as that described above with reference to fob 102, as noted above of the same or similar construction to fob 102 described above.

Fob 902 may be configured of any length L or width W, so long as fob 902 has a magnetic stripe 952 of length M, which is less than approximately 1 inch. In addition, the transaction card 950 may have any length L or width W, so long as the length M of the magnetic stripe 952 is greater than approximately 3 inches long and preferably greater than approximately 3⅜ inches long.

In one exemplary manufacturing embodiment, and with reference again to FIG. 4, fobs 102 may include internal circuitry for use in completing contactless transactions. For example, fob 102 may include module 120 included in the fob body. Module 120 may be configured in a position substantially central to the fob body and/or it may be positioned at any desired location therein. Module 120 may be included interposed between front surface material layer 10 and back surface material layer 20 during fabrication of the sheet 200. Specifically, module 120 may be included interposed between at least two layers of the subassembly sheet 200. In addition, after lamination, RFID module 120 may be included within an individual fob 102 within a space created by milling the fob body and providing room for the insertion of RFID module 120. As such, upon including RFID module 120, sheet 200 will comprise a plurality of RFID operable transaction cards 102 wherein each fob 102 includes RFID module 120. Traditional methods for including RFID module 120 in fobs 102 are well known, and are intended to be within the scope of the invention.

Figure 10:
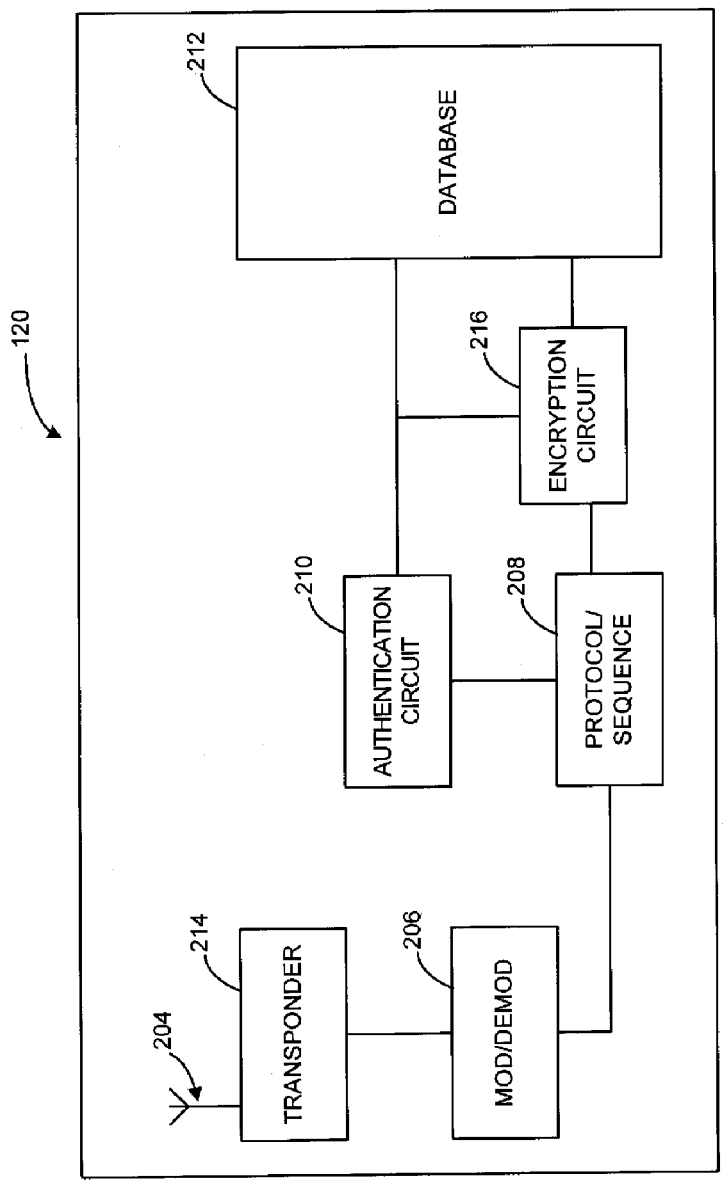
FIG. 10 is a block diagram of the many functional components of an exemplary RFID module 120 in accordance with the present invention.

FIG. 10 illustrates a block diagram of the many functional components of an exemplary RFID module 120 in accordance with the present invention. Module 120 may include any conventional RFID circuitry capable of communicating via Radio Frequency transmission. A suitable module 120 may be presented by the user to facilitate an exchange of funds or points, etc., for receipt of goods or services.

Module 102 may include an antenna 204 for receiving an interrogation signal from RFID reader 104 via antenna 106 (or in addition, via external antenna 108). Module antenna 204 may be in communication with a transponder 214. In one exemplary embodiment, transponder 214 may be a 13.56 MHz transponder compliant with the ISO/IEC 14443 standard, and antenna 204 may be of the 13 MHz variety. The transponder 214 may be in communication with a transponder compatible modulator/demodulator 206 configured to receive the signal from transponder 214 and configured to modulate the signal into a format readable by any later connected circuitry. Further, modulator/demodulator 206 may be configured to format (e.g., demodulate) a signal received from the later connected circuitry in a format compatible with transponder 214 for transmitting to RFID reader 104 via antenna 204. For example, where transponder 114 is of the 13.56 MHz variety, modulator/demodulator 206 may be ISO/IEC 14443-2 compliant.

Modulator/demodulator 206 may be coupled to a protocol/sequence controller 208 for facilitating control of the authentication of the signal provided by RFID reader 104, and for facilitating control of the sending of the fob 102 account number. In this regard, protocol/sequence controller 208 may be any suitable digital or logic driven circuitry capable of facilitating determination of the sequence of operation for the module 120 inner-circuitry. For example, protocol/sequence controller 208 may be configured to determine whether the signal provided by the RFID reader 104 is authenticated, and thereby providing to the RFID reader 104 the account number stored on fob 102.

To authenticate the signal, the protocol/sequence controller 208 may be further in communication with authentication circuitry 210 for facilitating authentication of the signal provided by RFID reader 104. Authentication circuitry may be further in communication with a non-volatile secure memory database 212. Secure memory database 212 may be any suitable elementary file system such as that defined by ISO/IEC 7816-4 or any other elementary file system allowing a lookup of data to be interpreted by the application on the chip. Database 212 may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. Database 212 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is the same. However, data tables having similar, though not identical, data in the key fields may also be merged by using AGREP, for example.

The data received from the reader 104 or the database 212 may be used by protocol/sequence controller 208 for data analysis and used for management and control purposes, as well as security purposes. Authentication circuitry 216 may authenticate the signal provided by RFID reader 104 by association of the RFID signal to authentication keys stored on database 212. Authentication circuitry 216 may be in further communication with an encryption circuitry 216 which may encrypt or decrypt the reader 104 signal or the data (e.g., account number, user identifier, device identifier, etc.) returned from database 212 prior to transmitting the data. Encryption circuitry 216 may use keys stored on database 212 to perform encryption and/or decryption of signals sent to or from the RFID reader 104.

In addition, protocol/sequence controller 208 may be in communication with a database 212 for storing at least one of fob 102 account data, a unique fob 102 identification code, user identification code, or transaction device identifier. Protocol/sequence controller 208 may be configured to retrieve the account number from database 212 as desired. Database 212 may be of the same configuration as database 212 described above. The account data and/or unique device identification code stored on database 212 may be encrypted prior to storage. Thus, where protocol/sequence controller 208 retrieves the account data, and or unique transaction device identifier, or the like, from database 212, the data may be encrypted by the encryption circuit 216 when being provided to RFID reader 104. Further, the data stored on database 212 may include, for example, an unencrypted unique fob 102 identification code, a user identification ISO/IEC, Track 1 and Track 2 data, as well as specific application applets. The data may additionally be stored in the database 212 in Track 1/Track 2 format and may also be in Track 1/Track 2 format when provided to the reader 104

In one exemplary embodiment, module 120 antenna 218 may be 134 KHz rated configured to communicate with a 134 KHz transponder 214. In this exemplary configuration, an ISO/IEC 14443-2 compliant modulator/demodulator 206 may not be required. Further still, reader 104 may also include an antenna 106, 108 and a transponder modulator which is also ISO/IEC 1443-2 complaint to ensure successful RF communication with correspondent components at module 120.

While the foregoing describes an exemplary embodiment for the fabrication of transaction device combination, one skilled in the art will appreciate that any suitable method for incorporating text 30, logos 50, a magnetic stripe 40, a signature field, holographic foil 15 onto a substrate in accordance with accepted 160 standards, is within the scope of the present invention. Moreover, the holographic foil, RFID module 120, logo 50, magnetic stripe 40, signature field or any other compound may be included on the fob 102 by any suitable means such as, for example, heat, pressure, adhesive, grooved and/or any combination thereof. In accordance with one embodiment, the text 30, logo 50, magnetic stripe 40, or holographic foil 15 may additionally be included in one surface use of fob 102 on a portion easily viewable by casual inspection.

Fob 102 may be configured with a magnetic stripe 40 using any conventional method for attaching magnetic stripes as is commonly known. The magnetic stripe 40 may be compliant to International Standard Setting Organization standards for the shape, location and the format of the data stored and retrieved from the magnetic stripe 40. The magnetic stripe 40 may be configured to include account data (e.g., account, user, or transaction device identifier, code or number) stored thereon in Track 1/Track 2 ISO magnetic stripe standard format. As such, the magnetic stripe 40 may be configured to be readable by any conventional magnetic stripe reader as is found in the art. Consequently, the user may use the transaction device combination 602 in similar manner as a traditional credit, debit, DDA, prepaid fob, an the like. For example, the user may present the transaction device combination 602 to a magnetic stripe reader, which may retrieve the magnetic stripe 40 data and forward the data to an account issuer for transaction completion. Conventional methods for completing a transaction are well known and will not be repeated for brevity.

In another embodiment, in accordance with the present invention, the fobs described herein may be configured to have one or more folds therein to provide a compact and easily stored fob. Moreover, the foldable fobs described herein have one or more holes or apertures therein for holding a key chain, or other device for attaching the fob to another item, such as a set of keys, a wallet, or other item. Moreover, fob systems are provided comprising foldable fobs and housings, holders or cases for holding and/or storing the foldable fobs. In addition, foldable fob systems are provided for foldable fobs having length and/or width dimensions smaller than traditionally-sized fobs.

Figure 11A:
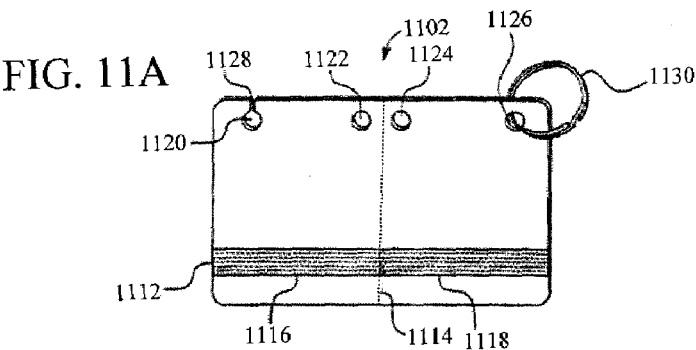
FIGS. 11A–11C illustrate a fob that is transversely foldable and has apertures for securing a ring or a key chain thereto.
Figure 11B:
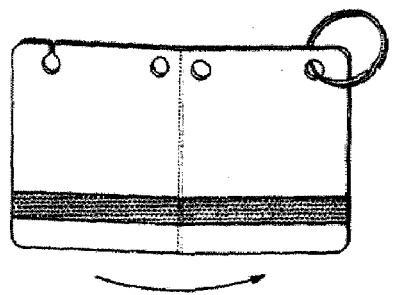
Figure 11C:
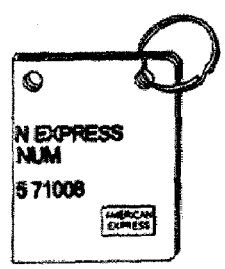

Referring now to FIGS. 11A–11C, a first example of the present invention is illustrated. FIGS. 11A–11C illustrate a foldable fob 1102, shown generically as merely having a magnetic stripe 112. Other features not shown, however, may be provided on the fob, such as a signature panel, an embedded microchip, a holographic image, or the like. These features may allow the fob to function more easily, efficiently, and/or more securely.

Of course, fob 1102 typically comprises a plurality of layers (not shown) to form the rigid card. For example, fobs typically include inner layers of a polymeric material to provide the fob with thickness, strength, rigidity and bulk. In addition, outer layers are typically provided comprising a polymeric material that protects the inner layers of the fob. In addition, the polymeric material of the outer layers may provide rigidity and further may add to the thickness of the fob. Fob 1102, and the other fobs described herein, may be made from any generally known material typically used for fobs, such as, for example, polyvinylchloride (PVC) and polypropylene (PP). Typically, fobs such as the ones described herein have multiple layers of polymeric materials. For example, a typical card may have one or more internal layers of PVC or PP, and outer layers of polyethylene terephthalate (PET) for rigidity and strength.

Transaction cards may further be transparent, as described in U.S. patent application Ser. No. 10/092,681, filed Mar. 7, 2002, which is a continuation-in-part application of U.S. patent application Ser. No. 10/062,106, filed Jan. 31, 2001, which is a continuation-in-part application of U.S. patent application Ser. No. 09/653,837, filed Sep. 1, 2000, and further claims the benefit of U.S. Provisional Application No. 60/153,112, filed Sep. 7, 1999; U.S. Provisional Application No. 60/160,519, filed Oct. 20, 1999; U.S. Provisional Application No. 60/167,405, filed Nov. 24, 1999; U.S. Provisional Patent Application No. 60/171,689, filed Dec. 21, 1999, each of which is expressly incorporated herein in its entirety. The transparent fob may contain a plurality of optically recognizable layers or an infrared-blocking ink to allow the transparent fobs to be recognized by a POS card reader.

Fob 1102 has a fold line 1114 that allows fob 1102 to be folded, as illustrated in FIGS. 1B and 1C. The fold line may be made by scoring the outer layers of fob 102 via a scoring means, such as a blade or a laser beam and allowing the inner layers to act as a hinge when the fob is folded.

In addition, the fob may include a reinforcing material at the location of fold line 1114 so that fold line 1114 does not pull apart, or otherwise destroy fob 1102 when folded. Of course, other materials may be utilized in fob 1102 to act as a hinge at fold line 1114, and the invention should not be limited in this regard. Moreover, fold line 1114 may comprise a break or small gap between the two halves of fob 1102 whereby a reinforcing strip may be disposed on one or both sides of fob 1102 for holding the two halves together to form a hinge. The strip may be a fabric or a thermoplastic material, such as an elastomeric material that may be stretched when the fob is folded, yet retain its shape when fob 1102 is unfolded.

The magnetic stripe 1112 may contain a material for storing information that may be read by a POS reader. Typically, magnetic stripe 1112 contains a series of digits that the magnetic card reader can utilize to obtain information about the account that the fob is associated with, or otherwise to obtain information relating to the amount of money or other equivalent good or service represented by fob 1102. Magnetic stripe 1112 of the present embodiment is, necessarily, split into two halves because of fold line 1114 that bisects magnetic stripe 1112. Therefore, the information contained on magnetic stripe 1112 must be readable by a magnetic card reader at a POS machine that accounts for fold line 1114. Typically, this means that some or all of the information should be contained on a first section 1116 of magnetic stripe 1112, and the rest or a duplicate of the information should be contained on a second section 1118 of magnetic stripe 1112. Therefore, the information contained on magnetic stripe 1112 may be readable by the POS reader. In addition, the magnetic stripe may be provided in parallel with one of the short ends of the fob, as illustrated in FIGS. 12A–12C, below.

Disposed in fob 1102 may be a plurality of apertures 1120, 1122, 1124 and 1126 that may be utilized to attach fob 1102 to a securing means, such as a ring 1130, as illustrated in FIGS. 11A–11C. Of course, any other securing means, such as a chain or string, for example, may be utilized and the invention should not be limited as herein described. The securing means can be provided in any of the apertures as needed. Aperture 1120 may include a channel 1128 that allows a securing means to be slipped into the aperture 1120. For example, as illustrated in FIG. 1C, ring 1130 may be provided within aperture 1126, but may also fit within aperture 1120 through channel 1128 so that the fob may remain folded. In addition, ring 1130 may be provided through one or both of the apertures 1122, 1124. If ring 1130 is provided through both of the apertures 1122 and 1124, ring 1130 may be configured in such a way as to allow fob 1102 to be unfolded when used.

Figure 12A:
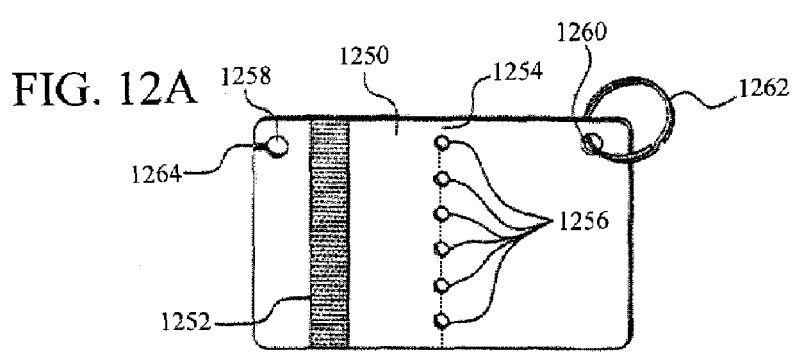
FIGS. 12A–12C illustrate an alternate embodiment of a fob that is transversely foldable.
Figure 12B:
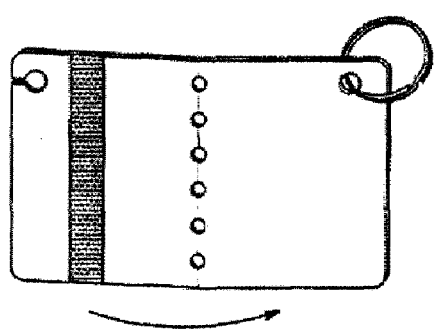
Figure 12C:
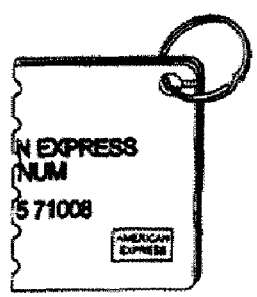

FIGS. 12A–12C illustrate an alternate example of the present invention of a foldable fob 1250 having a magnetic stripe 1252 that is parallel to a short side of fob 1250. Fob 1250 may be very similar to fob 102, as described above and may have a fold line 1254 that divides the fob into two halves. Of course, more than one fold line may be provided in fob 1250 for dividing the card into more than just two halves, as described below. The fob may further have a plurality of holes 1256 provided along fold line 1254 thereby giving fob 1250 a distinctive appearance, and further aiding in allowing fob 1250 to be folded along fold line 1254.

Fob 1250 may further have apertures 1258, 1260 for a securing means, such as a ring 1262, or other securing means such as a chain or a string, for example. Ring 1262 may be provided through aperture 1260, and may further be clipped into aperture 1258 after fob 1250 has been folded, as illustrated in FIG. 12C. To allow ring 1262 to be clipped into aperture 1258, aperture 1258 may include a channel 1264.

Figure 13A:
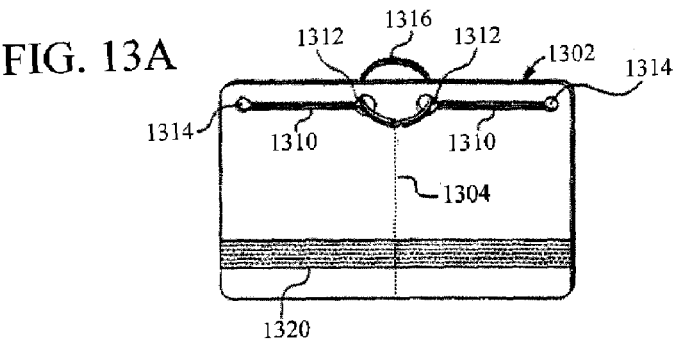
FIGS. 13A–13D illustrate a further alternate embodiment of a fob that is transversely foldable having an aperture and slot for a ring or key chain.
Figure 13B:
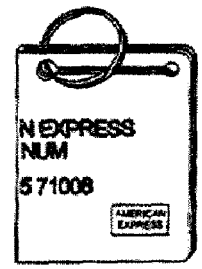
Figure 13C:
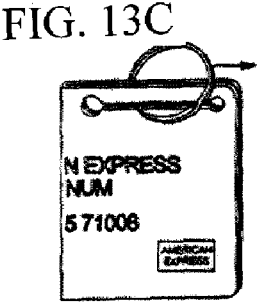
Figure 13D:
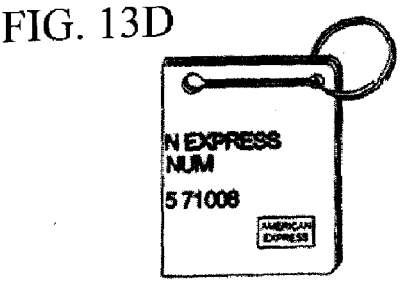

FIGS. 13A–13D illustrate a still further example of the present invention of a fob 1302 having similar features to fob 1102 of FIGS. 11A–11C. For example, fob 1302 includes a magnetic stripe 1320 and a fold line 1304 allowing fob 1302 to be folded, thereby making the fob smaller and more compact. Each half of fob 1302 may include a slit 1310 connecting two apertures 1312 and 1314. A ring 1316, or other securing means, may be provided through the apertures 1312 such that, when folded, as illustrated in FIGS. 13B–1 3D, ring 1316 may translate through slits 1310 to rest in aperture 1314, thereby keeping the two halves of fob 1302 together when folded. If fob 1302 is to be opened, ring 1316 is merely translated back to apertures 1312 and fob 1302 is unfolded.

Figure 14A:
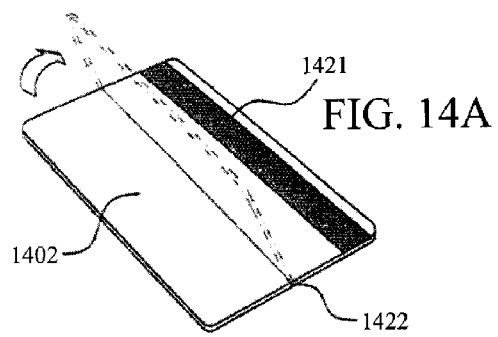
FIGS. 14A–14B illustrate a fob foldable longitudinally and parallel to the length-wise edges of the fob.
Figure 14B:
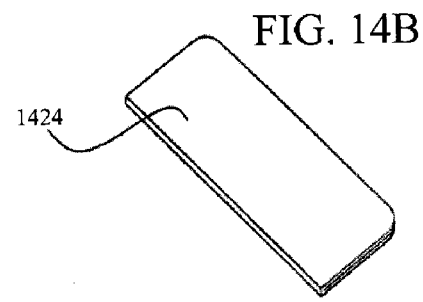

FIGS. 14A–14B illustrate another example of a fob 1402 having a magnetic stripe 1421 and a fold line 1422 disposed longitudinally through the center of fob 1402 such that when fob 1402 is folded along said fold line 1422, a folded fob 1424 is created, as shown in FIG. 14B, which thereby protects the magnetic stripe 1421. It should be noted that a smaller-sized fob may be created even if the fold line is not disposed longitudinally through the center of fob 1402.

Figure 15A:
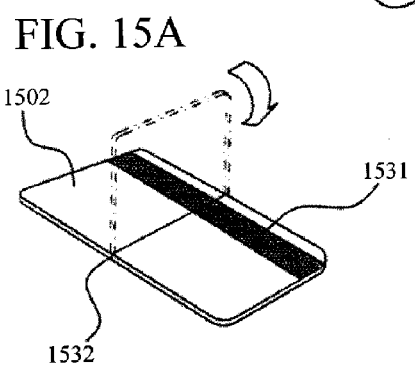
FIGS. 15A–15B illustrate a smaller-sized fob that is transversely foldable.
Figure 15B:

FIGS. 15A–15B illustrate another example of a miniature fob 1502 having a magnetic stripe 1531 and a fold line 1532 disposed transversely through the center of fob 1502 such that when the miniature fob 1502 is folded along said fold line 1532, a folded miniature fob 1534 is created, as illustrated in FIG. 15B. The size of the miniature fob 1502 may be smaller than a traditionally-sized fob. A miniature fob may be configured similarly to the miniature fob described above. Smaller-sized fobs are further described below with reference to FIGS. 31–38. It should be noted that a smaller-sized fob may be created even if the fold line is not disposed transversely through the center of fob 1502.

FIGS. 16A–16C illustrate another example of a foldable fob 1602 having a magnetic stripe 1641 and two fold lines 1642, 1644 disposed parallel to each other but diagonal relative to the edges of fob 1602. Fold lines 1642, 1644 allow fob 1602 to be folded such that flaps 1643, 1645 fold over section 1649 to form a folded fob 1646, as illustrated in FIG. 16B, which substantially protects magnetic stripe 1641. When unfolded, fob 1602 may be inserted into a slot 1647 of an automatic teller machine (ATM) or otherwise read by a POS reader 1648 without difficulty, as illustrated in FIG. 16C.

Figure 17A:
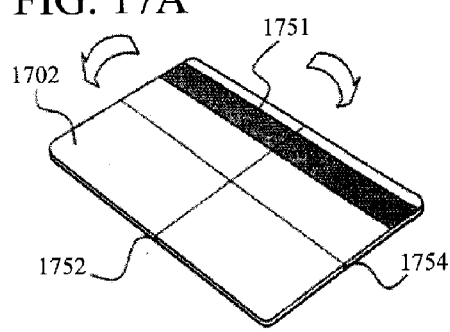
FIGS. 17A–17B illustrate a fob foldable once in a longitudinal direction, and once in a transverse direction.
Figure 17B:
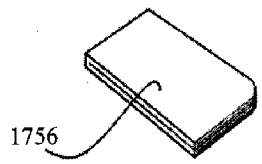

FIGS. 17A–17B illustrate another example of a foldable fob 1702 having a magnetic stripe 1751 and two fold lines 1752, 1754 that are disposed both longitudinally and transversely across fob 1702, thereby being disposed perpendicular to each other. Fold lines 1752, 1754 allow fob 1702 to be folded twice to form a folded fob 1756 that protects magnetic stripe 1751, as illustrated in FIG. 17B.

Figure 18A:
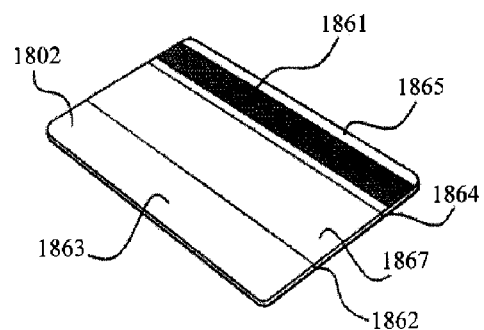
FIGS. 18A–18B illustrate a fob having two longitudinal fold lines disposed parallel to edges of said fob thereby forming a foldable fob having three sections.
Figure 18B:
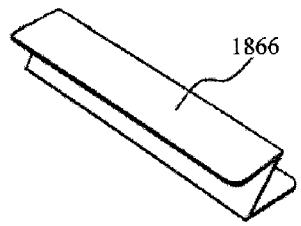

FIGS. 18A and 18B illustrate an alternate example of the present invention of a foldable fob 1802 having a magnetic stripe 1861 and two fold lines 1862, 1864 that are disposed longitudinally, but subdivide fob 1802 into three sections: a first section 1863, a second section 1865 and a third section 1867. In addition, fob 1802 may have two fold lines that are disposed transversely across the fob but also subdivide the transaction into thirds (not shown). Fold lines 1862, 1864 allow fob 1802 to be folded twice to form a folded fob 1866 that is small and compact and further that protects the magnetic stripe. The folded fob 1866 may be folded as shown in FIG. 18B, which shows fob 1802 such that the outer sections 1863, 1865 of fob 1802 are folded inwardly on opposite sides of the middle of the three sections 1867 in a "Z" configuration. In addition, fob 1802 may be folded such that the outer sections 1863, 1865 of fob 1802 may be folded inwardly on the same side of the middle section 1867 (not shown). Of course, the fold lines 1862, 1864 may not subdivide the fob into equal thirds, but subdivide the fob into three unequal sections. In addition, additional fold lines may be provided such that the fob may be subdivided into four or more equal or unequal portions.

In an alternate example of the present invention, a fob, similar to the cards described above with respect to FIGS. 11A–11C, may have a fold line disposed between at least first and second sections. Further, the fob may have a snap, button or other mechanism (collectively a "snap") which may hold the folded fob in a first engaged or locked position (collectively, the "engaged position"). The fob may not be usably accessible when the snap is in the engaged position. When the snap is actuated, the snap disengages or unlocks (collectively, the "dis-engaged position") and the second section of the fob unfolds into an "unfolded position." As noted, the fold line may be disposed either longitudinally or transversely across the face of the fob.

In the unfolded position, the fob becomes a full-sized financial fob and/or a card that may be used as a form of payment to conduct transactions and in standard financial fob readers, such as those at retail POS locations or ATM (cash) machines. In an exemplary embodiment, when the second section is folded and is otherwise inaccessible, the external surface area of the card is approximately half compared to when the second section is usably accessible in the unfolded position. In an alternate embodiment, the fob can be refolded by folding the first and second sections in relation to one another and re-engaging the snap to keep the card folded. To allow folding, the first and second sections may be coupled by a flexible material or hinge. In an alternative embodiment, the card may have a plurality of folding sections.

FIGS. 19A and 19B illustrate an alternate example of a foldable fob 1902 having two sections 1976, 1978 separated by a fold line 1972. Fob 1902 may be maintained in a folded stated via a spring-loaded clip. By releasing the spring-loaded clip 1974, the folded fob 1902 may unfold along fold line 1972 to form an unfolded fob 1979 having a visible and usable magnetic stripe 1971. The spring-loaded clip 1974 may be disposed on a side 1977 of the section 1978 that forms a side of fob 1902 when in the unfolded state.

Figure 20:
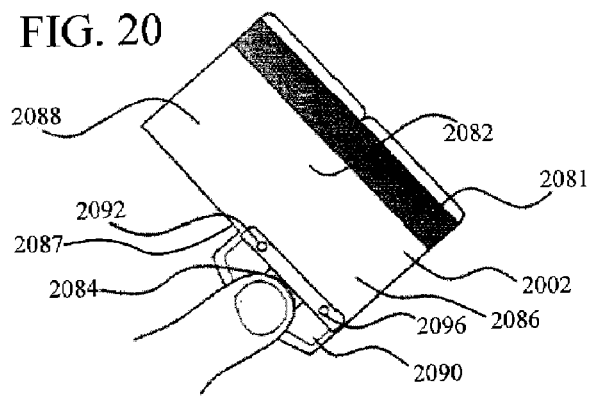
FIG. 20 illustrates a foldable fob having a spring-loaded clip and a holder for attaching to a ring or key chain.

Moreover, FIG. 20 illustrates a foldable fob 2002 having two sections 2086, 2088 separated by a fold line 2082. Fob 2002 may be maintained in the folded stated via a spring-loaded clip 2084. Fob 2002 may be similar to fob 1902, as illustrated in FIGS. 19A and 19B, except clip 2084 may be disposed on a side 2087 of the section 2086 that forms the bottom of the fob (opposite the magnetic stripe 2081). The spring-loaded clip 2084 may be interconnected with a holder 2090 having spring-loaded clip 2084 disposed thereon. Fob 2002 may be interconnected with holder 2090 via pins 2092, or via any other means that holds fob 2002 to holder 2090. Fob 2002 may be removable from holder 2090 so fob 2002 may be usable in any POS machine, such as a payment machine or an ATM.

In addition, fob 2002 may be permanently attached to holder 2090. The holder may further be attachable to a key chain, or the like, such that keys or the like may be removably attached to holder 2090, thereby minimizing the chances that fob 2002 may be misplaced. In addition, fob 2002 may be easily accessible if attached to a key chain or the like.

On external surfaces of fob 2002 (on the face of the fob opposite the magnetic stripe 2081) there may be disposed a protective material, such as a metallized surface, or other surface, that protects fob 2002 when fob 2002 is in the folded state. Specifically, a material such as aluminized polyester may be utilized as a coating or external layer of fob 2002. As shown in FIG. 20, magnetic stripe 2081 may be disposed on an inside surface of the foldable fob 2002 so that when folded, magnetic stripe 2081 is protected.

Figure 21A:
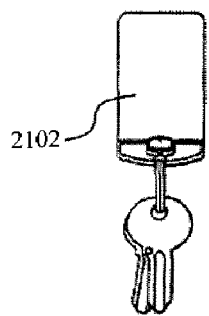
FIGS. 21A–21B illustrate a fob foldable into thirds and having a spring-loaded clip and a holder for attaching to a ring or key chain.
Figure 21B:
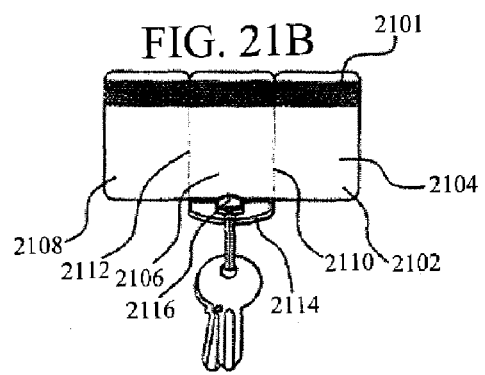

FIGS. 21A–21B illustrate a still further example of the present invention that is similar to the example shown in FIG. 20. FIGS. 21A and 21B show a fob 2102 having a magnetic stripe 2101 that may have a folded state (as shown in FIG. 21A) or an unfolded state (as shown in FIG. 21B). Fob 2102 may have three sections 2104, 2106 and 2108 that are separated by fold lines 2110, 2112. Outer sections 2104 and 2108 may fold inwardly toward center section 2106 to form the folded fob 2102, thereby protecting the magnetic stripe 2101. In addition, the outside surface of fob 2102 (i.e., the surface opposite the magnetic stripe) may be made from a material that protects fob 2102, such as a metallized material. For example, the outside layer of fob 2102 may be made from aluminized polyester.

A holder 2114 may be disposed on the fob 2102 on central section 2106, such that when folded together to form the folded state, a spring-loaded clip 2116 may hold the folded fob 2102 together. Although the present example is shown with holder 2114 disposed on central section 2106, holder 2114 may be disposed on any of sections 2104, 2106 or 2108 such that when folded, the holder may hold the folded fob in place with spring-loaded clip 2116. When actuated, the spring-loaded clip allows outer sections 2104, 2108 to unfold from central section 2106, thereby forming fob 2102 in the unfolded state. As with fob 2002, as shown in FIG. 20, fob 2102 may be detachable from holder 2114 such that fob 2102 may be utilized in a POS machine, such as an ATM.

In another embodiment, the fob has an associated holder, receptacle, pocket, or sleeve (collectively, the "carrier") that can fold in relation with the fob and in which the fob can be enclosed in whole or in part. The carrier itself may have a snap in an engaged or locked position such that in a first position, a second section of the carrier is folded in relation to a first section of the carrier (the "folded position of the carrier"), such that the fob is not usably accessible. When the carrier snap is actuated, the snap disengages or unlocks and the carrier second section unfolds in relation to the carrier first section, making accessible a foldable fob that simultaneously unfolds in relation to the carrier. The fob may be coupled to the carrier in a manner that allows it to be attached or detached. The carrier, in order to fold, may also have at least first and second sections coupled by a flexible material or hinge.

Figure 22A:
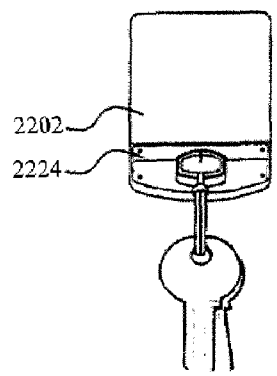
FIGS. 22A–22B illustrate a foldable fob disposed in a foldable housing, the foldable fob further having a spring-loaded clip and a holder for attaching to a ring or key chain.
Figure 22B:
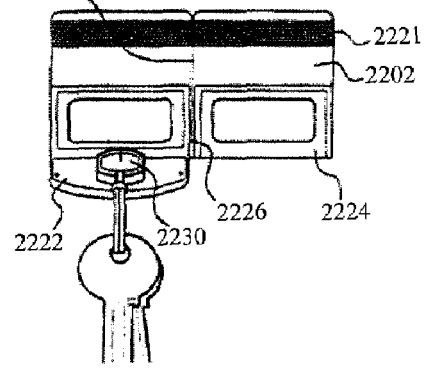

An example of this is shown in FIGS. 22A and 22B, which shows a fob 2202 having a magnetic stripe 2221 that may be in an unfolded state (as shown in FIG. 22B) or a folded state (as shown in FIG. 22A) due to a fold line or hinge 2222. Fob 2202 may be disposed within a carrier 2224 that may also have a fold line or hinge 2226. Both fob 2202 and the carrier 2224 may fold via the fold lines 2222 and 2226, respectively, to allow the fob to be disposed in the folded state, as illustrated in FIG. 22A. Further, fob 2202, which is disposed within carrier 2224, may be interconnected with a holder 2228 having a spring-loaded clip 2230 which can hold both carrier 2224 and fob 2202 in the folded state. When fob 2202 is in the folded state and clip 2230 is actuated, fob 2202 and carrier 2224 may be unfolded. When fob 2202 and carrier 2224 are folded, the clip may lock fob 2202 into the folded state.

Both fob 2202 and carrier 2224 may be detachable from holder 2228. In addition, fob 2202 may only be detachable from carrier 2224, thereby allowing the fob to be utilized in POS machines, such as ATMs. In addition, fob 2202 may be detachable and removable from carrier 2224, which may also be detachable and removable from holder 2228.

Although FIGS. 12A and 12B illustrate that carrier 2224 only covers a portion of fob 2202, carrier 2224 may cover more or less of fob 2202 than shown. For example, carrier 2224 may cover the entire surface of fob 2202 such that fob 2202 must be fully removable from carrier 2224 when utilized.

In addition, a fob may be foldable within a foldable carrier and slidable from the foldable carrier, such that the carrier and the fob together form a full-sized fob that may be utilized in POS machines. For example, a spring-loaded clip may be actuated thereby allowing a carrier and fob to unfold. Once unfolded, a slot may be exposed that allows a user of the fob to push the fob out of the carrier, thereby exposing the magnetic stripe. In addition, a button may be exposed whereupon actuating the button allows the fob to be slid from the carrier. However, the fob may not be fully removable from the carrier, but may merely be slidable such that a full-sized fob is made from the smaller-sized fob and the carrier.

Fob 2202 may have a metallized surface such that the surface protects fob 2202. For example, the surface of the fob may be made from aluminized polyester. In addition, carrier 2224 may be metallized, or made from some other protective material, to protect fob 2202. When folded, fob 2202 protects magnetic stripe 2221.

Figure 23A:
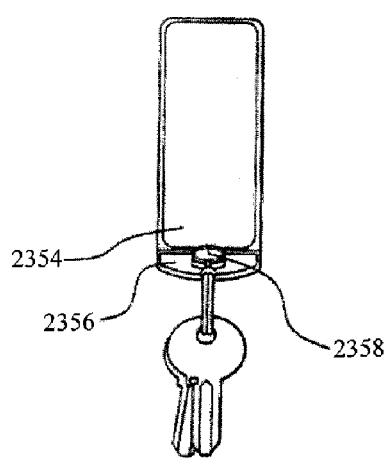
FIGS. 23A–23B illustrate a foldable fob that is longitudinally foldable, the fob having a spring-loaded clip and a holder for a ring or key chain.
Figure 23B:
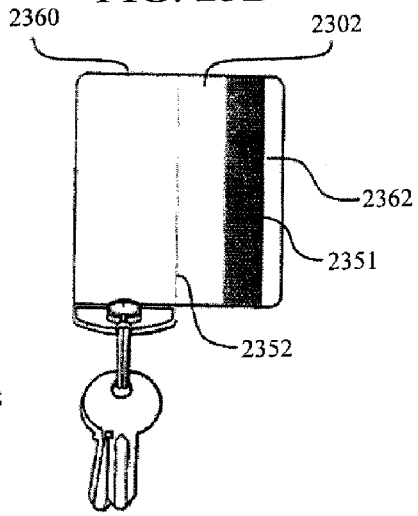

In an alternate example of the present invention, FIGS. 23A and 23B show a foldable fob 2302 having a magnetic stripe 2351 that may be foldable because of a fold line 2352. Fob 2302 may be disposed within a case 2354 that is interconnected with a holder 2356 having a spring-loaded clip 2358. Case 2354 may be formed like a clamshell, in that fob 2302 form the two halves of the case and magnetic stripe 2351 is exposed when case 2354 is opened. The bottom portion or first section 2360 of case 2354 may have a portion of fob 2302 affixed thereto, or may be formed simply as a protective layer on fob 2302, such as aluminized polyester or the like. The top portion or second section 2362 of case 2354 may also have a portion of fob 2302 affixed thereto, or may also be formed simply as a protective layer on fob 2302, such as aluminized polyester or the like. Spring-loaded clip 2358 may hold case 2354 together when the case is in the folded state.

Figure 24A:
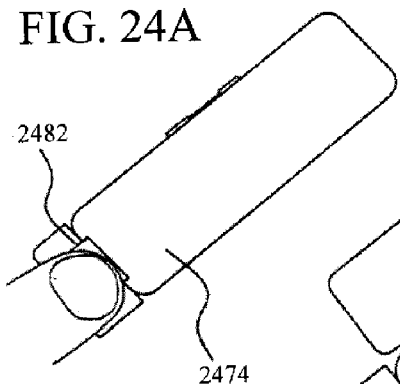
FIGS. 24A–24B illustrate a longitudinally foldable fob disposed within a protective case.
Figure 24B:
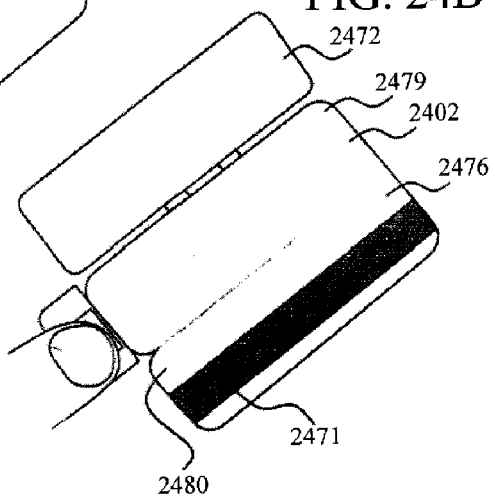

FIGS. 24A and 24B show an alternate example of a fob 2402 having a magnetic stripe 2471 that is similar to fob 2302, described above in relation to FIGS. 23A and 23B, except fob 2402 may have be disposed within a case 2474 having a bottom portion or first section 2480 of case 2474 and a protective cover or second section 2472 of case 2474. The protective cover 2472 may be made from metal, plastic or other material that will protect the foldable fob 2402 contained therein. Specifically, fob 2402 may have a first section 2479 and a second section 2476, wherein second section 2476 has magnetic stripe 2471. First section 2479 may be integrally formed with or removably attached to the bottom portion 2480 of case 2474. If first section 2479 is integrally formed with bottom portion 2480 of case 2474, it may have a metallized surface, or other protective surface, to protect first section 2479 of fob 2402 when fob 2402 is folded and the protective cover 2472 is folded over bottom portion 2480.

When folded together, fob 2402 may be enclosed within protective cover 2472 and bottom portion 2480, as shown in FIG. 24A. When utilized, an individual may actuate a spring-loaded clip 2482 that allows protective cover 2472 to open, thereby exposing fob 2402 therein. First section 2476 may then be unfolded, thereby exposing magnetic stripe 2471 to be utilized at a POS machine.

FIGS. 25A–25D illustrate an alternate example of a foldable fob system 2500 that is similar to foldable fob system 2402, described above with reference to FIGS. 24A–24B. Foldable fob system 2500 may comprise a case 2501 and an actuator 2520, such as a spring-loaded clip, a button or the like, that may be utilized to open case 2501, as illustrated in FIG. 25B, via a hinge 2504. Hinge 2504 may be tensioned to automatically shut when not held open. In addition, hinge 2504 may be tensioned to automatically open when actuator 2520 is actuated. Case 2501 includes a lid 2503 and a base 2505 interconnected via hinge 2504.

A foldable fob 2506 may be contained within case 2501. Foldable fob 2502 may have a first section 2510 and a second section 2508 that may be interconnected via a fob hinge 2512. Fob hinge 2512 may comprise a line of weakness disposed in the one or more layers of fob 2502. In addition, hinge 2512 may comprise a hinge material 2521, such as a polymeric material, a fabric, or some other equivalent reinforcing material, which may be disposed over the line of weakness or space between first section 2510 and second section 2508. In one embodiment, the hinge material may be a thermoplastic polymeric sheet or film, such as, for example, polypropylene, that may be adhered to both first section 2510 and second section 2508 to allow first section 2510 and second section 2508 to fold relative to each other.

Further, disposed on an opposite side of fob 2502 may be a further hinge material 2522, as illustrated in FIG. 25D, that may allow first section 2508 and second section 2510 to be foldable relative to each other. The further hinge material 2522 may be any material, such as a polymeric material, a fabric, or other like material, similar to hinge material 2521, described above. The further hinge material 2522 may further be a softer and more elastic material than the material 2521 so as to allow fob 2502 to be folded to protect a magnetic stripe 2514 that may be disposed on the same side of fob 2502 as hinge material 2521. The further hinge material 2522 may be a nitrile or neoprene elastomeric material that can easily stretch when fob 2502 is folded and yet retains its shape when fob 2502 is unfolded.

Of course, fob 2502 may include magnetic stripe 2514 or other features that are typically contained on a fob, such as a holographic security indicator, embossed alpha-numeric characters, graphics, a signature panel, microchip or other like feature (not shown).

Fob 2502 may be disposed within case 2501 and held within case 2501 via tracks 2516a, 2516b within which fob 2502 may be slid. In addition, fob 2502 may be removable from tracks 2516a, 2516b so that fob 2502 may be fully removable from case 2501, as illustrated in FIG. 25C.

FIG. 25D illustrates case 2501 having tracks 2516a, 2516b cut-away to reveal tabs 2518a, 2518b that may be disposed within tracks 2516a, 2516b that may engage with the fob 2502 when fob 2502 is slid within tracks 2516a, 2516b. Tabs 2518a, 2518b may engage recesses 2520a, 2520b that may be disposed on or within first section 2510 of fob 2502. Tabs 2518a, 2518b may hold fob 2502 within case 2501, thereby keeping fob 2502 from falling out of case 2501 when case 2501 is opened. However, fob 2502 may be easily removable from the case when desired by being pulled from case 2501 and slid from tracks 2516a, 2516b.

Figure 26A:
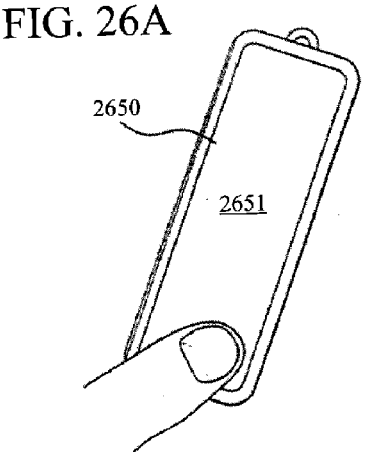
FIGS. 26A–26C illustrate an alternate embodiment of a foldable fob system.
Figure 26B:
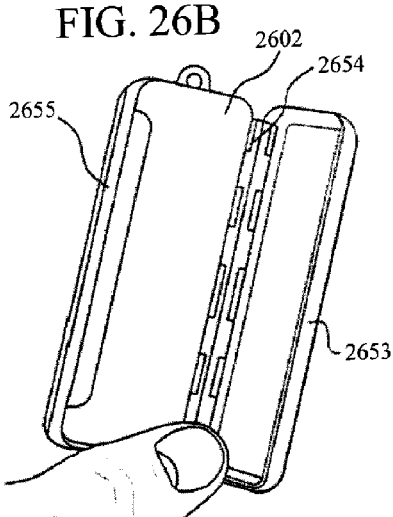
Figure 26C:
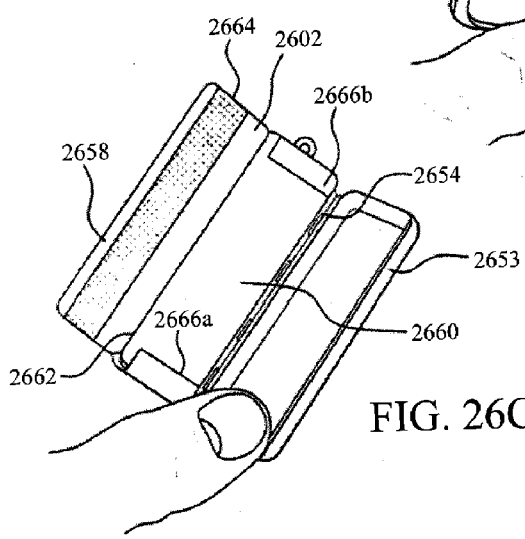

FIGS. 26A–26C illustrate an alternate example of a foldable fob system 2650 comprising a case 2651, having a lid 2653 and a base 2655. Lid 2653 and base 2655 may be separated by a hinge 2654 that is tensioned so as to automatically close lid 2653 upon base 2655. Therefore, to open case 2651, an individual must merely swing lid 2653 from base 2655 against the tension of hinge 2654, thereby allowing a foldable fob 2602 to be exposed.

Fob 2602 may have a first section 2660 and a second section 2658 that are interconnected via a fob hinge 2662. Hinge 2662 may be similar, if not identical, to fob hinge 2512, as described above with reference to FIGS. 25A–25D.

Fob 2602 may be contained within case 2651 by being disposed within tracks 2666a, 2666b. The tracks may engage fob 2602 when fob 2602 is slid within tracks 2666a, 2666b. Moreover, tabs (not shown) may be disposed within the tracks, and may be similar, if not identical, to tabs 2518a, 2518b as described above with reference to FIG. 25D. Moreover, the foldable fob may have recesses (not shown) substantially as described above with reference to foldable fob 2502 described above.

In use, lid 2653 may be swung from base 2655 to expose fob 2602 contained therein. The foldable fob, having fob hinge 2662 may be opened to expose a magnetic stripe 2664 disposed on or within fob 2602. The unfolded fob may be swiped or otherwise utilized at a POS device while remaining disposed within case 2651. In addition, fob 2602 may be removed from case 2651 to be utilized, such as being physically disposed within a POS device, such as an ATM, or the like.

Figure 27:
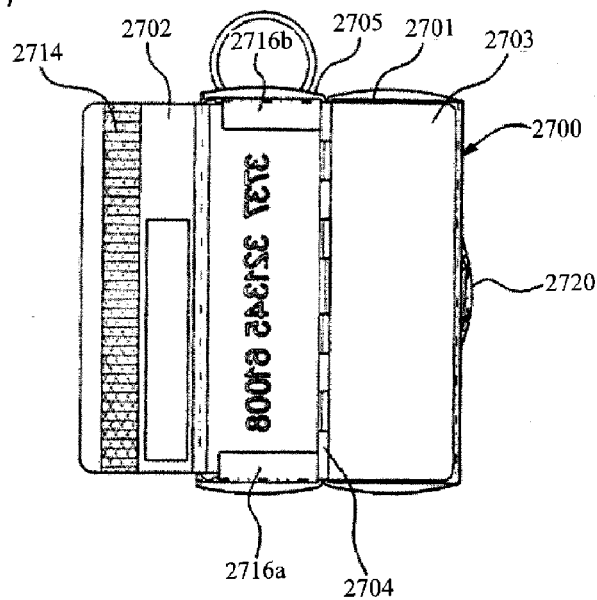
FIG. 27 illustrates an alternate embodiment of a foldable fob system having an actuating means disposed on an edge of a case for opening the case and accessing the fob disposed therein.

FIG. 27 illustrates an alternate embodiment of a foldable fob system 2700 of a foldable case 2701 having a lid 2703 and a base 2705 separated by a hinge 2704. A foldable fob 2702 may be disposed within tracks 2716a, 2716b so as to be removable from case 2701 when case 2701 is unfolded. Case 2701 further has an actuator 2720 disposed on the edge of lid 2703 for allowing case 2701 to be opened when the actuator is actuated. Specifically, lid 2703 and base 2705 may remain together when case 2701 is folded by an engaging means, such as a clip or other like device. By actuating actuator 2720, the engaging means may release, thereby allowing lid 2703 to swing away from base 2705. Hinge 2704 may be spring-loaded, thereby allowing lid 2703 to easily and automatically swing away from base 2705. Foldable fob 2702 contained therein may be unfolded via a fob hinge 2704, thereby exposing the magnetic stripe 2714. Foldable fob 2702 may then be utilized. In addition, foldable fob 2702 may be removed from case 2701 and utilized.

Foldable fob 2702 may be removably disposed within case 2701 in a similar manner as described above with reference to FIGS. 25A–25D and FIGS. 26A–26C. Specifically, foldable fob 2702 may be contained within case 2701 by being disposed within the tracks 2716a, 2716b. The tracks may engage foldable fob 2702 when foldable fob 2702 is slid within tracks 2716a, 2716b. Moreover, tabs (not shown) may be disposed within tracks 2716a, 2716b, and may be similar, if not identical, to the tabs 2518a, 2518b as described above with reference to FIGS. 25A–25D. Moreover, the foldable fob may have recesses (not shown) substantially as described above with reference to foldable fob 2502 described above in FIG. 25D.

Figure 28A:
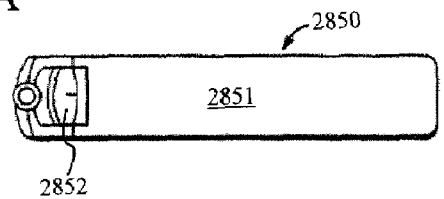
FIGS. 28A–28C illustrate an alternate embodiment of a foldable fob system for a tri-foldable fob.
Figure 28B:
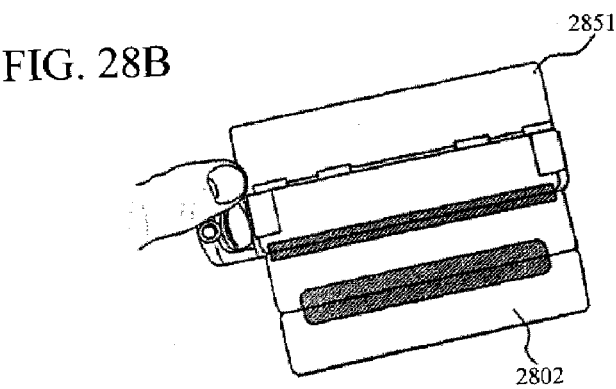
Figure 28C:
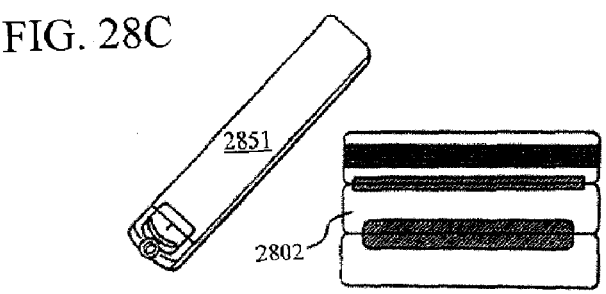

FIGS. 28A–28C illustrate an alternate embodiment of a foldable fob system 2850 substantially similar to the foldable fob system 2500 illustrated above with respect to FIGS. 25A–25D, including an actuator 2852 substantially similar to actuator 2520 described above. However, system 2850 may comprise a case 2851 that may be smaller in width than the case 2501. The foldable fob 2802 disposed within case 2851 may be tri-folded, thereby providing a folded fob that takes up less width space, thereby allowing a smaller or narrower case 2851 to be utilized. As with foldable fob 2502, described above, foldable fob 2802 may be usable within case 2851, as illustrated in FIG. 28B, or may be completely removed from case 2851, as illustrated in FIG. 28C.

Figure 29:
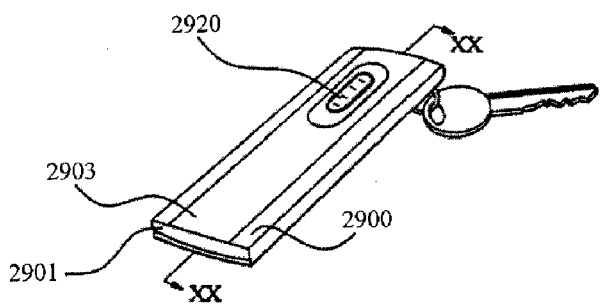
FIG. 29 illustrates a further alternate embodiment of a foldable fob system having an actuating means disposed on a surface of a case for opening the case and accessing the fob disposed therein.

FIG. 29 illustrates an alternate embodiment of a foldable fob system 2900 of a case 2901 having a foldable fob contained therein (not shown), which is substantially similar to the foldable fob system 2700, described above with reference to FIG. 27. However, foldable fob system 2900 includes an actuator 2920 disposed on a surface of a lid 2903 of the case 2901, having the foldable fob (not shown) contained therein. Actuator 2920 may be disposed such that the actuator does not protrude greatly or at all from the surface of lid 2903. By actuating the actuator case 2901 may be opened to access the foldable fob (not shown) that may be contained therein.

Figure 30A:
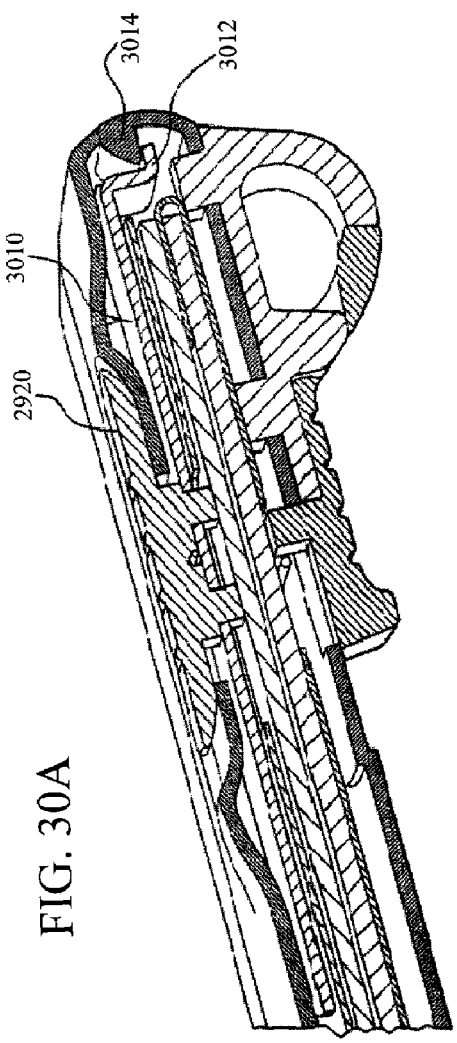
FIGS. 30A–30B illustrate cross-sectional views of the foldable fob system in the alternate embodiment.
Figure 30B:
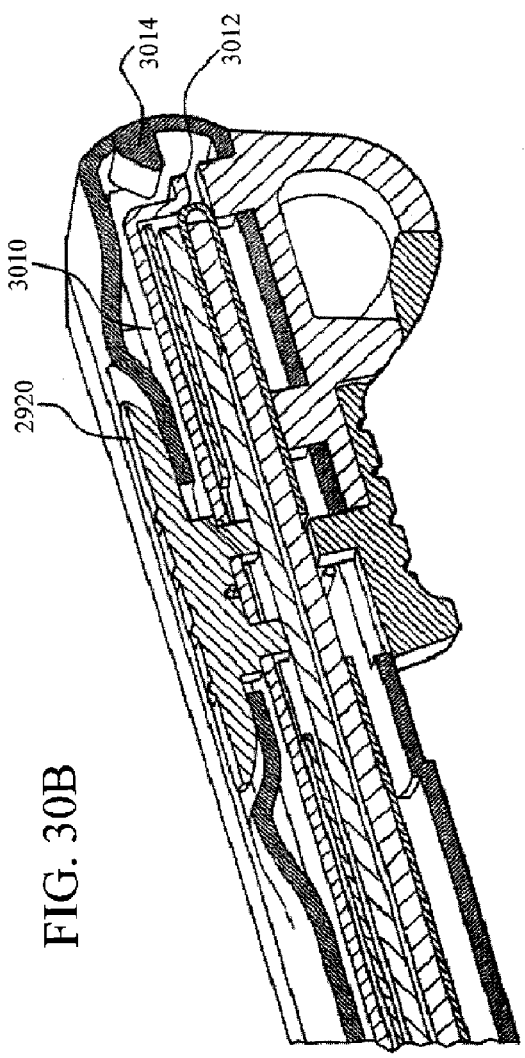

FIGS. 30A–30B illustrate cross-sectional views of case 2901 illustrating the actuator that allows case 2901 to open when actuator 2920 is actuated. Specifically, FIG. 30A illustrates the actuating mechanism when case 2901 is closed. Actuator 2920 is interconnectedly engaged with an arm 3010 having an end 3012 that may be configured to engage a tab 3014. End 3012 of arm 3010 engages tab 3014 to keep case 2901 from opening. When actuator 2920 is actuated, by depressing actuator 2920 or otherwise moving actuator 2920, end 3012 of arm 3010 may disengage from tab 3014, thereby allowing case 2901 to open, exposing the foldable fob contained therein. For example, as illustrated in FIG. 30B, actuator 2920 may be moved with a thumb or finger, thereby moving arm 3010 and disengaging end 3012 of arm 3010 from tab 3014.

Figure 31A:
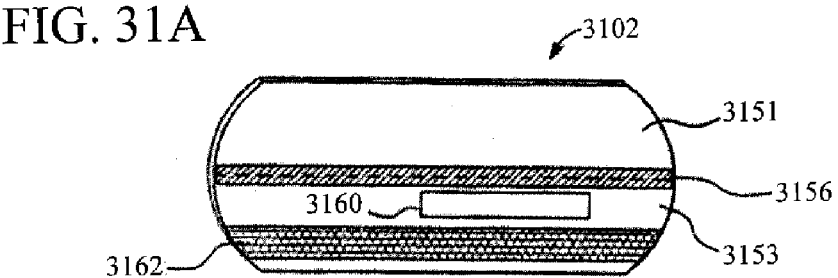
FIGS. 31A–31C illustrate an alternate embodiment of a foldable fob.
Figure 31B:
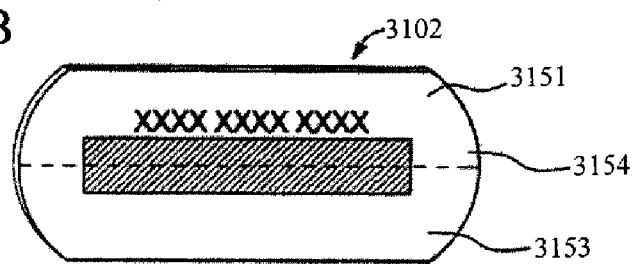

FIGS. 31A–31B illustrates an alternate embodiment of a foldable fob 3102 having a shape different from that of a traditional fob. Foldable fob 3102 includes features common to traditional fobs, such as a signature panel 3160 and a magnetic stripe 3162. Of course, other features common to traditional fobs may also be included, such as holographic images useful as security indicators, embedded microchips, or other like features.

Figure 31C:
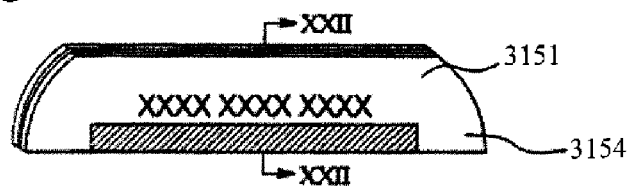

Specifically, fob 3102 comprises two halves 3151, 3153 that may be attached together via a hinge material 3154 and a hinge backing material 3156. Hinge material 3154 may comprise an elastomeric material, such as a nitrile or neoprene elastomeric material, that may be disposed between two halves 3151, 3153. Of course, any other hinge material is contemplated that may attach two halves 3151, 3153 together, thereby allowing fob 3102 to fold. Hinge material 3154 may, therefore, stretch when foldable fob 3102 is folded but retain its shape when fob 3102 is unfolded. Typically, foldable fob 3102 is folded such that the signature panel 3160 and the magnetic stripe 3162 are disposed within the folded fob, thereby protecting the signature panel and, especially, the magnetic stripe. The hinge backing material 3156 may be provided on an opposite side of fob 3102 to provide reinforcement so that two halves 3151, 3153 do not separate. Typically, the hinge backing material may be polypropylene, or other thermoplastic material that reinforces the hinge created between two halves 3151, 3153 of foldable fob 3102. Of course, other materials are contemplated that can reinforce the hinge created between two halves 3151, 3153. FIG. 31C illustrates foldable fob 3102 folded.

Foldable fob 3102 may be any size. In one embodiment, foldable fob 3102 may have one or more dimensions smaller than traditional fobs. Specifically, a traditional fob may be about 3⅜ inches long and about 2¼ inches wide. Foldable fob 3102 may have a greatest length (measured from the middle of foldable fob 3102) that is less than 3⅜ inches. Particular embodiments illustrating non-traditionally-sized fobs are described herein with reference to FIGS. 34–44B, as described below.

Figure 32:
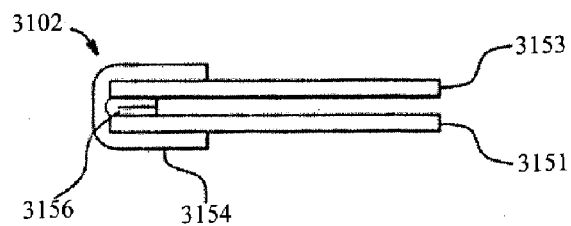
FIG. 32 illustrates a cross-sectional view of the foldable fob in the alternate embodiment.

FIG. 32 illustrates a cross-sectional view of fob 3102 folded, thereby illustrating hinge material 3154 and the hinge backing material 3156 utilized to create the hinge in foldable fob 3102. Specifically, hinge material 3154 is stretched when fob 3102 is folded. Because hinge material 3154 may be made from an elastomeric material, hinge material 3154 may stretch when fob 3102 is folded and then may retain its original shape when fob 3102 is unfolded.

Figure 33:
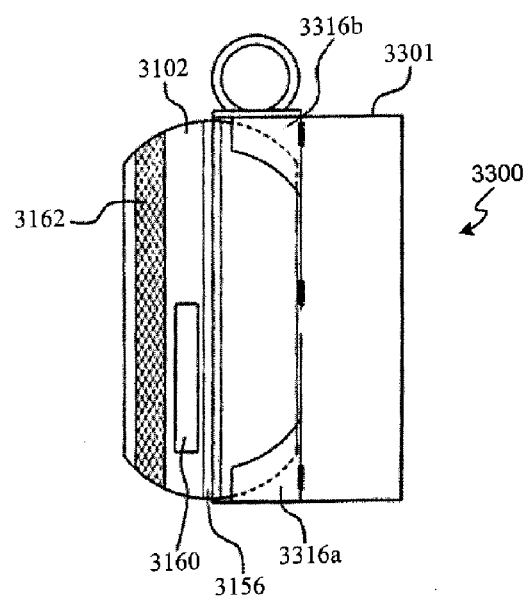
FIG. 33 illustrates a still further alternate embodiment of a foldable fob system.

FIG. 33 illustrates a foldable fob system 3300 incorporating foldable fob 3102, described above with respect to FIGS. 31A–31C and FIG. 32. Foldable fob 3102 may include signature panel 3160 and magnetic stripe 3162. Moreover foldable fob system 3300 may include a case 3301 that is substantially similar to the foldable fob system 2700, described above with reference to FIG. 27. However, case 3301 may include tracks 3316a, 3316b that are generally shaped like the edges of the foldable fob. Specifically, since the edges of foldable fob 3102 may have curved edges, rather than straight edges, which would be typical for a traditional fob, tracks 3316a, 3316b may also be curved to follow the curve of fob 3102. In addition, tracks 3316a, 3316b may be any other shape to hold fob 3102 therein. In addition, since foldable fob 3102 may have at least one dimension that is smaller than traditional fobs, case 3301 may be smaller than if a traditionally-sized fob was utilized.

The fobs of the present embodiment described herein may have lengths and widths that are smaller or larger than traditional fobs. More specifically, a traditional fob may have a length of about 3⅜ inches and a width of about 2¼ inches. Therefore, a fob having a length, for example, of less than 3⅜ inches may allow for a smaller foldable fob system when the fob has a fold therein and is disposed within a case, as described above. FIGS. 24–33B illustrate various embodiments of fobs and foldable fob systems that may be utilized herein having dimensions (i.e., lengths and widths, that are non-traditional).

Figure 34:
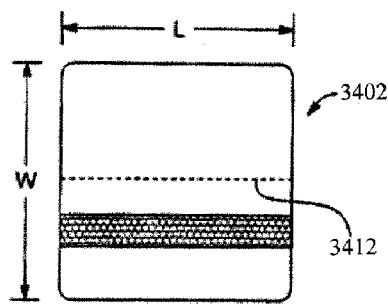
FIGS. 34–38 illustrate still further alternate embodiments of non-traditionally-sized and shaped fobs that may be utilized in embodiments described herein.

The fob 3402 shown in FIG. 34 has a width (W) of less than approximately 1 inch and a length (L) of also less than approximately 1 inch. For example, as shown in FIG. 34, fob 3402 is generally square and the width W could be approximately ¾ inch and the length L could also be approximately ¾ inch. A fold line 3412 may be disposed within fob 3402, as described above.

Figure 35A:
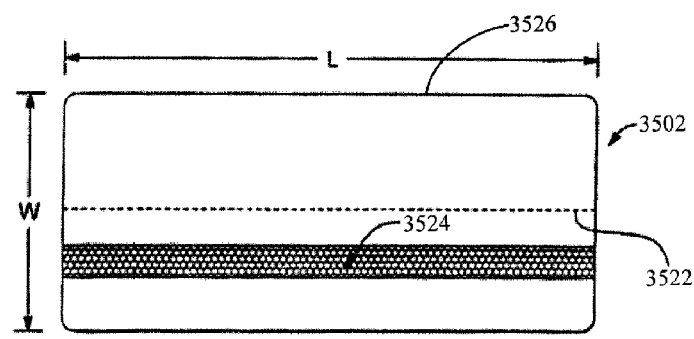
Figure 35B:
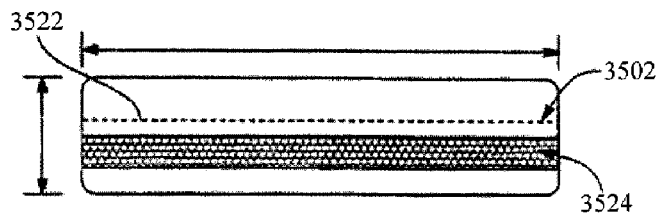

FIGS. 35A and 35B illustrate alternate embodiments of a fob 3502 having a magnetic stripe 3524 that is parallel to a side 3526 of fob 3502. Fob 3502 may be made from the same or similar materials as fob 3402 described above with reference to FIG. 1. In addition, fob 3502 may have a fold line 3522 disposed within fob 3502, as described above.

Fob 3502 shown has a width (W) and a length (L). In this particular embodiment, fob 3502 has a length (L) of greater than 3 inches, and more preferably of greater than approximately 3⅜ inches. For example, as shown in FIG. 35A, fob 3502 may have a width (W) of approximately 2 inches and a length (L) of approximately 4 inches. In addition, as shown in FIG. 35B, the width (W) could be approximately 1 inch and the length (L) could be approximately 3⅞ inches. Therefore, fob 3502 may be longer than a standard fob, but narrower than a standard fob. This may allow fob 3502 to be kept or stored in locations where the widthwise dimension limits the storage capability of fob 3502.

Figure 36A:
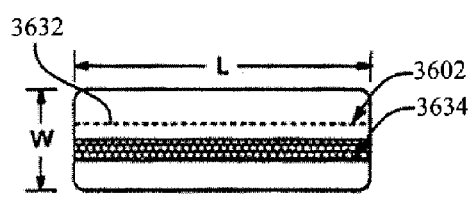
Figure 36B:
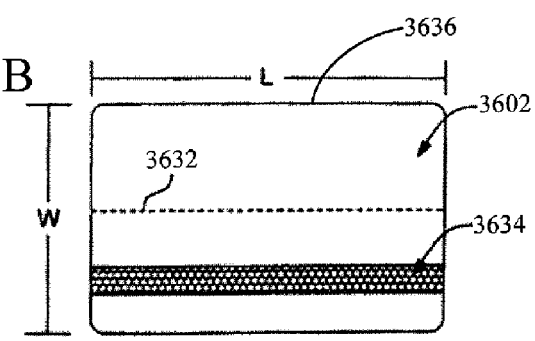

FIGS. 36A and 36B illustrate further alternate embodiments of a fob 3602 having a magnetic stripe 3634 that is parallel to a side 3636 of fob 3602. Fob 3602 may be comprised of the same materials as described above with reference to fob 3402. In addition, fob 3602 may have a fold line 3632 disposed within fob 3602, as described above.

Fob 3602 has a width (W) and a length (L). In the embodiment described herein with reference to FIGS. 36A and 36B, fob 3602 has a length (L) of between approximately 1 inch and approximately 3 inches and a width (W) of less than approximately 1 inch or greater than approximately 1⅞ inches. For example, as shown in FIG. 36A, fob 3602 may have a width (W) of approximately ¾ inch and a length (L) of approximately 2¼ inches. In addition, as shown in FIG. 36B, the width (W) could be approximately 2⅛ inches and the length (L) could be approximately 3 inches.

Figure 37:
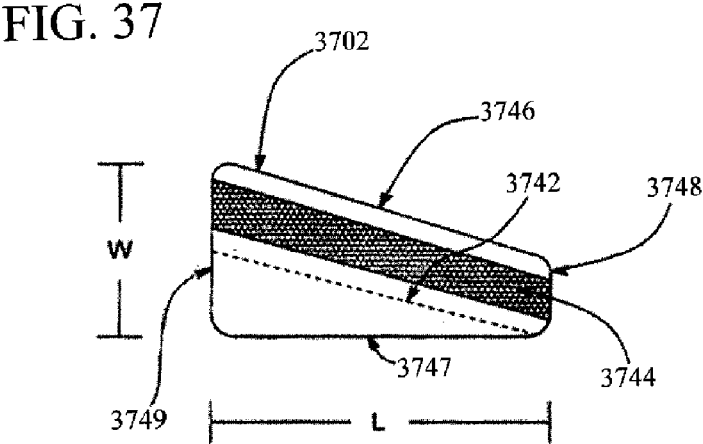

FIG. 37 illustrates an alternate embodiment of a fob 3702 having a magnetic stripe 3744 that is parallel to a side 3746 of fob 3702. Alternately, the magnetic stripe may be parallel to one of the other sides 3747, 3748 or 3749. Fob 3702 may be comprised of the same or similar materials as that of fob 3402. In this particular embodiment, fob 3702 has at least one set of opposing sides 3746 and 3747, or 3748 and 3749 that is not parallel. In addition, fob 3702 may have a fold line 3742 disposed within fob 3702, as described above.

Fob 3702 shown has a width (W) and a length (L). Fob 3702 has a length (L) of between approximately 1 inch and approximately 1⅞ inches or a length (L) of greater than approximately 3 inches, and more preferably of greater than approximately 3⅜ inches. In addition, the width (W) is less than approximately 1 inch or greater than approximately 1⅞ inches. For example, as shown in FIG. 37, fob 3702 may have a width (W) of approximately ¾ inch and a length (L) of approximately 1½ inches. In addition, the width (W) could be approximately 2 inches and the length (L) could be approximately 3½ inches.

Figure 38:
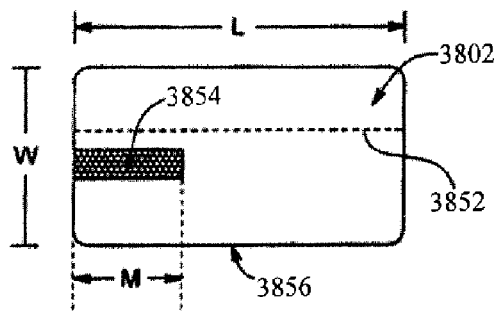

FIG. 38 illustrates an alternate embodiment of a fob 3802 having a magnetic stripe 3854 that is parallel to a side 3856 of fob 3802. Fob 3802 may comprise the same or similar material as that described above with reference to fob 3402, as noted above of the same or similar construction to fob 3402 described above. In addition, fob 3802 may have a fold line 3852 disposed within fob 3802, as described above.

Fob 3802 may have any length (L) or width (W), so long as fob 3802 has a magnetic stripe 3852 of length (M), which is less than approximately 1 inch. In addition, fob 3802 may have any length (L) or width (W), so long as the length (M) of the magnetic stripe 3854 is greater than approximately 3 inches long and preferably greater than approximately 3⅜ inches long.

As noted above, each embodiment of a non-traditionally sized fob (i.e., having dimensions larger or smaller than traditionally-sized fobs) may have a fold line disposed therein and a hinge material that allows the fob to fold and unfold. The foldable non-traditionally sized fob may be incorporated into a foldable fob system, whereby the foldable fob has a case or housing for holding and/or storing the foldable fob. The non-traditionally sized foldable fob allows for the use of cases that are smaller in a certain dimension, such as a length and/or width, thereby providing fob systems that may be smaller, and more usable, especially when incorporated onto a key chain or other like connecting means. Of course, other sizes and shapes of fobs may be utilized in the present invention to arrive at a foldable fob system that is compact and convenient.

FIGS. 39–44B illustrate exemplary embodiments of the present invention of a fob 3002 having dimensions smaller than a traditionally-sized fob (i.e., smaller than about 3⅜ inches in length and/or smaller than about 2¼ inches in width). Most preferably, fob 3902 has a length (L) of approximately 2⅛ inches and a width (W) of approximately 1¼ inches, for an aspect ration (L/W) of approximately 1.7.

It should be noted that the dimensions of the fobs disclosed herein are representative only and the invention described herein should not be limited to any particular dimensions. In certain embodiments, the fobs have dimensions ranging in length (L) from approximately 1 inch to approximately 3 inches, and ranging in width (W) from approximately 1 inch to approximately 1⅞ inches, for an aspect ratio (L/W) ranging from approximately 0.53 (1/1.785) to approximately 3 (3/1). In another embodiment, the length (L) of a fob described herein may be approximately 2 9/16 inches. Moreover, the width (W) of the fob having a length of 2 9/16 inches may be about 1 9/16 inches.

Figure 39:
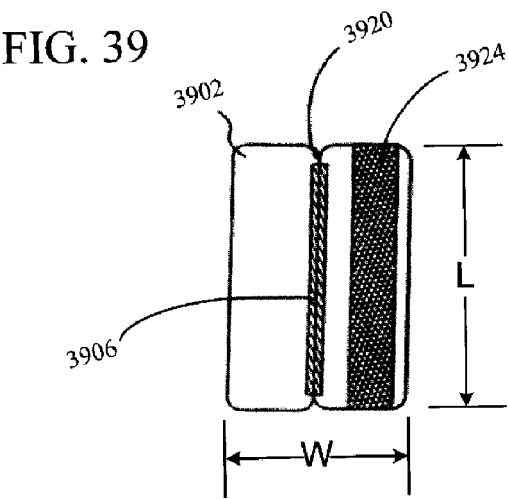
FIG. 39 illustrate another alternate embodiment of a foldable fob of the present invention having length and width dimensions that are smaller than traditionally-sized fobs.

A magnetic stripe 3924 may be contained on fob 3902. Magnetic stripe 3924 may be located on the back side of fob 3902 (or in any other location apparent to one having ordinary skill in the art) and may be oriented either perpendicularly to the card's largest dimension or, in one embodiment, parallel to the card's largest dimension, as illustrated in FIG. 39. Additionally, magnetic stripe 3924 of fob 3902, as well as all magnetic stripes described herein with respect to the other Figures, is compatible with existing POS terminals, such as slide readers ATMs and the like. Magnetic stripe 3924 may be any width such that information may be stored thereon. A narrower or shorter magnetic stripe may contain less information than a longer or wider magnetic stripe. In addition, the magnetic stripe of the fobs described herein may have higher bit densities than traditional fobs allowing for more information to be stored thereon.

For example, a typical magnetic stripe used on traditionally-sized fobs has up to three tracks, which conforms to standards set forth in ISO/IEC 7811. Each track is essentially a strip of specified width and location running the length of the magnetic stripe, on which data is encoded. According to ISO/IEC 7811, the first track of a three track magnetic stripe, is located closest to the edge of the card and contains data encoded at 210 bits per inch ("bpi"). The second track is adjacent to the first track and contains data encoded at 75 bpi. The third track is furthest from the edge of the card and contains data encoded at 210 bpi. According to ISO/IEC 7811, data is encoded on the tracks via two-frequency encoding. Higher bit densities would allow more data to be encoded over shorter magnetic stripe lengths. For example, data on the first and third tracks may be encoded at densities up to about 260 bpi or more. In addition, data on the second track may be encoded at densities up to about 100 bpi or more. Of course, other bit densities could be selected for the tracks in the magnetic stripe, and the invention should not be limited as herein described.

Fob 3902 further may include other features common to traditional fobs, such as various security features, including but not limited to, an identification photograph, additional information, a signature panel, a holographic image, a microchip or the like.

Of course, fob 3902 may have a fold-line 3920 that bisects fob 3902, as illustrated in FIG. 39. The fold line may be as described above with respect to the other embodiments described herein. In one embodiment, fold-line 3920 incorporates a hinge 3906 that connects two otherwise independent sections of fob 3902. The hinge may be composed of an elastomeric thermoplastic material, or any other material, that may allow the two sections to fold with respect to one another.

Figure 40:
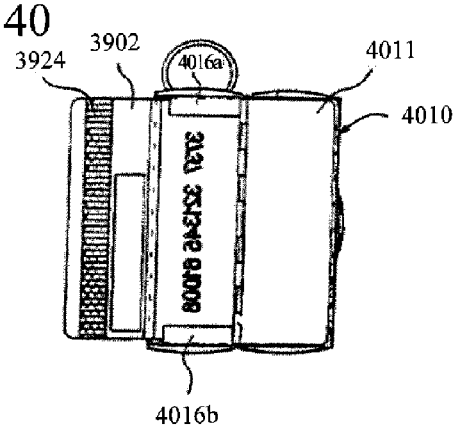
FIG. 40 illustrates a foldable fob system comprising a foldable fob within a housing wherein the foldable fob has length and width dimensions that are smaller than traditionally-sized fobs.

As illustrated in FIG. 40, fob 3902 may be incorporated into a case 4011 to form a foldable fob system 4010. Case 4011 may be substantially similar to the cases, housings or holders described above with respect to FIGS. 27, 29 and 33. However, case 4011 may have dimensions that are smaller than those needed to contain a traditionally-sized fob. For example, either the length or width of the case 4011 may be shorter depending on the relative dimensions of fob 3902 contained therein. Case 4011 may further include tracks 4016a, 4016b to hold fob 3902 therein.

FIGS. 41A–44B illustrate still further embodiments of foldable fobs having one or more dimensions smaller than a traditional fob and foldable fob systems for storing, housing or otherwise holding the foldable fob therein.

Figure 41A:
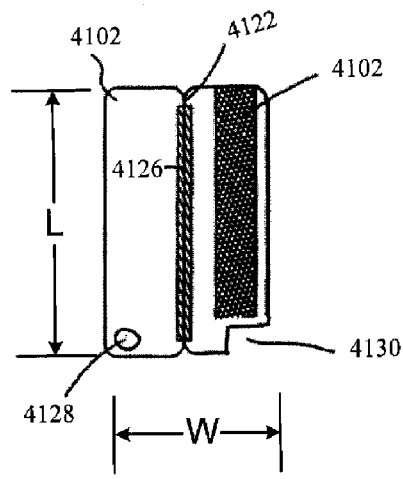
FIGS. 41A–41B illustrate a still further embodiment of a foldable fob having a length and width smaller than traditionally-sized fobs, and further comprising an aperture for connecting to a securing mechanism.
Figure 41B:
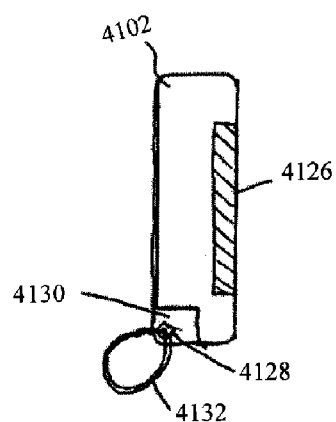

Referring now to FIGS. 41A–41B, a foldable fob 4102 is illustrated having, generally, a length (L) and a width (W) as described above with respect to FIG. 39. Foldable fob 4102 has a fold line 4122 and a hinge 4126, as described above, and a magnetic stripe 4124 disposed thereon. In a corner of fob 4102 is a hole or aperture 4128 for disposing a key chain, key ring, or other like securing mechanism 4132 for holding fob 4102. A notch 4130 is provided in the opposite corner of fob 4102 thereby allowing fob 4102 to fold without interference from the securing mechanism, as shown in FIG. 41B. However, because notch 4128 is provided on the same side of the fob as magnetic stripe 4124, the magnetic stripe must be shorter than the longest length of fob 4102, as illustrated in FIG. 41A, thereby decreasing the storage capacity of magnetic stripe 4124.

Referring now to FIGS. 42, 43, 44A and 44B, alternate embodiments of a foldable fob 4202 and foldable fob system 4402 are disclosed. The foldable fob generally has a length (L) and a width (W) as described above with respect to FIGS. 39, 41A and 41B. Fob 4202 further comprises a fold line 4242 and a hinge 4246, as described above, as well as a magnetic stripe 4244 disposed along substantially the entire length (L) of fob 4202.

FIG. 43 illustrates a holder 4352 having a clip 4354 and a latch 4356 for holding fob 4202 in place, as illustrated below with respect to FIGS. 44A, 44B, to form a foldable fob system 4402.

Fob 4402, as illustrated in FIGS. 44A and 44B, comprises fob 4202, as described above with respect to FIG. 42, connected to the holder 4352, as illustrated in FIG. 43. Holder 4352 includes clip 4354 for holding a first section 4243 of fob 4202 thereto and latch 4356 for holding a second section 4245 of fob 4202 thereto when fob 4202 is in the folded configuration. In one embodiment, latch 4356 is spring-loaded, such that the latch may easily hold second section 4245 of fob 4202, but may be easily releasable, such that fob 4202 may be easily unfolded when needed. A notch 4248 may be provided in second section 4245 of fob 4202 for engaging with latch 4356. However, notch 4248 does not interfere with the magnetic stripe. Holder 4352 further has a hole 4458 disposed therein for attaching a key chain, a key ring, or other securing mechanism 4460, without interfering the operation of the foldable fob.

In an alternate embodiment of the present invention, a foldable fob system may be combined with a money clip. For example, the embodiments described herein of a foldable fob and case or housing may include a money clip on a surface of the case or housing for holding and/or storing currency, or other like material. Moreover, the foldable fob systems may further be combined with a mobile telephone, such as a cellular telephone, or other personal communication device, such that the foldable fob may be removably attached to a housing or case that may be interconnected with the mobile telephone. Of course, foldable fob systems may be incorporated into other items as well, such as personal digital assistants ("PDAs") or other like devices.

Conventional methods of fabricating, manufacturing and cutting transaction devices, such as, credit cards, smart cards, RFID key fobs are well known. As such, one skilled in the art will understand the machinery and processes for fabricating, manufacturing, and/or cutting as they are included in the scope of this invention. Indeed, in the interest of brevity, conventional methods of fabricating, manufacturing and cutting transaction devices will not be discussed in detail herein. For instruction on manufacturing and fabricating a typical fob, see U.S. patent application Ser. No. 10/092,681, entitled "TRANSACTION CARD," filed Mar. 7, 2002, and incorporated herein in its entirety.

It should be noted that although the present invention is described herein with reference to including only one RFID transponder system, one RFID or IC chip, the invention is not so limited. The invention contemplates the inclusion of one or more RFID transponder systems, IC chips or modules, or any combination thereof. For example, a folding mini fob, in accordance with the present invention, may be configured with antennas disposed on one side and/or half of fob 102, both sides and/or halves of fob 102, and/or any other configuration involving one or more antennas. As an example, a fob user may wave any part and/or side of fob 102 in front of RFID reader 104 and RFID reader 104 will be able to communicate with one of the antennas configured on fob 102. For more information on dual antenna systems, see U.S. patent application Ser. No. 10/302,658, entitled "TRANSACTION CARD WITH DUAL IC CHIPS," filed Nov. 22, 2002, which discloses a suitable multi-chip arrangement, and is therefore incorporated by reference in its entirety.

A folding mini fob may also be configured with two or more sets of information, such as holographic foils, magnetic stripes, user information and the like. For example, the invention contemplates fob 102 configured with two magnetic stripes such that each stripe may contain a second set of information. The different information on the magnetic stripes may be readable by passing the strip through a reader in opposite directions. The invention also contemplates configuring fob 102 with two or more sets of information, modules 20 and/or magnetic stripes such that a user can use any side of fob 102 to facilitate a transaction. For example, in one embodiment of fob 102 is configured with two magnetic stripes, a user can choose to swipe either stripe to facilitate a transaction. If fob 102 is attached to a key ring or other apparatus, the user can chose to swipe magnetic stripe which is more conveniently located.

In accordance with yet another embodiment of the present invention, fob 102 may be configured with one or more Universal Product Code (UPC) serial numbers that may facilitate use in conjunction with supermarket identification cards and banking cards. For example, fob 102 may be configured with one or more UPC numbers on any part of the fob such that the UPC number may be detected by a grocery scanner, magnetic code reader, RFID reader, and/or any other type of reader. Thus, a shopper may indicate his/her membership at, for example a grocery store, at the same time that the shopper pays for the transaction.

In another embodiment, fob 102 may be configured with information for multiple transaction accounts such that fob 102 may be used to facilitate multiple transactions, such as, for example, credit card transactions, debit card transactions, membership transactions, loyalty point transactions, healthcare transactions, transactions involving a driver's license or passport, warehouse club transactions, private label transactions and/or any other transaction involving a card, fob, and/or other transaction device.

The present invention may also be configured as contactless transparent transaction card. Specifically, the present invention may include systems and methods for producing a contactless, transparent transaction card, such as a credit card, debit card, stored-value card, smart card, or other type of transaction card, having a plurality of layers that is transparent or otherwise clear so that the transaction card is see through. The transaction card may include means for conducting a transaction in a contactless environment. For example, the transaction card may include a transponder system, which may include a RF-based chip and antenna embedded therein. The contactless transparent transaction card can be utilized to more efficiently conduct cashless transactions at merchants, for example, a merchant POS, by permitting the cardholder to maintain possession of the card throughout the transaction. Instead, the cardholder information necessary to complete the transaction is retrieved from the card using contactless means. In addition, the transaction card may further include a traditional magnetic stripe so that the transaction card can, in addition, be fed through a magnetic stripe reader or inserted in a card acceptance device for transaction completion. In that regard the card layers may include IR blocking ink or film for activating a card acceptance device in a traditional contact transaction.

A folding mini transparent card overcomes the problems of the prior art (e.g., undetectable transparent card, ATM jamming, etc.) by incorporating materials having machine recognizable compounds into the layers of the transaction card body. In an exemplary embodiment, the machine recognizable compounds are optically recognizable compounds containing infrared blocking (absorbing, refracting, diffusing, reflecting or otherwise blocking) ingredients. The optically recognizable compounds may be invisible, visible, or colored to produce a desired effect and/or they may contain other detectable compounds, such as, for example, UV-Fluorescent or IR-Fluorescent features. The optical compounds preferably have good stability, resistance properties, durability and other physical properties, such as good appearance, flexibility, hardness, solvent resistance, water resistance, corrosion resistance and exterior stability. Moreover, the use of such compounds typically does not interfere with UV compounds that may be present in many substrates. One skilled in the art will appreciate that the optically recognizable compound is any chemical, solution, dye, ink substrate, material and/or the like which is recognizable by a sensor. In an exemplary embodiment, the optically recognizable ink is an infrared ink which blocks, absorbs or reflects most infrared light, but transmits most other wavelengths of light. The optically recognizable compound is referred to as an IR ink for ease in understanding and not by way of limitation.

In an exemplary embodiment, the optically recognizable compound is incorporated into a material in the form of a film, plastic, fiber, ink, concentrate, thermoplastic or thermoset matrix, thread, planchette, and/or other medium which contains in the range of about 0.001 to 40.0 wt.(%) of a compound derived from organic or inorganic materials. If incorporated in a film, the film containing the compound may be extrusion coated to one or more transparent or translucent layers, as described herein. A suitable process for applying the machine recognizable film is disclosed in U.S. patent application Ser. No. 10/092,681, entitled "TRANSACTION CARD," filed Mar. 7, 2002, and incorporated herein in its entirety.

If incorporated in an ink, the infrared ink may be applied to transparent or translucent layers of transaction card by, for example, a screen printing process or any other printing or coating means such as lithography, gravure, flexo, calendar coating, curtain coating, roller coating and/or the like. An exemplary screen printing process utilizes a screen press equipped with drying equipment (UV curable or convection heat) and a screen with a specific mesh size of about 80 lines/cm. The IR ink may be printed across any portion of the entire card surface of plastic using a silk screen press, as described below.

Because the relative eye sensitivity of an ordinary observer for a specified level of illumination is between around 400–770 nm, infrared ink at over 770 nm is preferable because it is invisible to the human eye in normal white light. As such, the invisible infrared material will not substantially obscure the transparent surface of the transaction card. Additionally, the exemplary ink withstands card production temperatures of about 200 F to 400 F degrees and includes a "light fastness period" (which is the resistance of the ink to fade or degrade in the presence of any light, and specifically, UV light) of about at least three years under normal credit card usage conditions. Moreover, the exemplary ink blocks, absorbs or reflects the spectral output of IRED's, such as, for example, the Sankyo Seiki LED's, which is about 800–1000 nm. The exemplary ink also limits the light reaching the phototransistors, so the presence of a clear card having the ink is detected in a transaction machine, such as, for example, a card grabbing-type ATM machine.

Exemplary compositions of the machine recognizable compounds of the present invention comprise a mixture of a wide variety of compounds. The active compounds are derived of inorganic, organometallic, ore organic layered materials or rare earth compounds, most commonly rare earth oxides, oxysulfides or oxyhalides. The compounds are relatively inert, so the effects on the performance properties of the final product are minimized. The infrared compound comprises either a dye, layered material, pigment and/or encapsulated pigment that is dispersed in a particular medium which can be incorporated into a wide variety of end-usable products. The particle size of the infrared compound allows the materials (plastic, thread, ink, etc.) to optimally dispersed or dissolved and uniformly exist within the articles which it is incorporated.

Conventionally known infrared materials comprising layered dielectric and metallic materials or doped rare-earth materials can be effectively used as pigments for compounds in accordance with exemplary embodiments of the present invention. In this context, the pigments or dyes absorb specific wavelengths of energy and may change one wavelength of energy to another. The energy conversions or absorptions may be above or below any stimulation within the electromagnetic spectrum. The compounds may absorb specific wavelengths of light or change from one color to another or the compounds may change from invisible to visible and/or the like. The infrared compounds of the present invention are thus incorporated into a system which reversibly changes one wavelength of energy to another, hence causing a "fingerprint"-type of detectable feature within the articles.

Moreover, the prepared films or materials can be mixed with a binder to form infrared compounds for use in threads, fibers, coatings, and the like. Binders that can be incorporated in the present invention include conventional additives such as waxes, thermoplastic resins, thermoset resins, rubbers, natural resins or synthetic resins. Such examples of such binders are, polypropylene, nylon, polyester, ethylene-vinyl acetate copolymer, polyvinyl acetate, polyethylene, chlorinated rubber, acrylic, epoxy, butadiene-nitrile, shellac, zein, cellulose, polyurethane, polyvinylbutyrate, vinyl chloride, silicone, polyvinyl alcohol, polyvinyl methyl ether, nitrocellulose, polyamide, bismaleimide, polyimide, epoxy-polyester hybrid and/or the like. Films that can be used include polyester, polyvinylchloride, polypropylene, polyethylene, acrylic, polycarbonate and/or the like. As discussed below, any film can be laminated or adhered to common card articles using heat, adhesives, or a combination of both.

If the content of the compound is too low, adequate blocking may not be achieved and the phototransistor may not send the proper signal to the capture device, which will mean that the card will not be detected. Therefore, the infrared compounds are usually present in the composition at a total amount from about 1 PPM to 80.0 wt.(%), and preferably from about 0.25%–25.0% by weight. Moreover, the present invention contemplates that other materials such as, for example, UV absorbers, reflectors, antioxidants, and/or optical brighteners, may be add in order to achieve better resistance properties, aesthetics, or longevity of the materials.

Particularly, other materials may be added to allow for color shifts from one color to another color after stimulation. Commonly employed materials such as dyes, pigments, fluorescent dyes, luminous pigments, and/or the like, can be used to promote reversible color changes from one color state to another color state. Such materials can be incorporated directly with the infrared compounds during initial processing or may be added after the infrared compounds have been processed. The use of materials such as solvents, water, glycols, and/or the like can be added to adjust rhelogical properties of the material. Also, the use of surfactants, defoamers, release agents, adhesion promoters, leveling agents, and/or the like may be added to the formulations for improved processing properties. Optical brightening materials may also be added to ensure whiteness in a colorless state and to maintain a low level of contrast between many substrates where infrared compounds are located.

The exemplary infrared compounds in accordance with this invention are deposited onto films of various compositions and can be used in most card applications. Moreover, the infrared compounds in accordance with the present invention can be used alone or blended with other materials at ranges from 0.001 to 50.0 parts by weight, but most preferable from 1.0 to 15.0 parts by weight.

Typical examples of suitable inks and films for use with the present invention are described in U.S. Pat. No. 6,581,839, issued Jun. 24, 2003, incorporated herein in its entirety. As such, the various suitable compositions of the IR blocking ink will not be repeated here for brevity. For a more detailed description of transparent transaction cards, see U.S. patent application Ser. No. 10/611,563, entitled "CLEAR CONTACTLESS CARD," filed Jun. 30, 2003, and incorporated herein by reference.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. Thus, the preceding detailed description is presented for purposes of illustration only and not of limitation, and the scope of the invention is defined solely by the appended claims and their legal equivalents when properly read in light of the preceding description. For example, the steps recited in any of the method or process claims may be executed in any order and are not limited to the order presented.

The present invention also contemplates the use of one or more primary and/or secondary security measures. For example, fob 102 may used in accordance with, for example, an authorization/access code, personal identification number (PIN), Internet code, digital certificate, biometric data, and/or other primary and/or secondary identification data used to verify a transaction device user identity. For an example of biometric security in accordance with the present invention, see U.S. patent application Ser. No. 10/708,825, entitled "METHOD AND SYSTEM FOR FINGERPRINT BIOMETRICS ON A FOB," filed Mar. 26, 2004, and incorporated herein by reference.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made without departing from the spirit and scope of the invention. In addition, the steps recited in any of the method or process claims may be executed in any order and are not limited to the order presented or method steps may be added or eliminated as desired. Further, the present invention may be practiced using one or more servers, as necessary. Thus, the preceding detailed description is presented for purposes of illustration only and not of limitation, and the scope of the invention is defined by the preceding description, and with respect to the attached claims.

What is claimed is:

1. An RFID fob system comprising:
    a foldable RFID fob having a folded state and an unfolded state wherein said foldable RFID fob comprises a first section and a second section;
    a hinge disposed between the first and the second section;
    said foldable RFID fob having at least one dimension smaller than a corresponding dimension of a traditionally-sized fob when said foldable RFID fob is in the unfolded state, and a holder for holding the fob wherein said holder is a housing that surrounds the fob when the fob is in the folded state, wherein the housing comprises a first section and a second section, wherein a hinge is disposed between the first and second sections of the housing, and wherein folding said holder causes the fob to folded.

2. The RFID fob system of claim 1, wherein the fob is removably attached to said holder.

3. The RFID fob system of claim 1, wherein at least the first section of the fob is attached to the holder.

4. The RFID fob system of claim 1, wherein the first section of the fob is attached to the first section of the housing.

5. The RFID fob system of claim 1, wherein the holder comprises an attaching means and the fob is attached to the holder via the attaching means.

6. The RFID fob system of claim 5, wherein the attaching means comprises a track, wherein the fob is disposed within the track.

7. The RFID fob system of claim 6, wherein the first section of the fob is removably disposed within the track.

8. The RFID fob system of claim 1, wherein the holder comprises a releasing means for releasing the fob from the holder.

9. The RFID fob system of claim 1, wherein the housing further comprises an opening means for opening the housing and accessing the foldable fob contained therein wherein the opening comprises an actuator whereby actuating the actuator allows the housing to open.

10. The RFID fob system of claim 1, wherein the hinge of the housing is spring-loaded.

11. The RFID fob system of claim 10, wherein the spring-loaded hinge of the housing allows the housing to spring open when opened.

12. The RFID fob system of claim 1, further comprising a releasing means for releasing the second section of the fob from the holder to allow the fob to unfold.

13. The RFID fob system of claim 1, further comprising a magnetic stripe, wherein the magnetic stripe is readable by a magnetic stripe reader.

14. The RFID fob system of claim 13, wherein the magnetic stripe is positioned parallel to an edge of the fob.

15. The RFID fob system of claim 13, wherein the magnetic stripe is positioned perpendicular to a largest dimension of the fob.

16. The RFID fob system of claim 13, wherein the magnetic stripe comprises at least two tracks for storing the encoded data.

17. The RFID fob system of claim 16, wherein the encoded data on a first of the two tracks is encoded at a density of greater than about 210 bits per inch.

18. The RFID fob system of claim 17, wherein the encoded data on the first of the two tracks is encoded at a density of about 260 bits per inch.

19. The RFID fob system of claim 16, wherein the encoded data on a second of the two tracks is encoded at a density of greater than about 75 bits per inch.

20. The RFID fob system of claim 19, wherein the encoded data on the second of the two tracks is encoded at a density of about 100 bits per inch.

21. The RFID fob system of claim 16, wherein the encoded data is encoded using two frequency encoding.

22. The RFID fob system of claim 1, further comprising a magnetic stripe;
wherein the magnetic stripe is readable by a magnetic stripe reader without removing the fob from the holder.

23. The RFID fob system of claim 1, further comprising a magnetic stripe;
wherein the magnetic stripe is readable by a magnetic stripe reader after the fob is removed from the holder.

24. The RFID fob system of claim 1, wherein the hinge between the first and second sections of the fob comprises a fold line in said fob.

25. The RFID fob system of claim 1, wherein the hinge comprises a strip of material interconnected to both the first and second sections.

26. The RFID fob system of claim 1, wherein the dimensions of the fob are in the range of about 1 inch by about 1 inch to about 1⅞ inches by about 3 inches, and the length of the magnetic stripe is in the range of about 1 inch to about 3 inches.

27. The RFID fob system of claim 1, further comprising a core comprising polyester.

28. The RFID fob system of claim 1, wherein the dimensions of the fob are about 1 9/16 inches by about 2 9/16 inches.

29. The RFID fob system of claim 1, wherein the fob is devoid of raised lettering.

30. The RFID fob system of claim 1, wherein the fob further comprises a computer chip.

31. The RFID fob system of claim 1, wherein the fob further comprises an integrated circuit chip.

32. The RFID fob system of claim 1, wherein the fob further comprises a microprocessor.

33. The RFID fob system of claim 1, wherein the fob can be read by a magnetic stripe reader configured to read magnetic stripes compliant with ISO/IEC 7811.

34. The RFID fob system of claim 1, wherein the largest dimension of the fob is about 2 9/16 inches and the lengthwise dimension of the magnetic stripe is in the range of about 1 inch to about 2 9/16 inches.

35. The RFID fob system of claim 1, wherein the fob further comprises an angled edge.

36. The RFID fob system of claim 35, wherein a magnetic stripe is positioned parallel to the angled edge.

37. The RFID fob system of claim 1, wherein the largest dimension of the fob is in the range of about 1⅞ inches to about 3 inches, and the lengthwise dimension of the magnetic stripe is in the range of about 1 inch to about 3 inches.

38. The RFID fob system of claim 1, wherein the holder comprises an aperture for connecting with a securing mechanism.

39. The RFID fob system of claim 1, wherein said fob is configured with storage means configured to store information.

40. The RFID fob system of claim 39, wherein said fob is configured with storage means configured to store information for at least two of credit card accounts, debit card accounts, frequent flier accounts, loyalty point accounts, drivers license information, passport information, membership information, healthcare information, and private label transaction card information.

41. The RFID fob system of claim 1, wherein said RFID fob is configured as a transparent fob.

42. The RFID fob system of claim 1, wherein said RFID fob is configured with two or more antennas.

43. The RFID fob system of claim 1, wherein said RFID fob is configured with a UPC serial number as an identifier.

44. The RFID fob system of claim 1, wherein said RFID fob is configured with at least two magnetic stripes.

45. The RFID fob system of claim 1, wherein said RFID fob is configured with a secondary security measure, wherein said secondary security measure comprises at least one of an authorization/access code, personal identification number (PIN), an Internet code, a digital certificate, and biometric data.

* * * * *